(12) United States Patent
Ghantous et al.

(10) Patent No.: US 6,503,646 B1
(45) Date of Patent: Jan. 7, 2003

(54) HIGH RATE BATTERIES

(75) Inventors: Dania I. Ghantous, San Jose, CA (US); Benjamin Chaloner-Gill, San Jose, CA (US); Shivkumar Chiruvolo, Sunnyvale, CA (US); Devendra R. Banfol, Fremont, CA (US); William E. McGovern, LaFayette, CA (US); Ronald M. Cornell, Livermore, CA (US); Khanh Hoang, San Jose, CA (US); Allison A. Pinoli, Sunnyvale, CA (US)

(73) Assignee: NanoGram Corporation, Fremont, CA (US)

( * ) Notice: Subject to any disclaimer, the term of this patent is extended or adjusted under 35 U.S.C. 154(b) by 32 days.

(21) Appl. No.: 09/649,752

(22) Filed: Aug. 28, 2000

(51) Int. Cl.$^7$ .................................................. H01M 4/34
(52) U.S. Cl. ........................ 429/3; 429/219; 429/231.5; 429/231.95
(58) Field of Search ........................ 429/3, 219, 231.5, 429/231.95

(56) References Cited

U.S. PATENT DOCUMENTS

| | | | |
|---|---|---|---|
| 3,406,228 A | 10/1968 | Hardy et al. ................. 264/0.5 |
| 3,483,110 A | 12/1969 | Rozgonyi .................... 204/192 |
| 4,048,290 A | 9/1977 | Lee ............................ 423/336 |
| 4,246,327 A | 1/1981 | Skarstad et al. ............ 429/105 |
| 4,548,798 A | 10/1985 | Rice ............................ 423/263 |
| 4,830,940 A | 5/1989 | Keister et al. ............... 429/194 |
| 4,964,877 A | 10/1990 | Keister et al. ............... 29/623 |
| 5,039,452 A | 8/1991 | Thompson et al. .......... 252/518 |
| 5,053,580 A | 10/1991 | Schramm et al. ........... 585/624 |
| 5,160,664 A | 11/1992 | Liu ............................. 252/305 |
| 5,221,453 A | 6/1993 | Crespi ........................ 204/291 |
| 5,298,349 A | 3/1994 | Takeuchi .................... 429/219 |
| 5,389,472 A | 2/1995 | Takeuchi et al. ............ 429/219 |
| 5,427,763 A | 6/1995 | Lawton et al. .............. 423/593 |
| 5,435,874 A | 7/1995 | Takeuchi et al. ............ 156/242 |
| 5,453,261 A | 9/1995 | Saidi et al. .................. 423/592 |
| 5,458,997 A | 10/1995 | Crespi et al. ................ 429/219 |
| 5,498,494 A | 3/1996 | Takeuchi et al. ............ 429/219 |
| 5,516,340 A | 5/1996 | Takeuchi et al. ........... 29/623.1 |
| 5,543,249 A | 8/1996 | Takeuchi et al. ............ 429/217 |
| 5,545,496 A | 8/1996 | Chang et al. ................ 429/218 |
| 5,545,497 A | 8/1996 | Takeuchi et al. ............ 429/219 |
| 5,549,880 A | 8/1996 | Koksbang .................... 423/593 |
| 5,558,680 A | 9/1996 | Takeuchi et al. ........... 29/623.1 |
| 5,571,640 A | 11/1996 | Takeuchi et al. ............ 429/209 |
| 5,580,683 A | 12/1996 | Takeuchi et al. ............ 429/194 |
| 5,639,577 A | 6/1997 | Takeuchi et al. ............ 429/219 |
| 5,670,276 A | 9/1997 | Takeuchi et al. ............ 429/219 |
| 5,695,892 A | 12/1997 | Leising et al. .............. 429/219 |
| 5,766,797 A | 6/1998 | Crespi et al. ................ 429/197 |
| 5,770,126 A | 6/1998 | Singh et al. ..................... 264/8 |
| 5,955,218 A | 9/1999 | Crespi et al. ................ 429/219 |
| 6,027,827 A | * 2/2000 | Gan et al. ...................... 429/50 |
| 6,096,447 A | * 8/2000 | Gan et al. ........................ 429/3 |
| 6,106,798 A | 8/2000 | Kambe et al. ............... 423/592 |
| 6,130,005 A | 10/2000 | Crespi et al. ................ 429/219 |

FOREIGN PATENT DOCUMENTS

| | | |
|---|---|---|
| EP | 0 638 946 A2 | 7/1994 |
| EP | 0 689 256 A1 | 6/1995 |
| WO | WO 99/04441 | 1/1999 |
| WO | WO 00-46867 | 8/2000 |

OTHER PUBLICATIONS

"Evaluation of A New Type of Vanadium Oxide from Peroxo–polyvanadate as a Cathode Material for Rechargeable Lithium Batteries" by, Ugaji et al., J. Electrochem. Soc., vol. 142, No. 11, Nov. 1995, pp. 3664–3668.

"Laser Synthesis of Canadium–Titanium Oxide Catalysts" by, Musci et al., J. Mater., Res., vol. 7, No. 10. Oct. 1992, pp. 2846–2852.

"Preparation and Lithium Intercalation of a New Vanadium Oxide with a Two–Dimensional Structure", by Hibino et al., Solid State Ionics 79 (1995) pp. 239–244.

* cited by examiner

*Primary Examiner*—John S. Maples
(74) *Attorney, Agent, or Firm*—Patterson, Thuente, Skaar & Christensen P.A.; Peter S. Dardi; David Kleinsmith

(57) ABSTRACT

Improved high rate batteries based on silver vanadium oxide yield improved pulsed performance. In particular, batteries comprise an electrolyte having lithium ions and a cathode comprising silver vanadium oxide. Improved batteries have a pulsed specific energy of at least about 575 mWh/g when pulsed in groups of four-10 second pulses at a current density of 25 mA/cm$^2$ spaced by 15 seconds between pulses and with 30 minutes between pulse groups down to a discharge voltage of 1.5 volts. In addition, improved batteries can achieve high maximum specific powers, high current densities and no voltage delay in pulsed operation. The batteries are particularly suitable for use in implantable medical devices, such as, defibrillators, pacemakers or combinations thereof. Improved processing approaches are described.

46 Claims, 44 Drawing Sheets

HIGH RATE BATTERIES

BACKGROUND OF THE INVENTION

The invention relates to batteries having very high rate capabilities. More particularly, the invention relates to batteries having metal vanadium oxides that can produce extremely high current densities. These batteries are particularly useful for implantable medical devices, especially defibrillators.

Lithium-based batteries have become commercially successful due to their relatively high energy density. Suitable positive electrode materials for lithium-based batteries include materials that can intercalate lithium atoms into their lattice. The negative electrode can be lithium metal, lithium alloys or compounds that can reversibly intercalate lithium atoms into their lattice. In conventional terminology, lithium-based batteries formed from lithium metal or lithium alloy negative electrodes are-referred to as lithium batteries while batteries formed with an anode (negative electrode) active material that can intercalate lithium ions are referred to as lithium ion batteries.

In order to produce improved batteries, various materials have been examined for use as cathode (positive electrode) :active materials for lithium based batteries. A variety of materials, generally chalcogenides, are useful in lithium based batteries. For example, vanadium oxides in certain oxidation states are effective materials for the commercial production of positive electrodes for lithium based batteries. Also, metal vanadium oxide compositions have been identified as having high energy densities and high power densities, when used in positive electrodes for lithium based batteries. Silver vanadium oxide has a particularly high energy density and high power densities, when used in lithium based batteries. Silver vanadium oxide batteries have found particular use in the production of implantable cardiac defibrillators where the battery must be able to recharge a capacitor to deliver large pulses of energy in rapid succession.

SUMMARY OF THE INVENTION

In a first aspect, the invention pertains to a battery comprising an electrolyte having lithium ions and a cathode comprising silver vanadium oxide particles. The battery has a pulsed specific energy of at least about 575 mwh/g when pulsed in groups of four-10 second pulses at a current density of 25 mA/cm$^2$ spaced by 15 seconds between each pulse and with 3.0 minutes between pulse groups down to a pulse discharge voltage of 1.5 V. The battery can be used in a defibrillator, a pacemaker or a combination thereof.

In another aspect, the invention pertains to a battery comprising silver vanadium oxide particles. The battery has a maximum pulse specific power of greater than about 1.5 W/g to 1.5 V.

Moreover, the invention pertains to a method for producing silver vanadium oxide particles the method comprising heating a mixture of vanadium oxide powder and a silver compound in a vessel with agitation of the reactants.

In addition, the invention pertains to a method for producing an electrode, the method including mixing a battery composition with low shear in a homogenizer and forming the mixed composition into an electrode. The battery composition comprises silver vanadium oxide particles, electrically conductive particles, binder and solvent.

In another aspect, the invention pertains to a battery comprising an anode comprising lithium metal foil, a cathode comprising silver vanadium oxide particles and an electrolyte having a solvent comprising alkylene carbonate and at least about 25 percent by volume 1,2-dimethoxyethane.

In a further aspect, the invention pertains to a method of producing vanadium oxide particles, the method comprising reacting a reactant stream comprising a vanadium precursor and water, wherein there is insufficient $O_2$ to form the vanadium oxide product.

Furthermore, the invention pertains to a battery comprising a cathode having silver vanadium oxide particles, a binder and at least about 10 weight percent electrically conductive, electrochemically inert particles. The cathode has a thickness of at least about 0.8 mm.

In other embodiments, the invention pertains to a battery comprising a cathode having silver vanadium oxide particles, a binder and at least about 10 weight percent electrically conductive, electro-chemically inert particles. The cathode has a silver vanadium oxide density from about 1.8 g/cc to about 2.8 g/cc.

Moreover, the invention pertains to a battery comprising an electrolyte having lithium ions and a cathode comprising silver vanadium oxide particles, the battery being able to produce pulse trains with current densities of at least about 50 mA/cm$^2$.

In addition, the invention pertains to a battery comprising an electrolyte having lithium ions and a cathode comprising silver vanadium oxide particles, the battery exhibiting no voltage delay near 2.6 volts in pulse operation.

DETAILED DESCRIPTION OF THE ILLUSTRATIVE EMBODIMENTS

Figure 1:
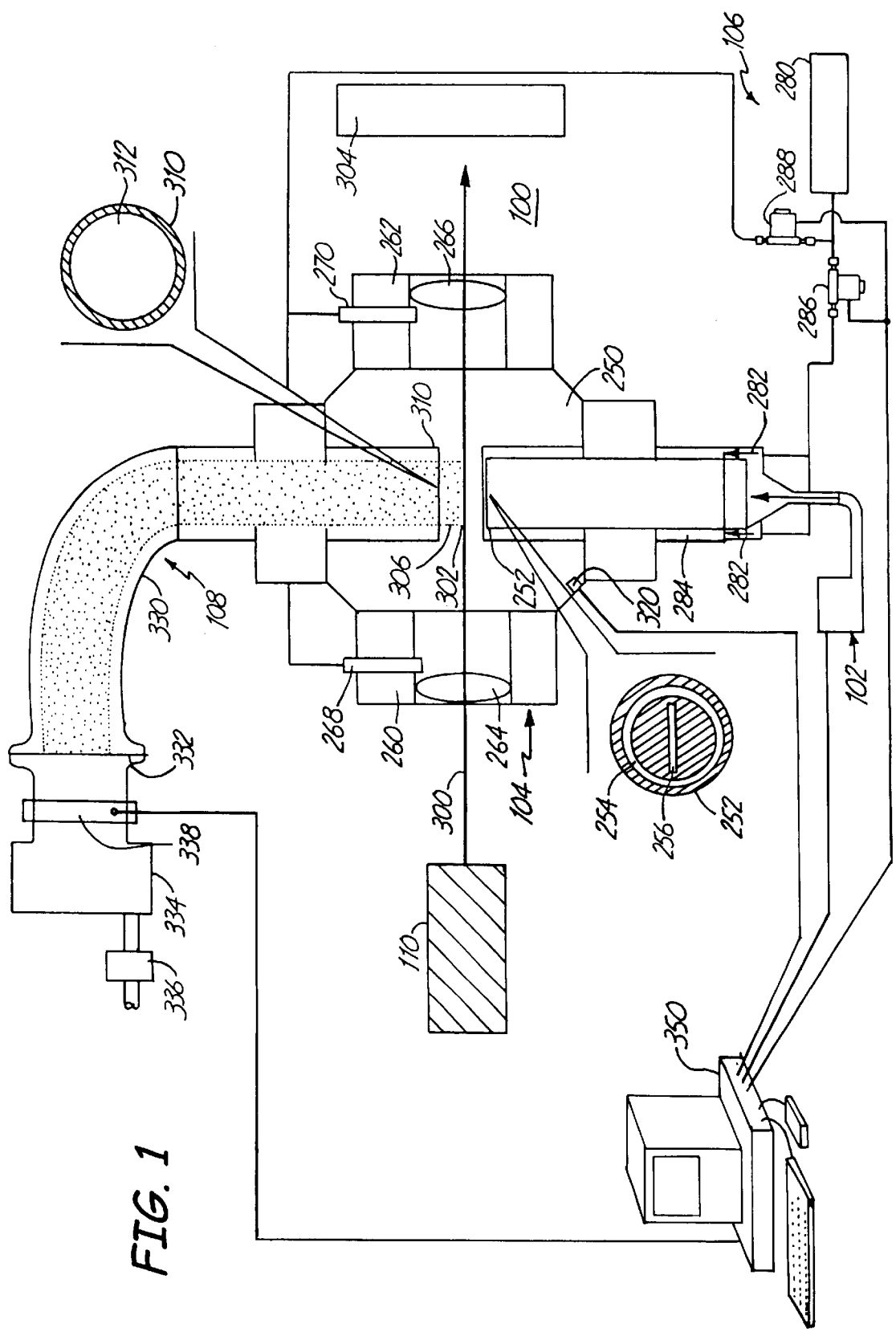
FIG. 1 is a schematic, sectional view of an embodiment of a laser pyrolysis apparatus, where the cross section is taken through the middle of the laser radiation path. The upper insert is a bottom view of the exit nozzle, and the lower insert is a top view of the injection nozzle.

Submicron silver vanadium oxide particles are used to produce batteries with extremely high rate capabilities. In particular, the improved batteries have very high pulsed specific energies and very high maximum specific powers along with very high continuous specific capacities. In preferred embodiments, the silver vanadium oxide has a stoichiometry of approximately $Ag_2V_4O_{11}$ and is free of detectable silver metavanadate, $AgVO_3$. In other words, the $Ag_2V_4O_{11}$ active form of silver vanadium oxide is phase pure with at most insignificant traces of $AgVO_3$. Improved processing approaches lead both to improved metal vanadium oxide particles, such as silver vanadium oxide particles, and to improved battery performance. The improved batteries are particularly suitable for employment in implantable medical devices, especially defibrillators.

The synthesis of submicron metal vanadium oxide particles, in particular silver vanadium oxide particles, is described in copending and commonly assigned U.S. patent applications Ser. No. 09/246,076, now U.S. Pat. No. 6,225,007 to Home et. al, entitled "Metal Vanadium Oxide Particles" and Ser. No. 09/311,506, now U.S. Pat. No. 6,394,494 to Reitz et al., entitled "Metal Vanadiumn Oxide Particles," both of which are incorporated herein by reference. These applications further describe the incorporation of these particles into improved batteries, especially lithium-based batteries. Herein, improved techniques for the synthesis of metal vanadium oxides are described using submicron vanadium oxides as starting materials. In addition, improved approaches for constructing batteries from submicron metal vanadium oxide particles are described which result in significantly improved high rate capacity batteries.

Vanadium oxide nanoparticles with various stoichiometries and crystal structures can be produced by laser pyrolysis alone or with additional processing. These various forms of submicron vanadium oxide particles, preferably submicron $V_2O_5$, can be used as starting materials for the formation of metal vanadium oxide nanoparticles. The multiple metal composite particles are formed by mixing the vanadium oxide nanoparticles with a compound of the metal to be introduced into the vanadium oxide to form a material with both metals in the lattice. By using appropriately selected processing conditions, submicron particles incorporating both metals can be formed based on the submicron character of the initial vanadium oxide particles.

Preferred collections of metal vanadium oxide particles have an average diameter less than a micron and high uniformity with a narrow distribution of particle diameters. To generate submicron vanadium oxide particles from starting materials for further processing into metal vanadium oxides, laser pyrolysis can be used either alone or in combination with additional processing. Specifically, laser pyrolysis has been found to be an excellent process for efficiently producing submicron (less than about 1 micron average diameter) and nanoscale (less than about 100 nm average diameter) vanadium oxide particles with a narrow distribution of average particle diameters. In addition, submicron vanadium oxide particles produced by laser pyrolysis can be subjected to heating under mild conditions in an oxygen environment or an inert environment to alter the crystal properties and/or the stoichiometry of the vanadium oxide particles. Thus, a large variety of different types of vanadium oxide particles can be produced using these approaches.

A basic feature of successfill application of laser pyrolysis for the production of vanadium oxide particles is production of a reactant stream containing a vanadium precursor and a radiation absorber. A source of atomic oxygen is required. The atomic oxygen can be bonded within the vanadium precursor and/or can be supplied by a separate oxygen source, such as molecular oxygen. The reactant stream is pyrolyzed by an intense light beam, such as a laser beam. While a laser beam is a convenient energy source, other intense light sources can be used in laser pyrolysis. Laser pyrolysis provides for formation of phases of materials that are difficult to form under thermodynamic equilibrium conditions. As the reactant strewn leaves the light beam, the vanadium oxide particles are rapidly quenched. The production of vanadium oxide particles by laser pyrolysis is described further in copending and commonly assigned U.S. patent application Ser. No. 08/897,778, now U.S. Pat. No. 6,106,798 to Kambe et al., entitled "Vanadium Oxide Particles," incorporated herein by reference.

A flameless laser pyrolysis approach has been developed for the synthesis of vanadium oxide particles. Preferred oxygen sources include molecules with both hydrogen and oxygen since hydrogen can scavenge halogens from the reactant streams as HX, X being a halogen. Water preferably is available as an oxygen source. An infrared absorber is used to absorb the light energy to induce the reaction of the reactant stream. A preferred vanadium precursor for this process is vanadium oxytrichloride (vanadyl trichloride), $VOCl_3$. Since vanadium oxytrichloride reacts spontaneously with water to form vanadium oxide species and HCl, the two reactants are delivered through a dual nozzle reactant delivery system. This flameless process is particularly convenient for the synthesis of low energy phases of vanadium oxide, such as $V_2O_5$ and $V_6O_{13}$. Amorphous $V_2O_5$ produced by this process can be heat treated to produce crystalline, high surface area $V_2O_5$ particles.

Because of the resulting high uniformity and narrow particle size distribution, laser pyrolysis is a preferred approach for producing submicron vanadium oxide for processing into metal vanadium oxide. However, other approaches can be used to supply submicron vanadium oxide particles for the improved production approaches for producing metal vanadium oxides and corresponding batteries. Suitable alternative approaches include, for example, flame pyrolysis and thermal pyrolysis. Flame pyrolysis can be performed with a hydrogen-oxygen flame, wherein the flame supplies the energy to drive the pyrolysis. Such a flame pyrolysis approach should produce similar materials as the laser pyrolysis techniques herein, except that flame pyrolysis approaches generally do not produce high uniformity and a narrow particle size distribution. A suitable flame production apparatus is described in U.S. Pat. No. 5,447,708 to Helble et al., entitled "Apparatus for Producing Nanoscale Ceramic Particles," incorporated herein by reference. Furthermore, submicron particles can be produced with a thermal reaction chamber such as the apparatus described in U.S. Pat. No. 4,842,832 to Inoue et al., "Ultrafine Spherical Particles of Metal Oxide and a Method for the Production Thereof," incorporated herein by reference.

Qualities of the vanadium oxide particles can be altered by heat treating the initially synthesized particles. For example, the crystallinity and/or the stoichiometry of the vanadium oxide particles can be altered by heat treatment. In addition, starting with nanoscale vanadium oxide particles, metal vanadium oxide particles can be formed by a thermal process. A second metal precursor comprises a non-vanadium transition metal that is added to the vanadium oxide particles. Preferred second metal precursors include compositions with copper, silver, gold or combinations thereof.

The second metal precursor compound is mixed with a collection of vanadium oxide particles and heated to form the composite particles incorporating both metals. Under suitably mild conditions, the heat processing is effective to produce the particles while not destroying the nanoscale of the initial vanadium oxide particles. While vanadium oxide particles with a variety stoichiometries can be used for the synthesis of metal vanadium oxide particles, crystalline $V_2O_5$ particles are preferred because the crystal structure of $V_2O_5$ is similar to the crystal structure of $Ag_2V_4O_{11}$. In particular, crystalline silver vanadium oxide particles can be formed by heating crystalline $V_2O_5$ particles mixed with silver nitrate at low temperatures between 300–400° C. for short periods of time of 1–4 hours.

In preferred embodiments, the heat treatments are performed in a vessel with agitation of the reactants. In particular, complete transformation of the particles into composite multimetal composites can be obtained in a stirred vessel presumably under more uniform conditions than can be obtained in other heating approaches. This stirred heating approach can be used to obtain submicron particles of $Ag_2V_4O_{11}$ that is virtually free (0 to 0.5 weight percent) of silver metavanadate, $AgVO_3$. Silver metavanadate is not electrochemically active for battery applications, and therefore is indicative of an undesirable form of silver vanadium oxide.

As noted above, lithium ions can intercalate into various forms of vanadium oxide and metal vanadium oxide particles when subjected to electric fields. To form a positive electrode, which acts as a cathode upon discharge of the cell, the metal vanadium oxide particles can be incorporated into a electrode with a binder such as a polymer. The electrode preferably incorporates additional electrically conductive particles held by a binder along with the metal vanadium oxide particles. The electrode can be used as a positive electrode in a lithium battery or a lithium ion battery. Lithium based batteries formed with cathodes including submicron metal vanadium oxides have energy densities higher than theoretical maximum values estimated for corresponding bulk metal vanadium oxides. In particular, metal vanadium oxides, specifically silver vanadium oxides, have been produced with high specific capacities and energy densities.

The batteries described herein have high rate capabilities. To further improve these rate capabilities, it has been discovered that superior results are obtained by mixing the metal vanadium oxide particles in a dispersant with electrically conductive particles and binder under shear with a homogenizer or the like. The mixture is filtered under vacuum to remove solvents. The remaining paste is kneaded and rolled to form a dough-like mixture. The dough is then cut using a die with the desired area to form the cathode pellets. In addition, improved solvents can be used in forming the electrolyte to improve the rate capability of the silver vanadium oxide.

For defibrillator applications, the batteries preferably have not only high specific capacity under slow continuous drain, but also high power capabilities when pulsed. In particular, preferred batteries with silver vanadium oxide have maximum specific powers greater than about 1.5 Watts/gram (W/g). The batteries also have correspondingly high pulsed specific energies and high pulsed specific capacities. In preferred embodiments, the batteries have a pulsed specific energy of at least about 575 mWh/g down to a pulsed discharge voltage of 1.5 V, when pulsed at 25 mA/cm$^2$ current densities in groups of four pulses spaced by 15 seconds and with 30 minutes between pulse groups.

Since the improved batteries have high specific capacities under low loads and improved pulsed capabilities, the batteries have improved versatility in producing long lived medical devices for implantation. In particular, implantable medical devices capable of cardiac defibrillation generally have additional functions, including monitoring of heart function and possibly heart pacing. The silver vanadium oxide batteries can be used to carry-out one or more additional functions in addition to the defibrillating function while providing a long lived and compact battery suitable for implantation.

A. Particle Production Using Laser Pyrolysis

As described above, laser pyrolysis is a valuable tool for the production of submicron and nanoscale precursor particles for further processing into submicron metal vanadium oxide particles. The precursor vanadium oxide particles generally can include various crystalline and/or amorphous particles that are suitable for subsequent processing into submicron metal vanadium oxide particles, especially silver vanadium oxide particles. In particular, the preferred precursor particles, as described in the examples below, are amorphous $V_2O_5$ particles.

The reaction conditions determine the qualities of the particles produced by laser pyrolysis. The reaction conditions for laser pyrolysis can be controlled relatively precisely in order to produce particles with desired properties. The appropriate reaction conditions to produce a certain type of particles generally depend on the design of the particular apparatus. Specific conditions used to produce vanadium oxide particles in a particular apparatus are described below in the Examples. Furthermore, some general observations on the relationship between reaction conditions and the resulting particles can be made.

Increasing the light power results in increased reaction temperatures in the reaction region as well as a faster quenching rate. A rapid quenching rate tends to favor production of high energy phases, which may not be obtained with processes near thermal equilibrium. Similarly, increasing the chamber pressure also tends to favor the production of higher energy structures. Also, increasing the concentration of the reactant serving as the oxygen source in the reactant stream favors the production of particles with increased amounts of oxygen.

Reactant flow rate and velocity of the reactant gas stream are inversely related to particle size so that increasing the reactant gas flow rate or velocity tends to result in smaller particle sizes. Light power also influences particle size with increased light power favoring larger particle formation for lower melting materials and smaller particle formation for higher melting materials. Also, the growth dynamics of the particles have a significant influence on the size of the resulting particles. In other words, different forms of a product compound have a tendency to form different size particles from other phases under relatively similar conditions. Similarly, in multiphase regions at which populations of particles with different compositions are formed, each population of particles generally has its own characteristic narrow distribution of particle sizes.

Laser pyrolysis has become the standard terminology of reactions driven by a intense light radiation with rapid quenching of product after leaving a narrow reaction region defined by the light. The name, however, is a misnomer in the sense that a strong, incoherent, but focused light beam can replace the laser. Also, the reaction is not a pyrolysis in the sense of a thermal pyrolysis. The laser pyrolysis reaction is not thermally driven by the exothermic combustion of the reactants. In fact, the "laser pyrolysis" reaction can be conducted under conditions where no visible flame is observed from the reaction.

Laser pyrolysis has been performed generally with gas/vapor phase reactants. Many metal precursor compounds can be delivered into the reaction chamber as a gas. Appropriate metal precursor compounds for gaseous delivery generally include metal compounds with reasonable vapor pressures, i.e., vapor pressures sufficient to get desired amounts of precursor gas/vapor into the reactant stream. The vessel holding liquid or solid precursor compounds can be heated to increase the vapor pressure of the metal precursor, if desired. Solid precursors generally are heated to produce a sufficient vapor pressure.

A carrier gas can be bubbled through a liquid precursor to facilitate delivery of a desired amount of precursor vapor. Similarly, a carrier gas can be passed over the solid precursor to facilitate delivery of the precursor vapor. Suitable vanadium precursors for vapor delivery include, for example, $VCl_4$, $VOCl_2$, $V(CO)_6$ and $VOCl_3$. The chlorine in these representative precursor compounds can be replaced with other halogens, e.g., Br, I and F.

The use of exclusively gas phase reactants is somewhat limiting with respect to the types of precursor compounds that can be used conveniently. Thus, techniques have been developed to introduce aerosols containing reactant precursors into laser pyrolysis chambers. Improved aerosol delivery apparatuses for reaction systems are described firer in commonly assigned and copending U.S. patent application Ser. No. 09/188,670, now U.S. Pat. No. 6,193,936 to Gardner et al, entitled to "Reactant Delivery Apparatuses," filed Nov. 9, 1998, incorporated herein by reference.

Using aerosol delivery apparatuses, solid precursor compounds can be delivered by dissolving the compounds in a solvent. Alternatively, powdered precursor compounds can be dispersed in a liquid/solvent for aerosol delivery. Liquid precursor compounds can be delivered as an aerosol from a neat liquid, a multiple liquid dispersion or a liquid solution. Aerosol reactants can be used to obtain a significant reactant throughput. A solvent/dispersant can be selected to achieve desired properties of the resulting solution/dispersion. Suitable solvents/dispersants include water, methanol, ethanol, isopropyl alcohol, other organic solvents and mixtures thereof. The solvent should have a desired level of purity such that the resulting particles have a desired purity level. Some solvents, such as isopropyl alcohol, are significant absorbers of infrared light from a $CO_2$ laser such that no additional laser absorbing compound may be needed within the reactant stream if a $CO_2$ laser is used as a light source.

If aerosol precursors are formed with a solvent present, the solvent preferably is rapidly evaporated by the light beam in the reaction chamber such that a gas phase reaction can take place. Thus, the fundamental features of the laser pyrolysis reaction are unchanged by the presence of an aerosol. Nevertheless, the reaction conditions are affected by the presence of the aerosol. Below in the Examples, conditions are described for the production of submicron vanadium oxide particles using aerosol precursors in a particular laser pyrolysis reaction chamber. Thus, the parameters associated with aerosol reactant delivery can be explored further based on the description below.

A number of suitable solid, metal precursor compounds can be delivered as an aerosol from solution. Suitable vanadium precursors for aerosol production include, for example, vanadyl sulfate trihydrate ($VOSO_4 \cdot 3H_2O$), ammonium metavanadate ($NH_4VO_3$), vanadium oxide compounds (e.g., $V_2O_5$ and $V_2O_3$, which are soluble in aqueous acid), and vanadyl dichloride ($VOCl_2$).

The precursor compounds for aerosol delivery are dissolved in a solution preferably with a concentration greater than about 0.5 molar. Generally, the greater the concentration of precursor in the solution the greater the throughput of reactant through the reaction chamber. As the concentration increases, however, the solution can become more viscous such that the aerosol may have droplets with larger sizes than desired. Thus, selection of solution concentration can involve a balance of factors in the selection of a preferred solution concentration.

Preferred secondary reactants serving as an oxygen source include, for example, $O_2$, CO, $H_2O$, $CO_2$, $O_3$ and mixtures thereof. Molecular oxygen can be supplied as air. The secondary reactant compound should not react significantly with the metal precursor prior to entering the reaction zone since this generally would result in the formation of large particles. If the reactants are spontaneously reactive, the vanadium precursor and the secondary reactant can be delivered in separate nozzles into the reaction chamber such that they are combined just prior to reaching the light beam. If the vanadium precursor includes oxygen, a secondary reactant may not be needed to supply oxygen.

Laser pyrolysis can be performed with a variety of optical frequencies, using either a laser or other strong focused light source. Preferred light sources operate in the infrared portion of the electromagnetic spectrum. $CO_2$ lasers are particularly preferred sources of light. Infrared absorbers for inclusion in the reactant stream include, for example, $C_2H_4$, isopropyl alcohol, $NH_3$, $SF_6$, $SiH_4$ and $O_3$. $O_3$ can act as both an infrared absorber and as an oxygen source. The radiation absorber, such as the infrared absorber, absorbs energy from the radiation beam and distributes the energy to the other reactants to drive the pyrolysis.

Preferably, the energy absorbed from the light beam increases the temperature at a tremendous rate, many times the rate that heat generally would be produced by exothermic reactions under controlled condition. While the process generally involves nonequilibrium conditions, the temperature can be described approximately based on the energy in the absorbing region. The laser pyrolysis process is qualitatively different from the process in a combustion reactor where an energy source initiates a reaction, but the reaction is driven by energy given off by an exothermic reaction. Thus, while this light driven process is referred to as laser pyrolysis, it is not a thermal process even though traditional pyrolysis is a thermal process.

An inert shielding gas can be used to reduce the amount of reactant and product molecules contacting the reactant chamber components. Inert gases can also be introduced into the reactant stream as a carrier gas and/or as a reaction moderator. Appropriate inert shielding gases include, for example, Ar, He and $N_2$.

An appropriate laser pyrolysis apparatus generally includes a reaction chamber isolated from the ambient environment. A reactant inlet connected to a reactant delivery apparatus produces a reactant stream through the reaction chamber. A light beam path intersects the reactant stream at a reaction zone. The reactant/product stream continues after the reaction zone to an outlet, where the reactant/product stream exits the reaction chamber and passes into a collection apparatus. Generally, the light source, such as a laser, is located external to the reaction chamber, and the light beam enters the reaction chamber through an appropriate window.

Referring to FIG. 1, a particular embodiment 100 of a laser pyrolysis system involves a reactant delivery apparatus 102, reaction chamber 104, shielding gas delivery apparatus 106, collection apparatus 108 and light source 110. A first reaction delivery apparatus described below can be used to deliver exclusively gaseous reactants. An alternative reactant delivery apparatus is described for delivery of one or more reactants as an aerosol.

Figure 2:
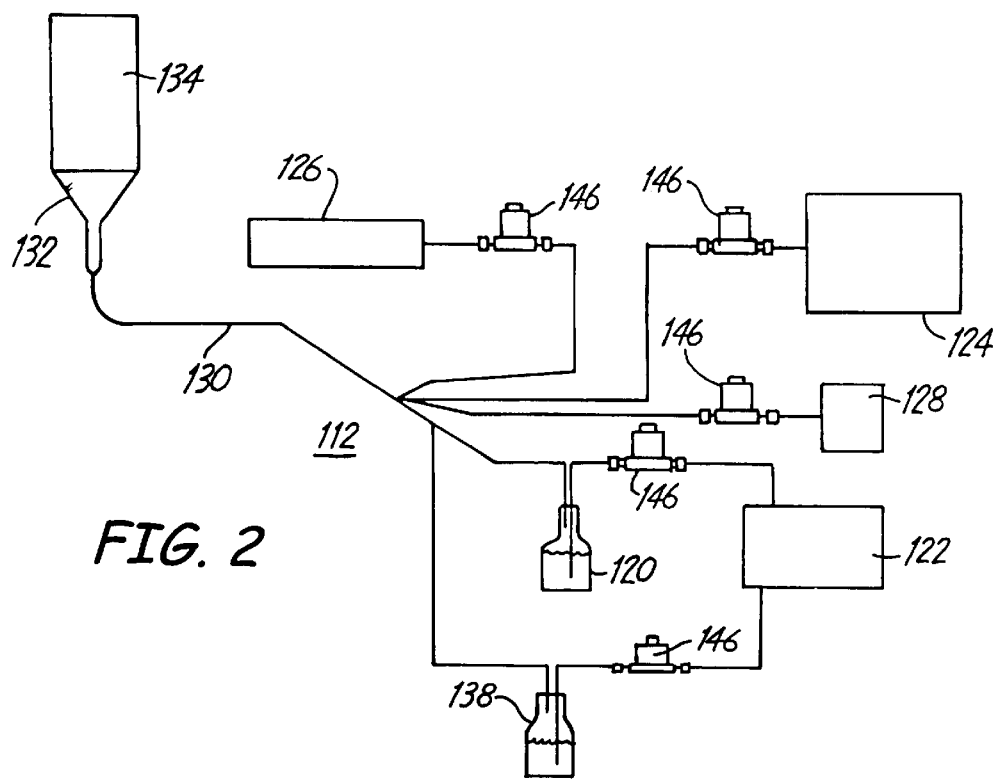
FIG. 2 is a schematic, side view of a reactant delivery apparatus for the delivery of vapor reactants to the laser pyrolysis apparatus of FIG. 1.

Referring to FIG. 2, a first embodiment 112 of reactant delivery apparatus 102 includes a source 120 of a precursor compound. For liquid or solid reactants, a carrier gas from one or more carrier gas sources 122 can be introduced into precursor source 120 to facilitate delivery of the reactant. Precursor source 120 can be a liquid holding container, a solid precursor delivery apparatus or other suitable container. The carrier gas from carrier gas source 122 preferably is either an infrared absorber and/or an inert gas.

The gases from precursor source 120 are mixed with gases from infrared absorber source 124, inert gas source 126 and/or secondary reactant source 128 by combining the gases in a single portion of tubing 130. The gases are combined a sufficient distance from reaction chamber 104 such that the gases become well mixed prior to their entrance into reaction chamber 104. The combined gas in tube 130 passes through a duct 132 into channel 134, which is in fluid communication with reactant inlet 206.

A second reactant can be supplied from second reactant source 138, which can be a liquid reactant delivery apparatus, a solid reactant delivery apparatus, a gas cylinder or other suitable container or containers. As shown in FIG. 2, second reactant source 138 delivers a second reactant to duct 132 by way of tube 130. Alternatively, mass flow controllers 146 can be used to regulate the flow of gases within the reactant delivery system of FIG. 2. The second reactant can be delivered through a second duct for delivery into the reactant chamber through a second channel such that the reactants do not mix until they are in the reaction chamber.

As noted above, the reactant stream can include one or more aerosols. The aerosols can be formed within reaction chamber 104 or outside of reaction chamber 104 prior to injection into reaction chamber 104. If the aerosols are produced prior to injection into reaction chamber 104, the aerosols can be introduced through reactant inlets comparable to those used for gaseous reactants, such as reactant inlet 134 in FIG. 2.

Figure 3:
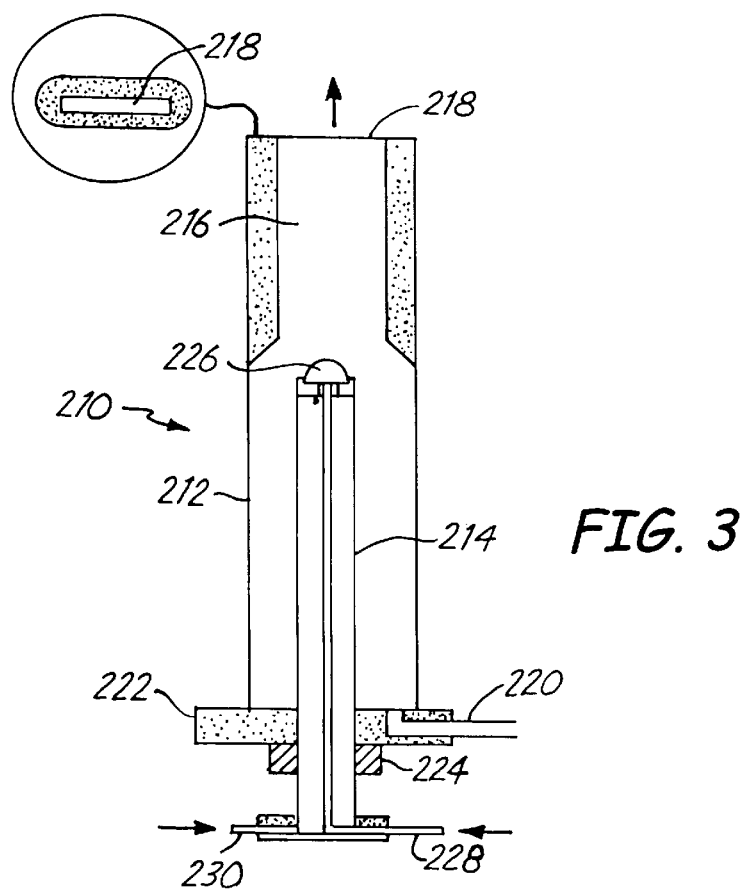
FIG. 3 is a schematic, side view of a reactant delivery apparatus for, the delivery of an aerosol reactant to the laser pyrolysis apparatus of FIG. 1.

Referring to FIG. 3, embodiment 210 of the reactant supply system 102 can be used to supply an aerosol to duct 132. Reactant supply system 210 includes an outer nozzle 212 and an inner nozzle 214. Outer nozzle 212 has an upper channel 216 that leads to a rectangular outlet 218 at the top of outer nozzle 212, as shown in the insert in FIG. 3. Rectangular nozzle has selected dimensions to produce a reactant stream of desired expanse within the reaction chamber. Outer nozzle 212 includes a drain tube 220 in base plate 222. Drain tube 220 is used to remove condensed aerosol from outer nozzle 212. Inner nozzle 214 is secured to outer nozzle 212 at fitting 224.

The top of the nozzle preferably is a twin orifice internal mix atomizer 226. Liquid is fed to the atomizer through tube 228, and gases for introduction into the reaction chamber are fed to the atomizer through tube 230. Interaction of the gas with the liquid assists with droplet formation.

Referring to FIG. 1, the reaction chamber 104 includes a main chamber 250. Reactant supply system 102 connects to the main chamber 250 at injection nozzle 252. Reaction chamber 104 can be heated to a surface temperature above the dew point of the mixture of reactants and inert components at the pressure in the apparatus.

The end of injection nozzle 252 has an annular opening 254 for the passage of inert shielding gas, and a reactant inlet 256 (left lower insert) for the passage of reactants to form a reactant stream in the reaction chamber. Reactant inlet 256 preferably is a slit, as shown in the lower inserts of FIG. 1. Annular opening 254 has, for example, a diameter of about 1.5 inches and a width along the radial direction from about ⅛ in to about 1/16 in. The flow of shielding gas through annular opening 254 helps to prevent the spread of the reactant gases and product particles throughout reaction chamber 104.

Tubular sections 260, 262 are located on either side of injection nozzle 252. Tubular sections 260, 262 include ZnSe windows 264, 266, respectively. Windows 264, 266 are about 1 inch in diameter. Windows 264, 266 are preferably cylindrical lenses with a focal length equal to the distance between the center of the chamber to the surface of the lens to focus the light beam to a point just below the center of the nozzle opening. Windows 264, 266 preferably have an antireflective coating. Appropriate ZnSe lenses are available from Laser Power Optics, San Diego, Calif. Tubular sections 260, 262 provide for the displacement of windows 264, 266 away from main chamber 250 such that windows 264, 266 are less likely to be contaminated by reactants and/or products. Window 264, 266 are displaced, for example, about 3 cm from the edge of the main chamber 250.

Windows 264, 266 are sealed with a rubber o-ring to tubular sections 260, 262 to prevent the flow of ambient air into reaction chamber 104. Tubular inlets 268, 270 provide for the flow of shielding gas into tubular sections 260, 262 to reduce the contamination of windows 264, 266. Tubular inlets 268, 270 are connected to shielding gas delivery apparatus 106.

Referring to FIG. 1, shielding gas delivery system 106 includes inert gas source 280 connected to an inert gas duct 282. Inert gas duct 282 flows into annular channel 284 leading to annular opening 254. A mass flow controller 286 regulates the flow of inert gas into inert gas duct 282. If reactant delivery system 112 of FIG. 2 is used, inert gas source 126 can also function as the inert gas source for duct 282, if desired. Referring to FIG. 1, inert gas source 280 or a separate inert gas source can be used to supply inert gas to tubes 268, 270. Flow to tubes 268, 270 preferably is controlled by a mass flow controller 288.

Light source 110 is aligned to generate a light beam 300 that enters window 264 and exits window 266. Windows 264, 266 define a light path through main chamber 250 intersecting the flow of reactants at reaction zone 302. After exiting window 266, light beam 300 strikes power meter 304, which also acts as a beam dump. An appropriate power meter is available from Coherent Inc., Santa Clara, Calif. Light source 110 can be a laser or an intense conventional light source such as an arc lamp. Preferably, light source 110 is an infrared laser, especially a CW $CO_2$ laser such as an 1800 watt maximum power output laser available from PRC Corp., Landing, N.J.

Reactants passing through reactant inlet 256 in injection nozzle 252 initiate a reactant stream. The reactant stream passes through reaction zone 302, where reaction involving the metal precursor compounds takes place. Heating of the gases in reaction zone 302 is extremely rapid, roughly on the order of $10^5$ degree. C./sec depending on the specific conditions. The reaction is rapidly quenched upon leaving reaction zone 302, and particles 306 are formed in the reactant/product stream. The nonequilibrium nature of the process allows for the production of nanoparticles with a highly uniform size distribution and structural homogeneity.

The path of the reactant stream continues to collection nozzle 310. Collection nozzle 310 has a circular opening 312, as shown in the upper insert of FIG. 1. Circular opening 312 feeds into collection system 108.

The chamber pressure is monitored with a pressure gauge 320 attached to the main chamber. The preferred chamber pressure for the production of the desired oxides generally ranges from about 80 Torr to about 650 Torr.

Collection system 108 preferably includes a curved channel 330 leading from collection nozzle 310. Because of the small size of the particles, the product particles follow the flow of the gas around curves. Collection system 108 includes a filter 332 within the gas flow to collect the product particles. Due to curved section 330, the filter is not supported directly above the chamber. A variety of materials such as Teflon® (polytetrafluoroethylene), glass fibers and the like can be used for the filter as long as the material is inert and has a fine enough mesh to trap the particles. Preferred materials for the filter include, for example, a glass fiber filter from ACE Glass Inc., Vineland, N.J. and cylindrical Nomex® filters from AF Equipment Co., Sunnyvale, Calif.

Pump 334 is used to maintain collection system 108 at a selected pressure. It may be desirable to flow the exhaust of the pump through a scrubber 336 to remove any remaining reactive chemicals before venting into the atmosphere.

The pumping rate is controlled by either a manual needle valve or an automatic throttle valve 338 inserted between pump 334 and filter 332. As the chamber pressure increases due to the accumulation of particles on filter 332, the manual valve or the throttle valve can be adjusted to maintain the pumping rate and the corresponding chamber pressure.

The apparatus is controlled by a computer 350. Generally, the computer controls the light source and monitors the pressure in the reaction chamber. The computer can be used to control the flow of reactants and/or the shielding gas.

The reaction can be continued until sufficient particles are collected on filter 332 such that pump 334 can no longer maintain the desired pressure in the reaction chamber 104 against the resistance through filter 332. When the pressure in reaction chamber 104 can no longer be maintained at the desired value, the reaction is stopped, and filter 332 is removed. With this embodiment, about 1–300 grams of particles can be collected in a single run before the chamber pressure can no longer be maintained. A single run generally can last up to about 10 hours depending on the reactant delivery system, the type of particle being produced and the type of filter being used.

Figure 4:
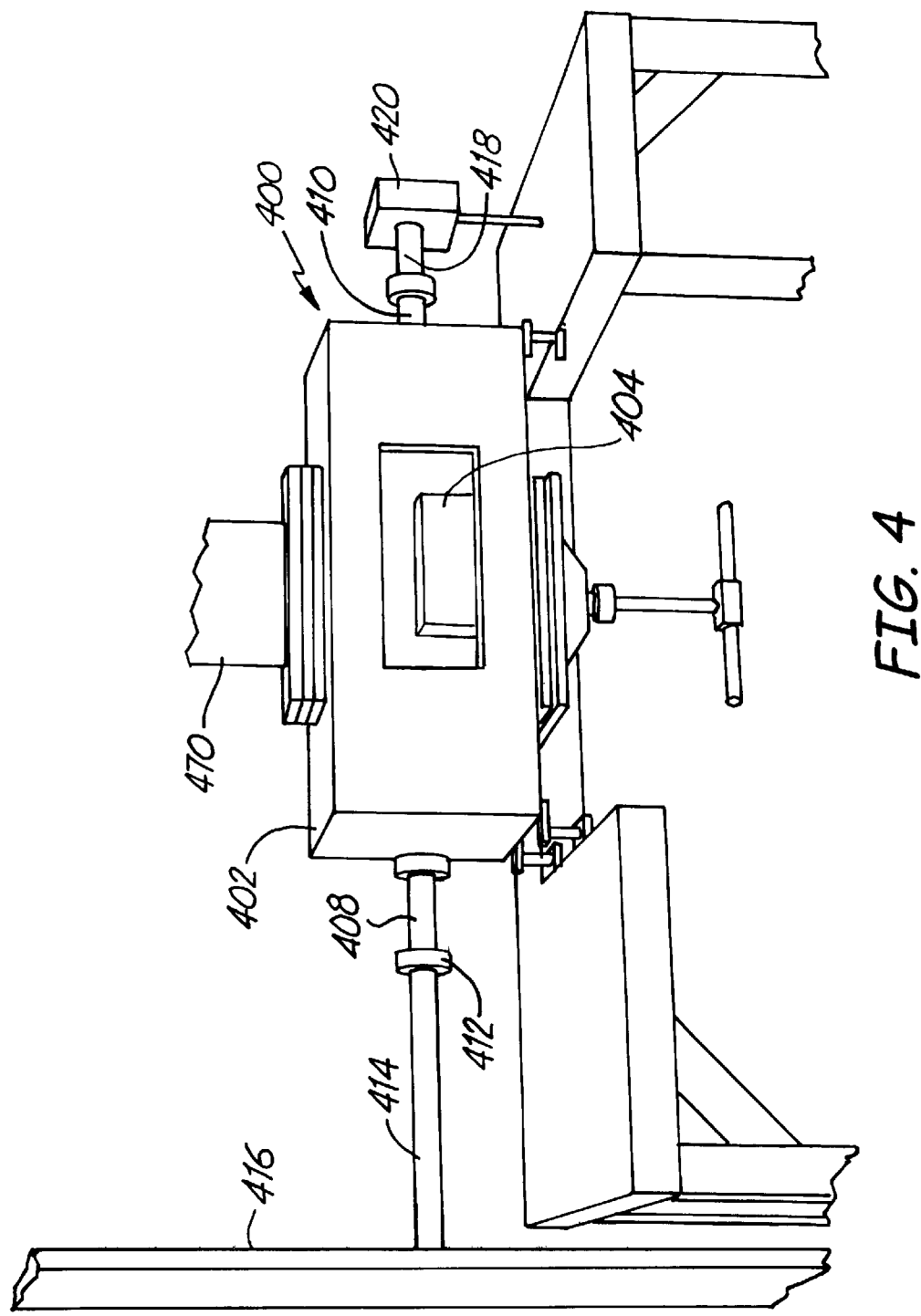
FIG. 4 is a perspective view of an alternative embodiment of a laser pyrolysis apparatus.

An alternative embodiment of a laser pyrolysis apparatus is shown in FIG. 4. Laser pyrolysis apparatus 400 includes a reaction chamber 402. The reaction chamber 402 has a shape of a rectangular parallelapiped. Reaction chamber 402 extends with its longest dimension along the laser beam. Reaction chamber 402 has a viewing window 404 at its side, such that the reaction zone can be observed during operation.

Reaction chamber 402 has tubular extensions 408, 410 that define an optical path through the reaction chamber. Tubular extension 408 is connected with a seal to a cylindrical lens 412. Tube 414 connects laser 416 or other optical source with lens 412. Similarly, Tubular extension 410 is connected with a seal to tube 418, which further leads to beam dump/light meter 420. Thus, the entire light path from laser 416 to beam dump 420 is enclosed.

Figure 5:
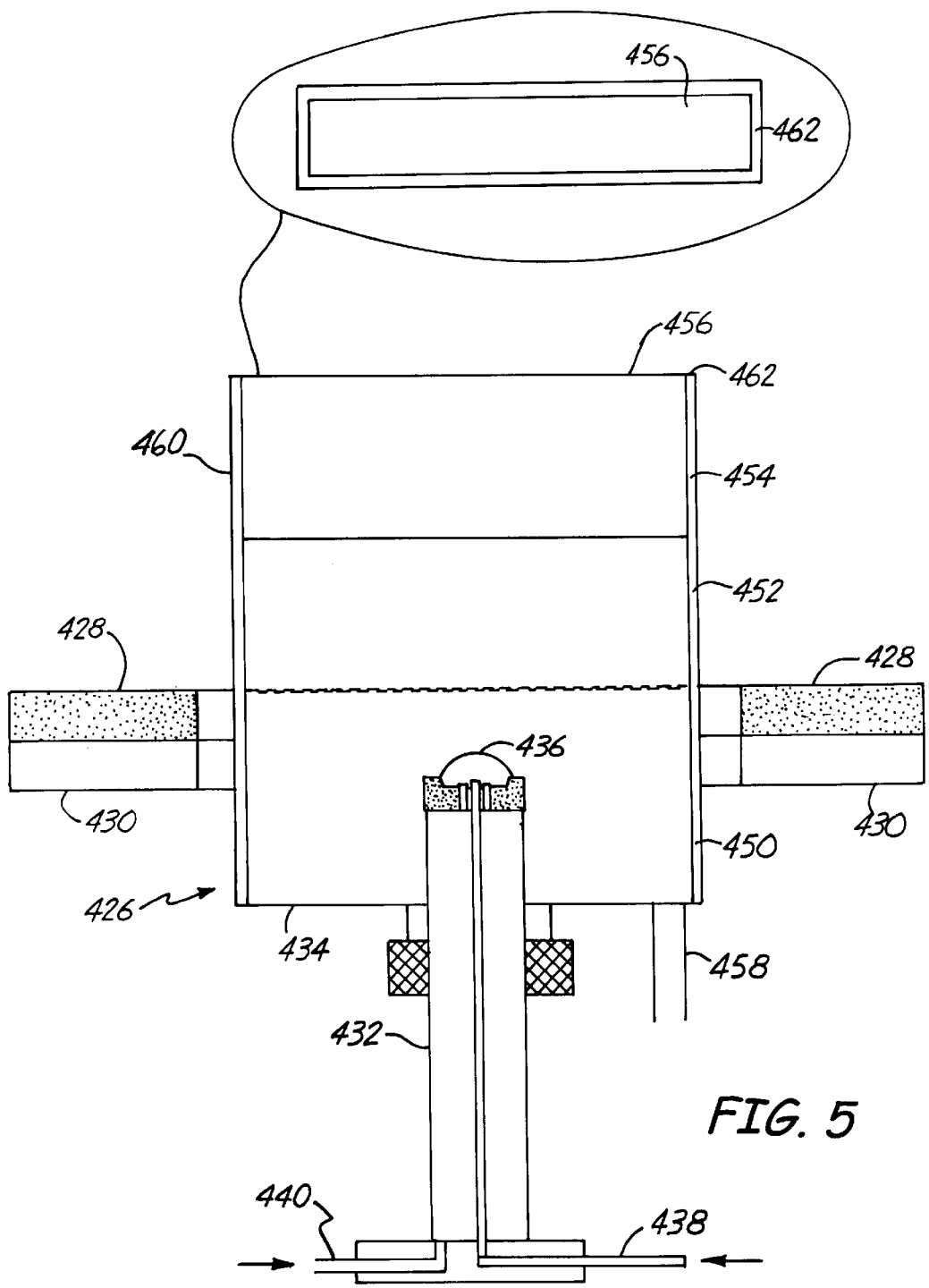
FIG. 5 is a sectional view of the inlet nozzle of the alternative laser pyrolysis apparatus of FIG. 4, the cross section being taken along the length of the nozzle through its center.
Figure 6:
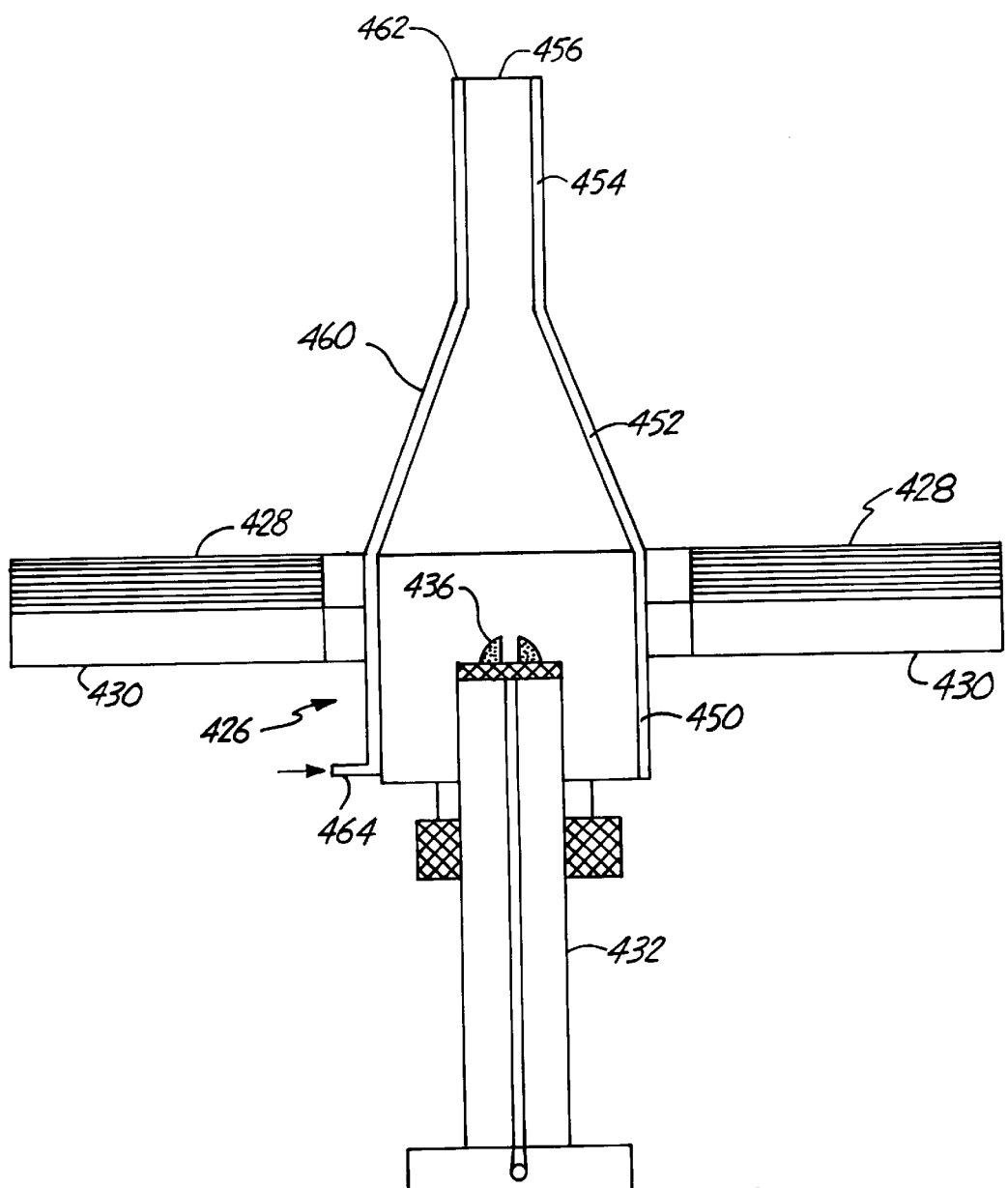
FIG. 6 is a sectional view of the inlet nozzle of the alternative laser pyrolysis apparatus of FIG. 4, the cross section being taken along the width of the nozzle through its center.

Inlet nozzle 426 connects with reaction chamber 402 at its lower surface 428. Inlet nozzle 426 includes a plate 430 that bolts into lower surface 428 to secure inlet nozzle 426. Referring to sectional views in FIGS. 5 and 6, inlet nozzle 426 includes an inner nozzle 432 and an outer nozzle 434. Inner nozzle 432 preferably has a twin orifice internal mix atomizer 436 at the top of the nozzle. Suitable gas atomizers are available from Spraying Systems, Wheaton, Ill. The twin orifice internal mix atomizer 436 has a fan shape to produce a thin sheet of aerosol and gaseous precursors. Liquid is fed to the atomizer through tube 438, and gases for introduction into the reaction chamber are fed to the atomizer through tube 440. Interaction of the gas with the liquid assists with droplet formation.

Outer nozzle 434 includes a chamber section 450, a funnel section 452 and a delivery section 454. Chamber section 450 holds the atomizer of inner nozzle 432. Funnel section 452 directs the aerosol and gaseous precursors into delivery section 454. Delivery section 450 leads to an about 3 inch by 0.5 inch rectangular outlet 456, shown in the insert of FIG. 5. Outer nozzle 434 includes a drain 458 to remove any liquid that collects in the outer nozzle. Outer nozzle 434 is covered by an outer wall 460 that forms an shielding gas opening 462 surrounding outlet 456. Inert gas is introduced through inlet 464.

Referring to FIG. 4, exit nozzle 470 connects to apparatus 400 at the top surface of reaction chamber 402. Exit nozzle 470 leads to a filter chamber such as shown in FIG. 1. The filter chamber connects with a pipe which leads to a pump. A cylindrical filter is mounted at the opening to the pipe. Suitable cylindrical filters are described above.

Another alternative design of a laser pyrolysis apparatus has been described in U.S. Pat. No. 5,958,348 to Bi et al., entitled "Efficient Production of Particles by Chemical Reaction," incorporated herein by reference. This alternative design is intended to facilitate production of commercial quantities of particles by laser pyrolysis. Additional embodiments and other appropriate features for commercial capacity laser pyrolysis apparatuses are described in copending and commonly assigned U.S. patent application Ser. No. 09/362,631 to Mosso et al., entitled "Particle Production Apparatus," incorporated herein by reference.

In one preferred embodiment of a commercial capacity laser pyrolysis apparatus, the reaction chamber and reactant inlet are elongated significantly along the light beam to provide for an increase in the throughput of reactants and products. The original design of the apparatus was based on the introduction of purely gaseous reactants. The embodiments described above for the delivery of aerosol reactants can be adapted for the elongated reaction chamber design. Additional embodiments for the introduction of an aerosol with one or more aerosol generators into an elongated reaction chamber is described in commonly assigned and copending U.S. patent application Ser. No. 09/188,670, now U.S. Pat. No. 6,193,936 to Gardner et al., entitled "Reactant Delivery Apparatuses," incorporated herein by reference.

In general, the laser pyrolysis apparatus with the elongated reaction chamber and reactant inlet is designed to reduce contamination of the chamber walls, to increase the production capacity and to make efficient use of resources. To accomplish these objectives, the elongated reaction chamber provides for an increased throughput of reactants and products without a corresponding increase in the dead volume of the chamber. The dead volume of the chamber can become contaminated with unreacted compounds and/or reaction products. Furthermore, an appropriate flow of shielding gas confines the reactants and products within a flow stream through the reaction chamber. The high throughput of reactants makes efficient use of the laser energy.

The improved reaction system includes a collection apparatus to remove the nanoparticles from the reactant stream. The collection system can be designed to collect particles in a batch mode with the collection of a large quantity of particles pnor to terminating production A filter or the like can be used to collect the particles in batch mode. One embodiment suitable for batch collection is described further below. Alternatively, the collection system can be designed to run in a continuous production node by switching between different particle collectors within the collection apparatus or by providing for removal of particles without exposing the collection system to the ambient atmosphere. A preferred embodiment of a collection apparatus for continuous particle production is described in copending and commonly assigned U.S. patent application Ser. No. 09/107,729, now U.S. Pat. No. 6,270,732 to Gardner et al., entitled "Particle Collection Apparatus And Associated Methods," incorporated herein by reference.

Figure 7:
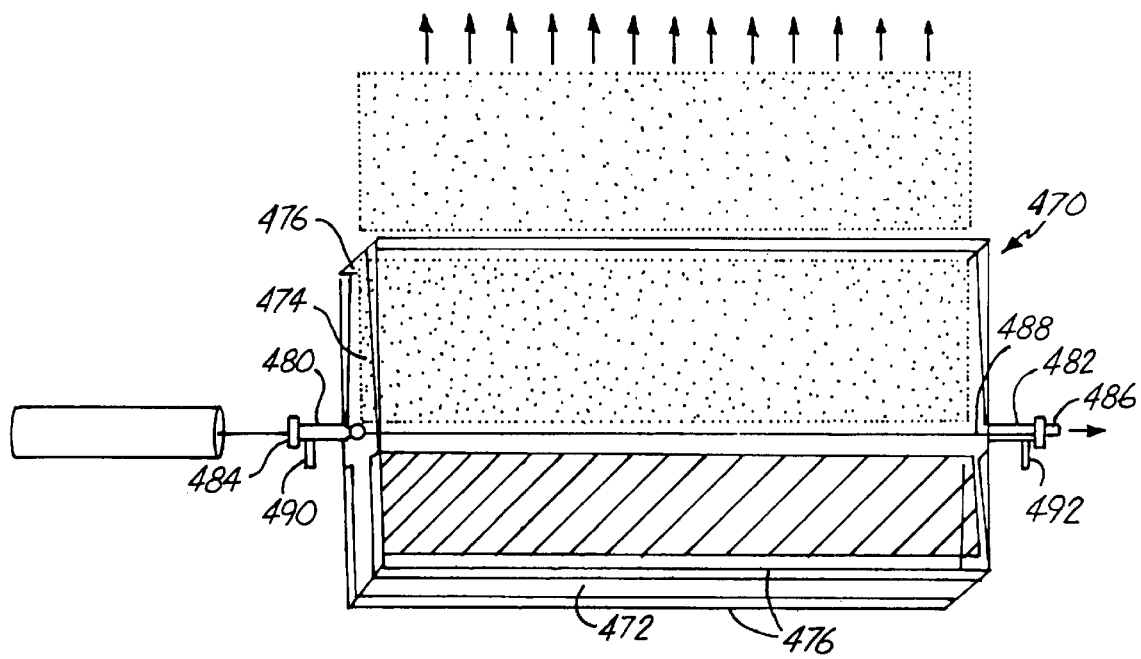
FIG. 7 is a perspective view of an embodiment of an elongated reaction chamber for performing laser pyrolysis.

The design of the improved reaction chamber 470 is shown schematically in FIG. 7. A reactant inlet 472 leads to main chamber 474. Reactant inlet 472 conforms generally to the shape of main chamber 474. Main chamber 474 includes an outlet 476 along the reactant/product stream for removal of particulate products, any unreacted gases and inert gases. Shielding gas inlets 478 are located on both sides of reactant inlet 472. Shielding gas inlets are used to form a blanket of inert gases on the sides of the reactant stream to inhibit contact between the chamber walls and the reactants or products. The dimensions of elongated reaction chamber 474 and reactant inlet 472 preferably are designed for high efficiency particle production. Reasonable dimensions for reactant inlet 472 for the production of ceramic nanoparticles, when used with a 1800 watt $CO_2$ laser, are from about 5 mm to about 1 meter.

Tubular sections 480, 482 extend from the main chamber 474. Tubular sections 480, 482 hold windows 484, 486 to define a light beam path 488 through the reaction chamber 470. Tubular sections 480, 482 can include inert gas inlets 490, 492 for the introduction of inert gas into tubular sections 480, 482.

Figure 8:
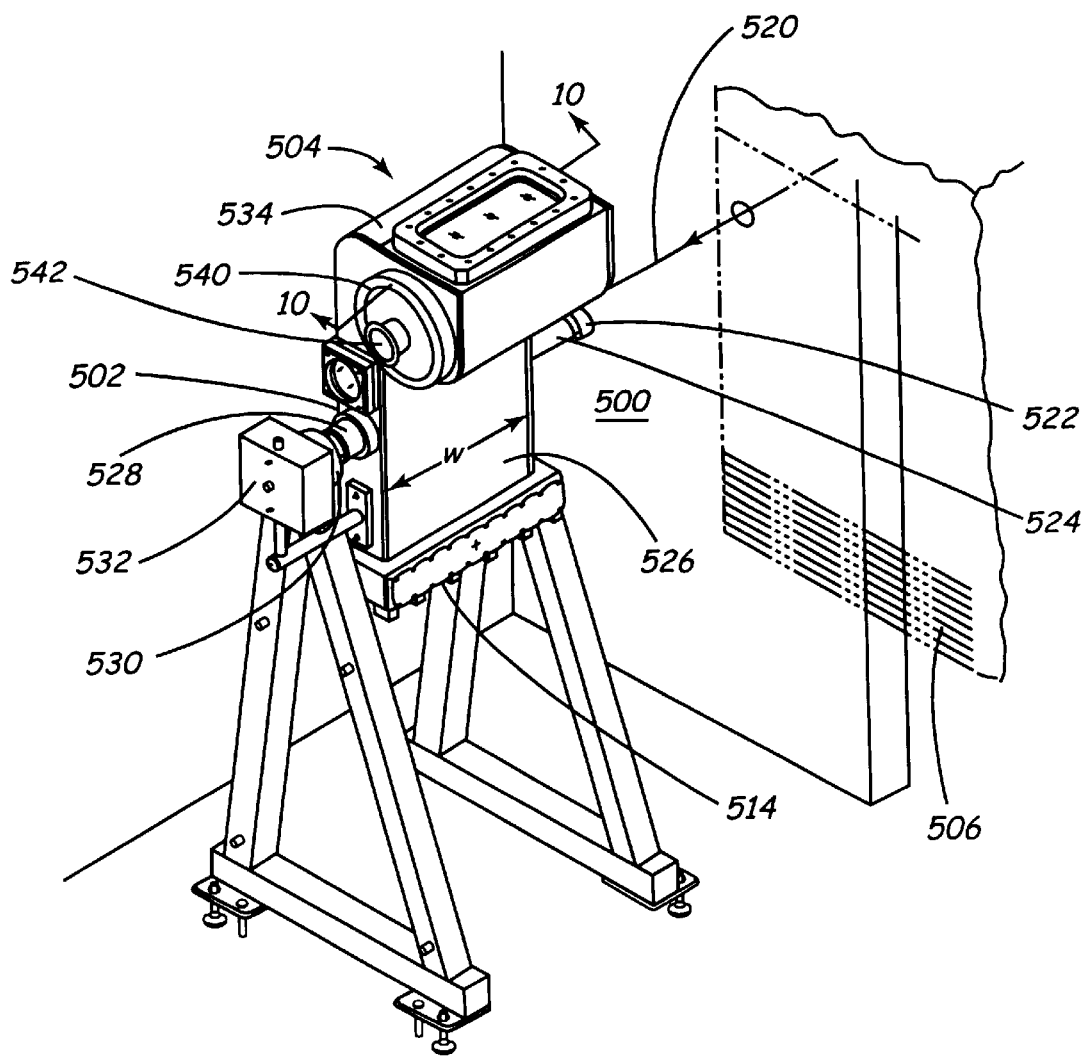
FIG. 8 is a perspective view of an embodiment of an elongated reaction chamber for performing laser pyrolysis.
Figure 9:
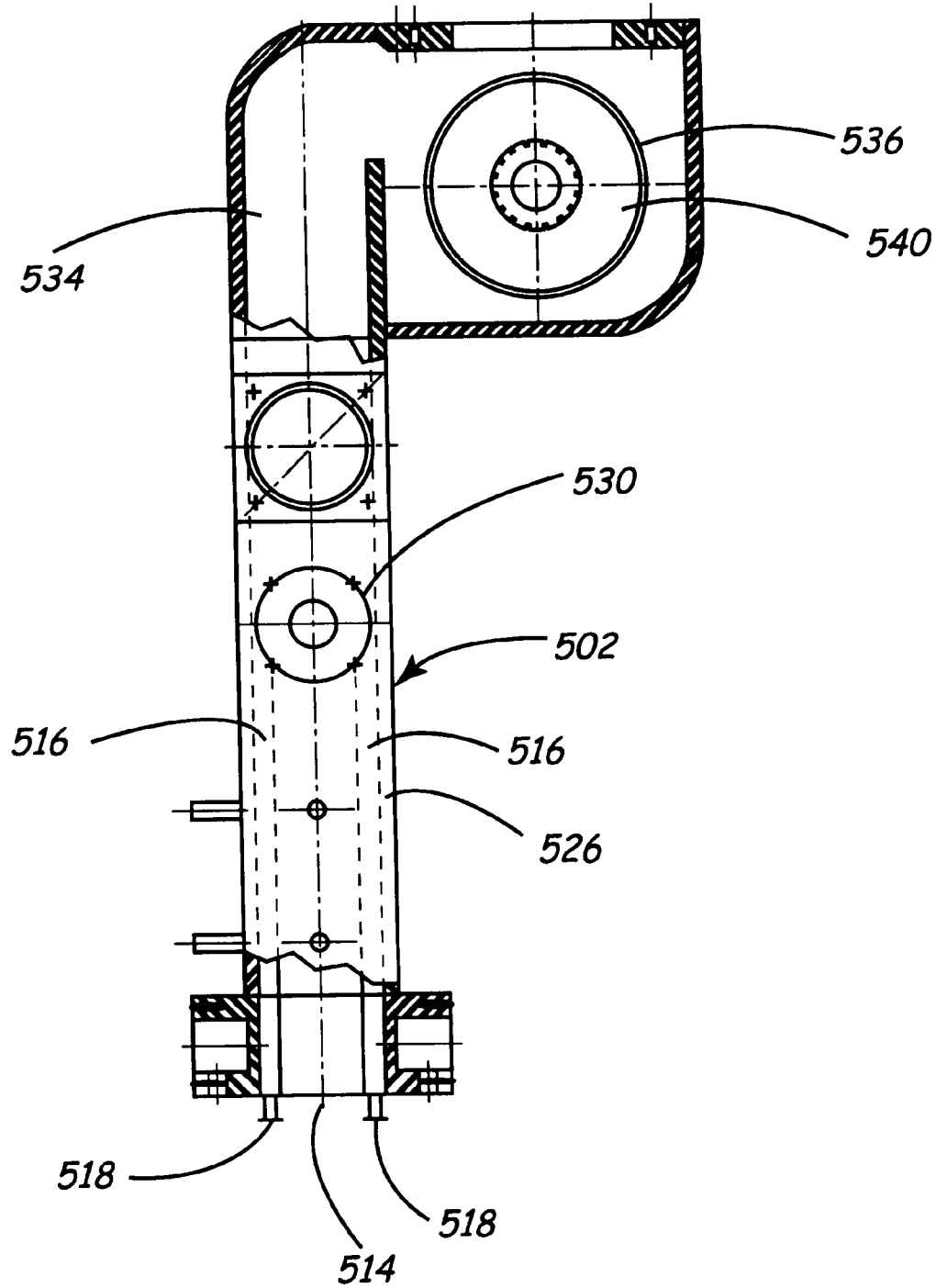
FIG. 9 is a cut away, side view of the reaction chamber of FIG. 8.
Figure 10:
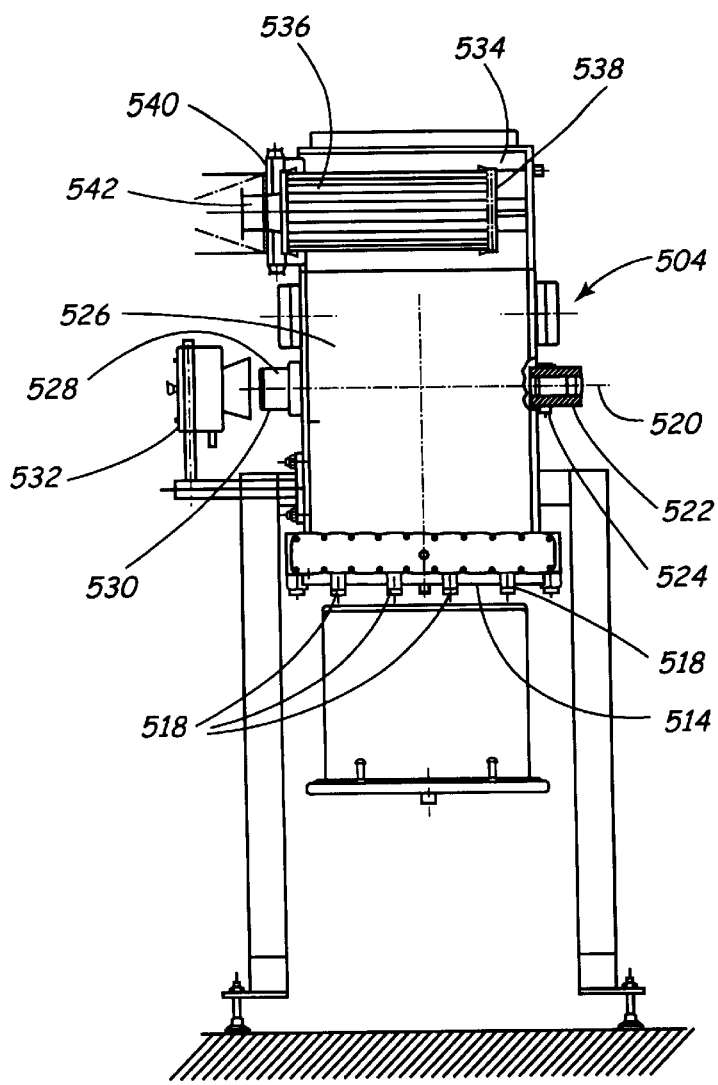
FIG. 10 is a partially sectional, side view of the reaction chamber of FIG. 8, taken along line 10—10 of FIG. 8.

Referring to FIGS. 8–10, a specific embodiment of a laser pyrolysis reaction system 500 with aerosol reactant delivery includes reaction chamber 502, a particle collection system 504, laser 506 and a reactant delivery system 508 (described below). Reaction chamber 502 includes reactant inlet 514 at the bottom of reaction chamber 502 where reactant delivery system 508 connects with reaction chamber 502. In this embodiment, the reactants are delivered from the bottom of the reaction chamber while the products are collected from the top of the reaction chamber. The configuration can be reversed with the reactants supplied from the top and product collected from the bottom, if desired.

Shielding gas conduits 516 are located on the front and back of reactant inlet 514. Inert gas is delivered to shielding gas conduits 516 through ports 518. The shielding gas conduits direct shielding gas along the walls of reaction chamber 502 to inhibit association of reactant gases or products with the walls.

Reaction chamber 502 is elongated along one dimension denoted in FIG. 8 by "w". A laser beam path 520 enters the reaction chamber through a window 522 displaced along a tube 524 from the main chamber 526 and traverses the elongated direction of reaction chamber 502. The laser beam passes through tube 528 and exits window 530. In one preferred embodiment, tubes 524 and 528 displace windows 522 and 530 about 11 inches from the main chamber. The laser beam terminates at beam dump 532. In operation, the laser beam intersects a reactant stream generated through reactant inlet 514.

The top of main chamber 526 opens into particle collection system 504. Particle collection system 504 includes outlet duct 534 connected to the top of main chamber 526 to receive the flow from main chamber 526. Outlet duct 534 carries the product particles out of the plane of the reactant stream to a cylindrical filter 536. Filter 536 has a cap 538 on one end. The other end of filter 536 is fastened to disc 540. Vent 542 is secured to the center of disc 540 to provide access to the center of filter 536. Vent 542 is attached by way of ducts to a pump. Thus, product particles are trapped on filter 536 by the flow from the reaction chamber 502 to the pump. Suitable pumps were described above. Suitable pumps include, for example, an air cleaner filter for a Saab 9000 automobile (Purilator part A44-67), which is wax impregnated paper with Plasticol or polyurethane end caps.

Figure 11:
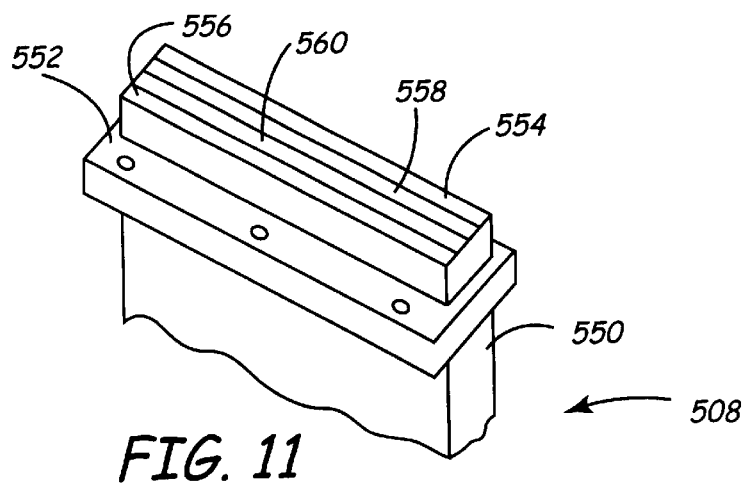
FIG. 11 is a fragmentary, perspective view of an embodiment of a reactant nozzle for use with the chamber of FIG. 8.

In one preferred embodiment, reactant delivery system 508 includes a reactant nozzle 550, as shown in FIG. 11. Reactant nozzle 550 preferably includes an attachment plate 552. Reactant nozzle 550 attaches at reactant inlet 514 with attachment plate 552 bolting to the bottom of main chamber 526. In one preferred embodiment, nozzle 550 has four channels that terminate at four slits 554, 556, 558, 560. Slits 558 and 560 can be used for the delivery of vanadium precursors and other desired components of the reactant stream. Slits 554, 556 can be used for the delivery of inert shielding gas. If a secondary reactant is spontaneously reactive with the vanadium precursor, it can be delivered also through slits 554, 556. One apparatus used for the production of vanadium oxide particles had dimensions for slits 554, 556, 558, 560 of 3 inches by 0.04 inches.

B. Heat Processing

1. Vanadium Oxide Particles

Significant properties of submicron and nanoscale particles can be modified by heat processing. Suitable starting material for the heat treatment include particles produced by laser pyrolysis. In addition, particles used as starting material for a heat treatment process can have been subjected to one or more prior heating steps under different conditions. For the heat processing of particles formed by laser pyrolysis, the additional heat processing can improve the crystallinity, remove contaminants, such as elemental carbon, and/or alter the stoichiometry, for example, by incorporation of additional oxygen or removal of oxygen.

Of particular interest, particles of vanadium oxide can be formed by laser pyrolysis. Then, a subsequent heat treatment can be used to convert these particles into desired forms of high quality vanadium oxide particles. In preferred embodiments, the heat treatment. substantially maintains the submicron or nanoscale size and size uniformity of the particles from laser pyrolysis. In other words, particle size is not compromised by thermal processing.

The starting materials generally can be particles of any size and shape, although submicron and nanoscale particles are preferred starting materials. The nanoscale particles have an average diameter of less than about 1000 nm and preferably from about 5 nm to about 500 nm, and more preferably from about 5 nm to about 150 nm. Suitable nanoscale starting materials have been produced by laser pyrolysis.

The particles are heated in an oven or the like to provide generally uniform heating. The processing conditions generally are mild, such that significant amounts of particle sintering does not occur. Thus, the temperature of heating preferably is low relative to the melting point of the starting material and the product material.

The atmosphere over the particles can be static, or gases can be flowed through the system. The atmosphere for the heating process can be an oxidizing atmosphere, a reducing atmosphere or an inert atmosphere. In particular, for conversion of amorphous particles to crystalline particles or from one crystalline structure to a different crystalline structure of essentially the same stoichiometry, the atmosphere generally can be inert.

Appropriate oxidizing gases include, for example, $O_2$, $O_3$, CO, $CO_2$, and combinations thereof. The $O_2$ can be supplied as air. Reducing gases include, for example, $H_2$. Oxidizing gases or reducing gases optionally can be mixed with inert gases such as Ar, He and $N_2$. When inert gas is mixed with the oxidizing/reducing gas, the gas mixture can include from about 1 percent oxidizing/reducing gas to about 99 percent oxidizing/reducing gas, and more preferably from about 5 percent oxidizing/reducing gas to about 99 percent oxidizing/reducing gas. Alternatively, either essentially pure oxidizing gas, pure reducing gas or pure inert gas can be used, as desired. Care must be taken with respect to the prevention of explosions when using highly concentrated reducing gases.

The precise conditions can be altered to vary the type of vanadium oxide particles that are produced. For example, the temperature, time of heating, heating and cooling rates, the surrounding gases and the exposure conditions with respect to the gases can all be selected to produce desired product particles. Generally, while heating under an oxidizing atmosphere, the longer the heating period the more oxygen that is incorporated into the material, prior to reaching equilibrium. Once equilibrium conditions are reached, the overall conditions determine the crystalline phase of the powders.

A variety of ovens or the like can be used to perform the heating. An example of an apparatus 500 to perform this processing is displayed in FIG. 12. Apparatus 600 includes a jar 602, which can be made from glass or other inert material, into which the particles are placed. Suitable glass reactor jars are available from Ace Glass (Vineland, N.J.). For higher temperatures alloy jars can be used to replace the glass jars. The top of glass jar 602 is sealed to a glass cap 604, with a Teflon® gasket 606 between jar 602 and cap 604. Cap 604 can be held in place with one or more clamps. Cap 604 includes a plurality of ports 608, each with a Teflon® bushing. A multiblade stainless steel stirrer 610 preferably is inserted through a central port 608 in cap 604. Stirrer 610 is connected to a suitable motor.

One or more tubes 612 are inserted through ports 608 for the delivery of gases into jar 602. Tubes 612 can be made from stainless steel or other inert material. Diffusers 614 can be included at the tips of tubes 612 to disburse the gas within jar 602. A heater/furnace 616 generally is placed around jar 602. Suitable resistance heaters are available from Glas-col (Terre Haute, Ind.) One port preferably includes a T-connection 618. The temperature within jar 602 can be measured with a thermocouple 618 inserted through T-connection 618. T-connection 618 can be further connected to a vent 620. Vent 620 provides for the venting of gas circulated through jar 602. Preferably vent 620 is vented to a fume hood or alternative ventilation equipment.

Preferably, desired gases are flowed through jar 602. Tubes 612 generally are connected to an oxidizing gas source and/or an inert gas source. Oxidizing gas, inert gas or a combination thereof to produce the desired atmosphere are placed within jar 602 from the appropriate gas source(s). Various flow rates can be used. The flow rate preferably is between about 1 standard cubic centimeters per minute (sccm) to about 1000 sccm and more preferably from about 10 sccm to about 500 sccm. The flow rate generally is constant through the processing step, although the flow rate and the composition of the gas can be varied systematically over time during processing, if desired. Alternatively, a static gas atmosphere can be used.

For the processing of vanadium oxide particle produced by laser pyrolysis, the temperatures generally range from about 50° C. to about 1200° C. Preferred temperature ranges depend on the starting material and the target product vanadium oxide. For the processing of nanoscale $VO_2$ into crystalline $V_2O_5$, the temperature preferably ranges from about 400° C. to about 1200° C. For the processing, of laser pyrolysis produced $V_2O_5$, the temperature preferably ranges from 300° C. to about 750° C. The heating generally is continued for greater than about 5 minutes, and typically is continued for from about 10 minutes to about 120 hours, in most circumstances from about 10 minutes to about 5 hours. Preferred heating temperatures and times will depend on the particular starting material and target product. Some empirical adjustment may be required to produce the conditions appropriate for yielding a desired material. Typically, submicron and nanoscale powders can be processed at lower temperatures while still achieving the desired reaction. The use of mild conditions avoids significant interparticle sintering resulting in larger particle sizes. To prevent particle growth, the particles preferably are heated for short periods of time at high temperatures or for longer periods of time at lower temperatures. Some controlled sintering of the particles can be performed at somewhat higher temperatures to produce slightly larger, average particle diameters.

As noted above, heat treatment can be used to perform a variety of desirable transformations for nanoparticles. For example, the conditions to convert crystalline $VO_2$ to orthorbornic $V_2O_5$ and 2-D crystalline $V_2O_5$, and amorphous $V_2O_5$ to orthorbombic $V_2O_5$ and 2-D crystalline $V_2O_5$ are describe in U.S. Pat. No. 5,989,514, to Bi et al., entitled "Processing of Vanadium Oxide Particles With Heat," incorporated herein by reference. Conditions for the removal of carbon coatings from metal oxide nanoparticles is described in copending and commonly assigned U.S. patent application Ser. No. 09/123,255, now U.S. Pat. No. 6,387,531, entitled "Metal (Silicon) Oxide/Carbon Composite Particles," incorporated herein by reference. The incorporation of lithium from a lithium salt into metal oxide nanoparticles in a heat treatment process is described in copending and commonly assigned U.S. patent application Ser. No. 09/311,506, now U.S. Pat. No. 6,394,494 to Reitz et al., entitled "Metal Vanadium Oxide Particles," and copending and commonly assigned U.S. patent application Ser. No. 091334,2031 to Kumar et al., entitled "Reaction Methods for Producing Ternary Particles," both of which are incorporated herein by reference.

2. Silver Vanadium Oxide Synthesis

Heat processing has been found to be a useful approach to form nanoscale metal vanadium oxide particles from submicron vanadium oxide particles. In a preferred approach to the thermal formation of metal vanadium oxide particles, vanadium oxide submicron particles first are mixed with a non-vanadium metal compound. The resulting mixture is heated in an oven or other heating apparatus to form a metal vanadium oxide composite particles. The heat processing to incorporate metal into the vanadium oxide lattice can be performed in an oxidizing environment or an inert environment. In either type of environment, the heating step generally results in alteration of the oxygen to vanadium ratio, although the oxidation state of vanadium does not necessarily change. In addition, the heat processing can result in an alteration of the crystal lattice and/or removal of adsorbed compounds on the particles to improve the quality of the particles.

The use of sufficiently mild conditions, i.e., temperatures well below the melting point of the vanadium oxide particles, results in metal incorporation into the vanadium oxide particles without significantly sintering the particles into larger particles. However, some sintering may take place, and the particle morphology can change. The vanadium oxide particles used for the process preferably are submicron vanadium oxide particles. It has been discovered that metal vanadium oxide compositions can be formed from vanadium oxides with an oxidation state of +5 or less than +5.

In particular, vanadium oxides with an oxidation states from +2 (VO) to +5 ($V_2O_5$) can be used to form metal vanadium oxide particles. Suitable forms of vanadium include ammonium vanadate ($NH_4VO_3$), $V_2O_5$, $V_2O_4$ or $VO_2$, $V_2O_3$, $V_3O_7$, $V_4O_9$, $V_6O_{13}$, $V_6O_{14}$, mixtures thereof, and other vanadium oxides. However, crystalline $V_2O_5$ particles are the preferred starting materials for the formation of $Ag_2V_4O_{11}$ since the crystal structures are similar.

Generally, the metal incorporated into the metal vanadium oxide particle is any non-vanadium transition metal. Preferred metals for incorporation into the vanadium oxide include, for example, manganese, cobalt, lithium, nickel, sodium, iron, potassium, magnesium, zinc, calcium, copper, silver, gold, and combinations thereof. The most preferred metals are the coinage metals, copper, silver, gold and combinations thereof. Suitable silver compounds for processing with vanadium oxides include, for example, silver nitrate ($AgNO_3$), silver carbonate ($Ag_2CO_3$), silver cyanide (AgCN), silver(II) oxide (AgO), silver (I) oxide ($Ag_2O$), silver thiocyanate (AgSCN), and mixtures thereof. Suitable copper compounds include, for example, cupric nitrate ($Cu(NO_3)_2$). Alternatively, silver metal powder, copper metal powder or gold metal powder can be used as sources of the respective metals.

Appropriate oxidizing gases include, for example, $O_2$ or air. The reactant gas can be diluted with inert gases such as Ar, He, $N_2$, and mixtures thereof. Alternatively, the gas atmosphere can be exclusively inert gas. Silver vanadium oxide particles have been produced with either an inert atmosphere or an oxidizing atmosphere, as described in the Examples below.

A variety of apparatuses can be used to perform the heat processing of a sample. An embodiment of a suitable apparatus 600 is described above with respect to FIG. 12 for the heat processing of vanadium oxides produced by laser pyrolysis. It has been discovered that stirring at high rates produces the most uniform product silver vanadium oxide. Specifically, the powders are preferably stirred at rates of at least about 50 rpm, preferably at least about 100 rpm, and more preferably from about 150 rpm to about 200 rpm. High mixing speeds leads to a homogenous product and removes agglomerates that can be electrochemically inactive materials, such as $Ag_2O$ and $AgVO_3$. The temperature and time are also significant for incorporation of silver into the lattice. This uniform material has improved performance characteristics in high rate batteries.

In some preferred embodiments, a solution of the metal compound is mixed with the vanadium oxide nanoparticles and evaporated to dryness prior to further heating in the oven to incorporate the metal into the vanadium oxide lattice. Alternatively, the evaporation can be performed simultaneously with the heating to form the metal vanadium oxide composition. For example, silver nitrate and copper nitrate can be applied to the vanadium oxide particles as an aqueous solution. Alternatively, vanadium oxide particles can be mixed with a dry powder of the metal compound or elemental metal powder, thereby avoiding the evaporation step. A sufficient amount of the metal compound or elemental metal powder is added to yield the desired amount of incorporation of the metal into the vanadium oxide lattice. This incorporation of the metal into the vanadium oxide lattice can be checked, for example, through the use of x-ray diffractometry, as described below.

The precise conditions including type of oxidizing gas (if any), concentration of oxidizing gas, pressure or flow rate of gas, temperature and processing time can be selected to produce the desired type of product material. The temperatures generally are mild, i.e., significantly below the melting point of the materials. The use of mild conditions avoids interparticle sintering resulting in larger particle sizes. Some controlled sintering of the particles can be performed in the oven at somewhat higher temperatures to produce slightly larger, average particle diameters.

For the metal incorporation into vanadium oxide, the temperature generally ranges from about 200° C. to about 500° C., preferably from about 200° C. to about 400° C., and more preferably from about 250° C. to about 375° C. The particles preferably are heated for about 5 minutes to about 100 hours and preferably from about 1 hour to about 4 hours. Some empirical adjustment may be required to produce the conditions appropriate for yielding a desired material.

C. Properties of the Particles

A collection of particles of interest generally has an average diameter for the primary particles of less than about 1 micron, alternatively less than about 500 nm, in other embodiments from about 2 nm to about 100 nm, alternatively from about 5 nm to about 75 nm, and in further embodiments from about 5 nm to about 50 nm. Particle diameters generally are evaluated by transmission electron microscopy. Diameter measurements on particles with asymmetries are based on an average of length measurements along the principle axes of the particle.

The primary particles produced by laser pyrolysis usually have a roughly spherical gross appearance. Specifically, crystalline primary particles tend to exhibit growth that is roughly equal in the three physical dimensions to give a gross spherical appearance. Amorphous particles generally have an even more spherical aspect. After heat treatment the particles may take non-spherical shapes reflecting the crystal lattice. Upon closer examination, crystalline particles generally have facets corresponding to the underlying crystal lattice. Specifically, $V_2O_5$ and $Ag_2V_4O_{11}$ tend to form rods, needles, plates or combinations thereof.

Because of their small size, the primary particles tend to form loose agglomerates due to van der Waals and other electromagnetic forces between nearby particles. These agglomerates can be dispersed to a significant degree, if desired. Even though the particles form loose agglomerates, the submicron or nanometer scale of the primary particles is clearly observable in transmission electron micrographs of the particles. Furthermore, the particles can manifest unique properties due to their small size and large surface area per weight of material. For example, vanadium oxide nanoparticles can exhibit surprisingly high energy densities in lithium batteries, as described in U.S. Pat. No. 5,952,125 to Bi et al., entitled "Batteries With Electroactive Nanoparticles," incorporated herein by reference.

The primary particles preferably have a high degree of uniformity in size. Laser pyrolysis, as described above, generally results in particles having a very narrow range of particle diameters. Furthermore, heat processing under suitably mild conditions does not alter the very narrow range of particle diameters. With aerosol delivery of reactants for laser pyrolysis, the distribution of particle diameters is particularly sensitive to the reaction conditions. Nevertheless, if the reaction conditions are properly controlled, a very narrow distribution of particle diameters can be obtained with an aerosol delivery system. As determined from examination of transmission electron micrographs, the primary particles generally have a distribution in sizes such that at least about 95 percent, and preferably 99 percent, of the primary particles have a diameter greater than about 40 percent of the average diameter and less than about 225 percent of the average diameter. Preferably, the primary particles have a distribution of diameters such that at least about 95 percent, and preferably 99 percent, of the primary particles have a diameter greater than about 45 percent of the average diameter and less than about 200 percent of the average diameter.

Furthermore, in preferred embodiments no primary particles have an average diameter greater than about 5 times the average diameter and preferably 4 times the average diameter and more preferably 3 times the average diameter. In other words, the particle size distribution effectively does not have a tail indicative of a small number of particles with significantly larger sizes. This is a result of the small reaction region and corresponding rapid quench of the particles. An effective cut off in the tail of the size distribution indicates that there are less than about 1 particle in $10^6$ have a diameter greater than a specified cut off value above the average diameter. Narrow size distributions, lack of a tail in the distributions can be exploited in a variety of applications.

In addition, the submicron particles produced by the techniques described herein generally have a very high purity level. The particles produced by the above described methods are expected to have a purity greater than the reactants because the laser pyrolysis reaction and, when applicable, the crystal formation process tends to exclude contaminants from the particle. Furthermore, crystalline particles produced by laser pyrolysis have a high degree of crystallinity. Similarly, the crystalline particles produced by heat processing have a high degree of crystallinity. Certain impurities on the surface of the particles may be removed by heating the particles to achieve not only high crystalline purity but high purity overall.

Vanadium oxide has an intricate phase diagram due to the many possible oxidation states of vanadium. Vanadium is known to exist in various oxidation states up to $V^{+5}$. The energy differences between the oxides of vanadium in the different oxidation states is not large. Therefore, it is possible to produce stoichiometric mixed valence compounds. Known forms of vanadium oxide include, for example, VO, $VO_{1.27}$, $V_2O_3$, $V_3O_5$, $VO_2$, $V_6O_{13}$, $V_4O_9$, $V_3O_7$, and $V_2O_5$. Laser pyrolysis alone or with additional heating can successfully yield single phase vanadium oxide in many different oxidation states, as evidenced by x-ray diffraction studies. These single phase materials are generally crystalline, although some amorphous nanoparticles have been produced. The heat treatment approaches are useful for increasing the oxidation state of vanadium oxide particles or for converting vanadium oxide particles to more ordered phases.

There are also mixed phase regions of the vanadium oxide phase diagram. In the mixed phase regions, particles can be formed that have domains with different oxidation states, or different particles can be simultaneously formed with vanadium in different oxidation states. In other words, certain particles or portions of particles have one stoichiometry while other particles or portions of particles have a different stoichiometry. Mixed phase nanoparticles have been formed. Non-stoichiometric materials also can be formed.

The vanadium oxides generally form crystals with octahedral or distorted octahedral coordination. Specifically, VO, $V_2O_3$, $VO_2$, $V_6O_{13}$ and $V_3O_7$ can form crystals with octahedral coordination. In addition, $V_3O_7$ can form crystals with trigonal bipyramidal coordination. $V_2O_5$ forms crystals with square pyramidal crystal structure. $V_2O_5$ recently also has been produced in a two dimensional crystal structure. See, M. Hibino, et al., Solid State Ionics 79:239–244 (1995), incorporated herein by reference. When produced under appropriate conditions, the vanadium oxide nanoparticles can be amorphous. The crystalline lattice of the vanadium oxide can be evaluated using x-ray diffraction measurements.

Metal vanadium oxide compounds can be formed with various stoichibmetries. U.S. Pat. No. 4,310,609 to Liang et al., entitled "Metal Oxide Composite Cathode Material for High Energy Density Batteries," incorporated herein by reference, describes the formation of $Ag_{0.7}V_2O_{5.5}$, $AgV_2O_{5.5}$, and $Cu_{0.7}V_2O_{5.5}$. The production of oxygen deficient silver vanadium oxide, $AgO_{0.7}V_2O_5$, is described in U.S. Pat. No. 5,389,472 to Takeuchi et al., entitled "Preparation of Silver Vanadium Oxide Cathodes Using Ag(O) and $V_2O_5$ as Starting Materials," incorporated herein by reference. The phase diagram of silver vanadium oxides of the formula $Ag_xV_2O_y$, $0.35 \leq x \leq 2.0$, $4.5 \leq y \leq 6.0$, involving stoichiometric admixtures of $V_2O_5$ and $AgVO_3$, are described in published European Patent Application 0 689 256A, entitled "Cathode material for nonaqueous electrochemical cells," incorporated herein by reference.

D. Batteries

Figure 13:
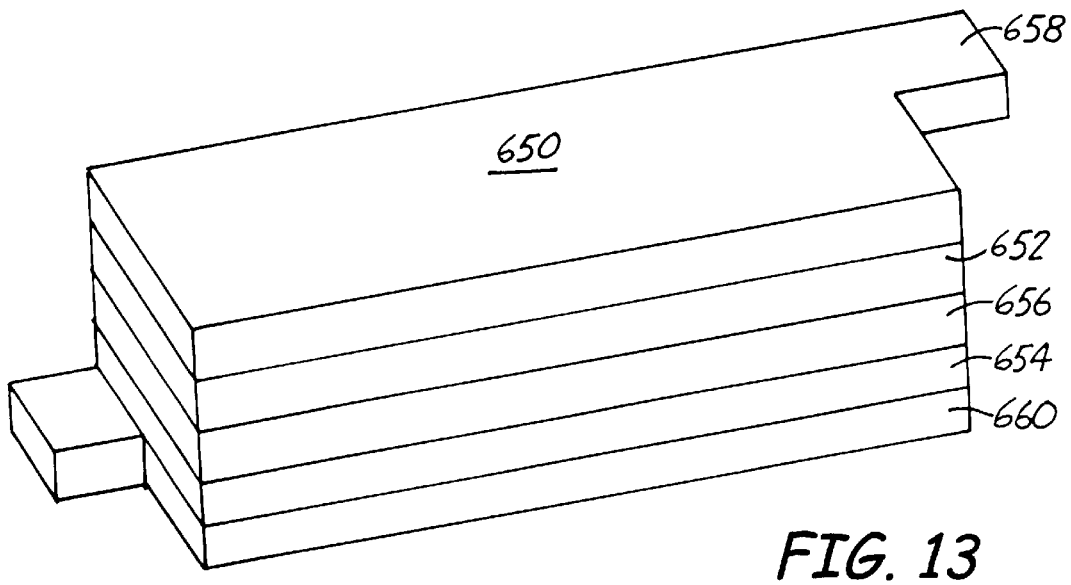
FIG. 13 is a schematic, perspective view of a battery of the invention.

Referring to FIG. 13, battery 650 has a negative electrode 652, a positive electrode 654 and separator 656 between negative electrode 652 and positive electrode 654. A single battery can include multiple positive electrodes and/or multiple negative electrodes. Electrolyte can be supplied in a variety of ways as described further below. Battery 650 preferably includes current collectors 658, 660 associated with negative electrode 652 and positive electrode 654, respectively. Multiple current collectors can be associated with each electrode if desired.

Lithium has been extensively used in primary and secondary batteries. An attractive feature of metallic lithium is that it is the most electropositive metal. Certain forms of metal, metal oxides and mixed metal oxides are known to incorporate lithium ions into its structure through intercalation or similar mechanisms such as topochemical absorption. Intercalation of lithium ions can take place in suitable forms of a vanadium oxide lattices as well as the lattice of metal vanadium oxide compositions. Suitable metal vanadium oxide nanoparticles for incorporation into batteries can be produced by thermal processing of vanadium oxide nanoparticles with a metal compound or by direct laser pyrolysis synthesis of metal vanadium oxide nanoparticles with or without additional heat processing.

In particular, lithium intercalates into the vanadium oxide lattice or metal vanadium oxide lattice during discharge of the battery. The lithium leaves the lattice upon recharging, i.e., when a voltage is applied to the cell such that electric current flows into the positive electrode due to the application of an external EMF to the battery. Positive electrode 654 acts as a cathode during discharge, and negative electrode 652 acts as an anode during discharge of the cell Metal vanadium oxide particles can be used directly in a positive electrode for a lithium based battery to provide a cell with a high energy density. Appropriate metal vanadium oxide particles can be an effective electroactive material for a positive electrode in either a lithium or lithium ion battery.

Positive electrode 654 includes electroactive nanoparticles, metal vanadium oxide particles held together with a binder such as a polymeric binder. Particles for use in positive electrode 654 generally can have any shape, e.g., roughly spherical particles or elongated particles, such as plate shaped, needle shaped or oblong shaped particles. Vanadium oxide nanoparticles are know to exhibit surprisingly high energy densities, as described in U.S. Pat. No. 5,952,125, entitled "Batteries With Electroactive Nanoparticles," incorporated herein by reference. The production of manganese oxide nanoparticles is described in copending and commonly assigned U.S. patent application Ser. No. 09/188,770 to Kumar et al. filed on Nov. 9, 1998, entitled "Metal Oxide Particles," incorporated herein by reference.

While some electroactive materials are reasonable electrical conductors, a positive electrode generally includes electrically conductive particles in addition to the electroactive nanoparticles. These supplementary, electrically conductive particles generally are also held by the binder. Suitable electrically conductive particles include conductive carbon particles such as carbon black, metal particles such as silver particles, metal fibers such as stainless steel fibers, and the like.

High loadings of particles can be achieved in the binder. Particles preferably make up greater than about 80 percent by weight of the positive electrode, and more preferably greater than about 90 percent by weight. The binder can be any of various suitable polymers such as polyvinylidene fluoride, polyethylene oxide, polyethylene, polypropylene, polytetrafluoro ethylene, polyacrylates, ethylene-(propylene-diene monomer) copolymer (EPDM) and mixtures and copolymers thereof.

It has been discovered that the processing to produce the electrode can be effective to improve the rate performance of the resulting battery. Previous approaches for the production of cathodes incorporating silver vanadium oxides have involved the mixing together of the silver vanadium oxide powders, the electrically conductive powders and the polymer and subsequent pressing of the materials at high pressure to form a cathode. Improved rate behavior was obtained, as described below in the examples, by blending silver vanadium oxide powder, the electrically conductive powder, a polymer binder and a solvent to form a mixture. Sufficient solvent is added to provide for blending of the mixture. The mixture is mixed in a homogenizer or the like. An example of a suitable homogenizer is a T25 Basic Ultra-TURRAX Laboratory Dispenser/Homogenizer from IKA Works, available from VWR Scientific, San Francisco, Calif. Homogenizers are known in the art to operate at low shear compared with other mixing approaches. Under low shear mixing using a homogenizer, it has been observed that better dispersion of the particles is obtained. Preferably, the mixture is blended at high speeds for about 1 minute to about 20 minutes, preferably for about 2 minutes to about 10 minutes, and even more preferably from about 2 minutes to about 5 minutes. Low shear homogenizing can be conducted at greater than about 5000 rpm, and generally at about 8000 rpm to about 24,000 rpm, which correspond to low settings on standard homogenizers. Homogenizing at higher rpm would be expected to yield similar results. Mixing in the homogenizer provides an extremely well dispersed blend of the components. Following mixing in the homogenizer, the mixture is filtered, kneaded and rolled into a cathode sheet. The cathode is cut into a desired shape and then dried to removed the solvent. The drying can be performed in an oven, preferably a vacuum oven. After drying, the cathode is pressed, preferably under pressures of about 3 to about 3.5 tons per $cm_2$. Following pressing of the cathode material, the cathode is preferably stored in a dry environment.

In the case of lithium batteries, the negative electrode can include lithium metal or lithium alloy metal either in the form of a foil, grid or metal particles in a binder. Lithium ion batteries use particles of a composition that can intercalate lithium. The particles are held with a binder in the negative electrode. Suitable intercalation compounds include, for example, graphite, synthetic graphite, coke, mesocarbons, doped carbons, fullerenes, tin alloys, $SnO_2$ and mixtures and composites thereof.

Current collectors 658, 660 facilitate flow of electricity from battery 650. Current collectors 658, 460 are electrically conductive and generally made of metal such as nickel, stainless steel, aluminum and copper and can be metal foil or preferably a metal grid. Current collector 658, 660 can be on the surface of their associated electrode or embedded within their associated electrode.

Separator element 656 is electrically insulating and provides for passage of ions. Ionic transmission through the separator provides for electrical neutrality throughout the cell. The separator prevents electroactive compounds in the positive electrode from contacting electroactive compounds in the negative electrode, which would result in a short circuit.

A variety of materials can be used for the separator. For example, the separator can be formed from glass fibers that form a porous matrix. Preferred separators are formed from polymers such polyethylene and polypropylene. Suitable commercial polymer separators include Celgard from Hoechst Celanese, Charlotte, N.C. Polymer separators are porous to provide for ionic conduction. Alternatively, polymer separators can be solid electrolytes formed from polymers such as polyethylene oxide. Solid electrolytes incorporate electrolyte into the polymer matrix to provide for ionic conduction with or without the need for liquid solvent.

Electrolytes for lithium batteries or lithium ion batteries can include any of a variety of lithium salts. Preferred lithium salts have chemically inert anions. Suitable lithium salts include, for example, lithiumhexafluorophosphate, lithiumhexafluoroarsenate, lithium bis(trifluoromethyl sulfonyl imide), lithium trifluoromethanesulfonate, lithiumtris (trifluoromethyl sulfonyl)methide, lithium tetrafluoroborate, lithium perchlorate, lithium tetrachloroaluminate, lithium chloride and combinations thereof.

If a liquid solvent is used to dissolve the electrolyte, the solvent preferably is inert and does not dissolve the electroactive materials. Generally appropriate solvents include, for example, propylene carbonate, dimethyl carbonate, diethyl carbonate, 2-methyl tetrahydrofuran, dioxolane, tetrahydrofuran, methyl ethyl carbonate, dipropyl carbonate, ethylene carbonate, γ-butyrolactone, dimethyl sulfoxide, acetonitrile, formamide, dimethyl formamide, triglyme (tri (ethylene glycol)dimethyl ether), diglyme (diethylene glycol dimethyl ether), DME (glyme or 1,2-dimethoxyethane or ethylene glycol dimethyl ether), nitromethane and mixtures thereof.

Preferred embodiments involve the production of high rate batteries. Improved rate performance has been found with the use of highly ion conductive solvents for forming the electrolytes. Particularly preferred solvents include a mixture of DME with another solvent, in particular an alkylene carbonate. For example, one preferred mixture is a approximate 1:1 volume ratio of DME and ethylene carbonate or propylene carbonate. Generally, preferred solvents include from about 25 volume percent DME to about 75 percent DME and more preferably from about 33 volume percent to about 66 volume percent DME with the remainder being an alkylene carbonate.

The shape of the battery components can be adjusted to be suitable for the desired final product, for example, a coin cell, a rectangular construction or a cylindrical battery. The battery generally includes a casing with appropriate portions in electrical contact with current collectors and/or electrodes of the battery. If a liquid electrolyte is used, the casing should prevent the leakage of the electrolyte. The casing can help to maintain the battery elements in close proximity to each other to reduce resistance within the battery. A plurality of battery cells can be placed in a single case with the cells connected either in series or in parallel.

During the discharge of the silver vanadium oxide battery, lithium ions are inserted into the cathode host matrix. Over a first voltage plateau discharging down to about 2.6 volts, silver ions are reduced to silver metal and are expelled from the system. Also, over the first plateau, vanadium is reduced from $V^{+5}$ to $V^{+4}$. Over a second voltage plateau, vanadium is reduced from $V^{+4}$ to $V^{+3}$. Lithium insertion over the second plateau is effectively an insertion into lithium vanadium oxide since the silver has been reduced and expelled. At the end of the first plateau, the electrical resistance decreases relative to the initial resistance because of the production of silver metal. Then, the electrical resistance increases because of further lithium intercalation into $Li_x$-$V_yO_z$. This increase in resistance results in a voltage drop, often termed a voltage delay, at the beginning of the second voltage plateau starting at about 2.6 volts under pulse conditions.

Voltage delay also is a function of additional anode and cathode effects. With respect to the anode, most metals form a protective layer on the surface that blocks access to the surface of the metal. Electrolytes with organic solvents and lithium salts are reduced to low potentials to form lithium salts on the surface of he metal, i.e., a passivating layer. As the layer becomes thicker, it takes longer to penetrate the layer and the voltage drop is greater. In addition to a shortage of suitable electrically conductive material in the cathode, $Li^+$—$Li^+$ interactions contribute to the cathode becoming more electrically resistive, therefore, causing the steep drop in voltage at the second plateau.

In addition, while not wanting to be limited on theory, nanoscale silver vanadium oxide has desirable properties regarding rate properties. The nanoscale silver vanadium oxide particles allow the intercalation of lithium with shorter diffusion times. Large particle silver vanadium oxide is rate limited due to longer diffusion times of the lithium into the $Li_xV_yO_z$ composition. Shorter diffusion times in the nanoscale particles lead to reduced $Li^+$—$Li^+$ repulsions. Also, the path to insert lithium ions into the host $Li_xV_yO_z$ lattice is much more tortuous in large micron size or larger particles than in submicron or nanoscale particles.

Besides the use of preferred nanoscale silver vanadium oxide, voltage delay can be reduced or avoided by including a higher percentage of electrochemically inert, electrically conductive particles, such as graphite or silver particles. While the inclusion of conductive particles can avoid a voltage drop, total capacity is lost. However, by using particles with improved specific capacity, it is possible to use additional electrically conductive particles without decreasing the capacity below desired values. In preferred embodiments, there are at least 8 weight percent inert electrically conductive particles in the cathode, preferably at least about 10 weight percent, more preferably at least about 15 weight percent and even more preferably at least about 20 weight percent inert electrically conductive particles in the cathode.

The high rate capable batteries described herein are especially useful in the production of medical devices, in particular defibrillators. Defibrillators provide pulses of electricity to a patient's heart to induce regular beating. Lithium batteries incorporating silver vanadium oxide have found important commercial use in the production of implantable defibrillators. For use in defibrillators, the battery cells deliver high current pulses in rapid succession.

In order to test the batteries for their performance in defibrillators, it is desirable to test the batteries in pulse operation. A convenient pulse sequence for the battery discharge is a pulse train with a series of four pulses every 30 minutes. Each series of pulses includes four-10 second-25 mA/cm$^2$ pulses spaced 15 seconds apart. Using this pulse pattern, the battery is drained to a voltage of 1.5 V. Using this pulse pattern, preferred batteries have a pulsed specific capacity of at least 275 mAh/g, preferably at least about 285 mAh/g, more preferably at least about 300 mAh/g and even more preferably at least about 320 mAh/g. At higher current densities of 50 mA/cm$^2$, 60 mA/cm$^2$, 70 mA/cm$^2$, 80 mA/cm$^2$ and 90 mA/cm$^2$, the total specific capacity decreases slightly as the current densities increases. Similarly, the batteries preferably have a pulsed specific energy of at least about 575 mWh/g, more preferably at least about 600 mWh/g, even more preferably at least about 625 mWh/g, and even more preferably at least about 640 mWh/g. The high rate capabilities of the batteries described herein are also reflected in maximum specific powers. In some embodiments, the batteries can have a maximum specific power of at least about 1.5 W/g and, alternatively, at least about 2.1 W/g. The specific power depends on the rate with higher rates yielding more power since the current is higher.

Defibrillators generally have other functions. For example, an implantable defibrillator has a monitoring function such that it can sense when a patient's heart undergoes fibrillation. In addition, combination pace makers and defibrillators can be constructed. Combination implantable devices can include a separate battery, such as a lithium iodide battery or carbon monofluoride battery, to perform the ongoing pacing operations such that the high rate silver vanadium oxide battery could be reserved for pulsed operation without depleting the battery.

Using preferred high rate batteries described herein, the batteries also have high capacities under low amperage drain. Thus, these batteries can be used effectively for other functions, such as the monitoring function or a pacing function, without impairing the defibrillating function. The silver vanadium oxide can replace other batteries used for these other functions. In particular, it is desirable to use a silver vanadium oxide battery for both monitoring functions and pulse defibrillating operation.

In preferred embodiments, the silver vanadium oxides batteries in low amperage operation exhibit an specific capacity greater than about 340 milliampere hours per gram have been produced. Preferred silver vanadium oxide particles exhibit an specific capacity upon discharge to 2 volts greater than about 275 milliampere hours per gram, and preferably greater than about 280 milliampere hours per gram similarly, preferred silver vanadium oxide particles exhibit an energy density upon discharge to 1.5 volts greater than about 315 milliampere hours per gram, and preferably greater than about 325 milliampere hours per gram. In addition, preferred silver vanadium oxide particles exhibit an energy density upon discharge to 1.0 volts greater than about 360 milliampere hours per gram, and preferably greater than about 370 milliampere hours per gram. As described in the examples below, specific capacities up to about 425 mAh/g upon discharge to 1 volt have been achieved with thinner electrodes.

EXAMPLES

Example 1

Laser Pyrolysis Synthesis of Vanadium Oxide and Vanadium Carbide Particles

Crystalline $VO_2$, amorphous $V_2O_5$, $V_8C_7$ particles were produced by laser pyrolysis. The reaction was carried out in a chamber comparable to the chamber shown in FIGS. 8–11. The VOCl$_3$ (Strem Chemical, Inc., Newburyport, Mass.) precursor vapor was carried into the reaction chamber by bubbling Ar gas through the VOCl$_3$ liquid stored in a container at 40° C., or for higher production rate runs up to 400 g/h by a flash vaporizer (ATMI-ADCS) at 175° C. with Argon carrier gas flowing. The reactant gas mixture containing VOCl$_3$, nitrogen and C$_2$H$_4$ was introduced into the reactant gas nozzle for injection into the reactant chamber. C$_2$H$_4$ gas was used as a laser absorbing gas. Nitrogen was used as an inert gas to moderate the reaction.

For the production of vanadium oxides, some reactions were performed with water as the oxygen source (secondary reactant) and other reactions were carried out with O$_2$ as the oxygen source. For runs using O$_2$ as the secondary reactant, O$_2$ was introduced with the VOCl$_3$, N$_2$ and C$_2$H$_4$ compounds through the central two slits of the nozzle in FIG. 11. For runs using H$_2$O as the secondary reactant, H$_2$O was introduced along with N$_2$ in the outer two slits of the nozzle in FIG. 11 while VOCl$_3$, N$_2$ and C$_2$H$_4$ were introduced through the central two slits such that the VOCl$_3$ and H$_2$O were not mixed until they were within the reaction zone.

Representative reaction conditions for the production of vanadium oxide particles and vanadium carbide particles are described in Table 1.

TABLE 1

| Phase | V$_8$C$_7$ | VO$_2$ | V$_2$O$_5$ |
|---|---|---|---|
| BET Surface Area | 81 | 45 | 18 |
| Pressure (Torr) | 150 | 150 | 150 |
| N$_2$-Win (slm) | 10 | 10 | 10 |
| N$_2$-Sld. (slm) | 2.5 | 2.5 | 2.5 |
| Ethylene (slm) | 2.5 | 2.5 | 2.5 |
| Carrier Gas - N$_2$ (slm) | 1.4 | 1.4 | 1.4 |
| Water (g/min.) | 0 | 0 | 0.3–1.2 |
| Oxygen (slm) | 1.84 | 0.67 | 0 |
| Laser Power - Input (watts) | 780 | 780 | 780 | sccm=standard cubic centimeters per minute
slm=standard liters per minute
Argon–Win.=argon flow through inlets 490, 492
Argon–Sld.=argon flow through slots 554, 556

Figure 14:
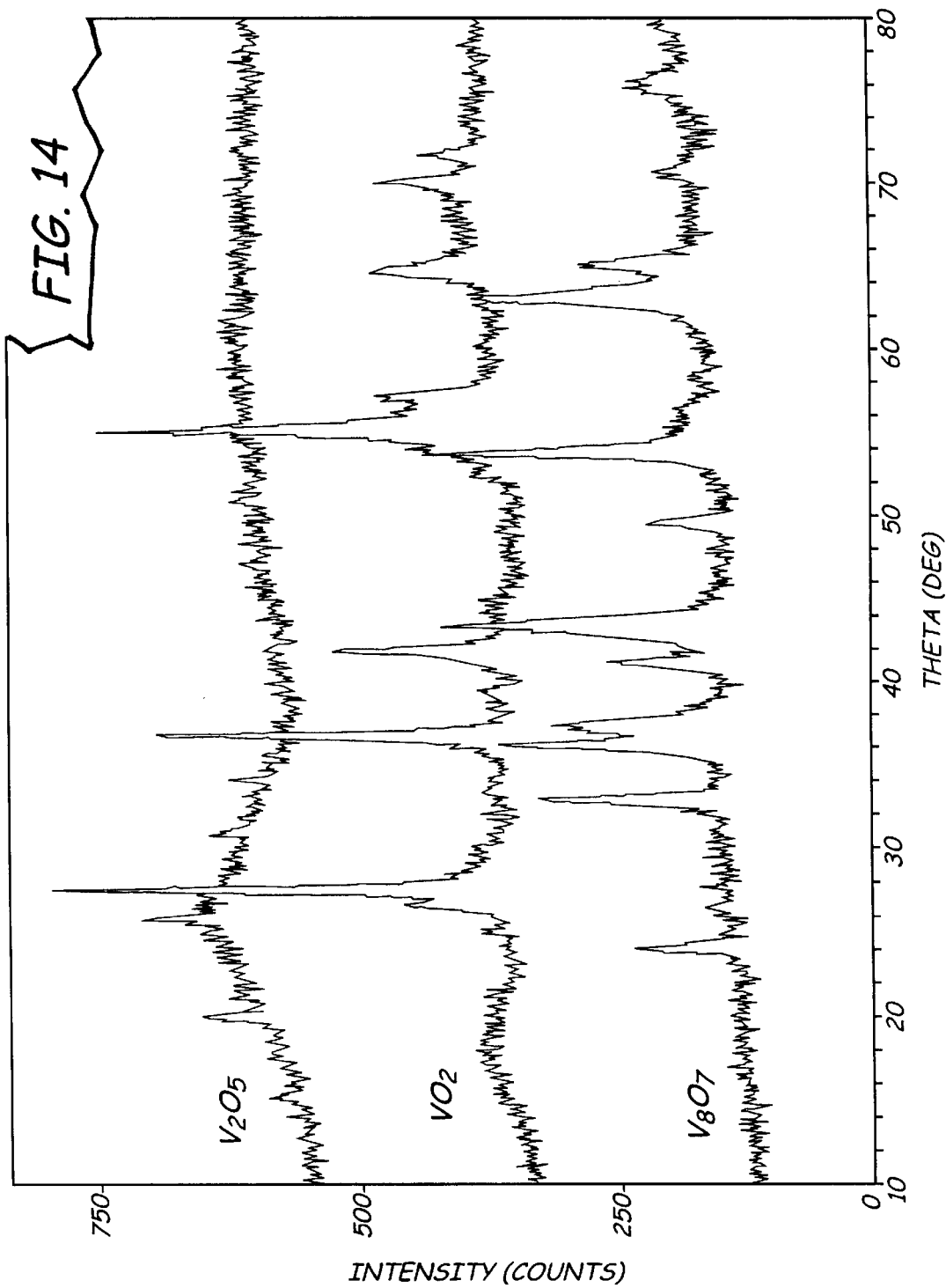
FIG. 14 is a plot of x-ray diffractogram for vanadium composition particles produced by laser pyrolysis.

An x-ray diffractogram of product nanoparticles produced under the conditions in Table 1 are shown in FIG. 14. The amorphous V$_2$O$_5$ could be identified based on an amorphous profile expected for V$_2$O$_5$, an elemental analysis and a characteristic greenish-yellow color. Process conditions were systematically changed to identify conditions where phase pure vanadium compounds are synthesized in the reaction. In particular, VO$_2$, V$_2$O$_3$, V$_8$C$_7$, V$_6$O$_{13}$, V$_3$O$_7$, and V$_2$O$_5$ were produced using the reaction system described in this example. To produce V$_2$O$_3$ rather than VO$_2$, higher ethylene flows were used with comparable ethylene to O$_2$ ratios. The carbide V$_8$C$_7$ was produced by decreasing the ethylene to O$_2$ ratio values from 1 to 1.5, as long as the ethylene flow rate was not too high. The ethylene to vanadium ration is also significant. At higher ethylene flow rates V$_2$O$_3$ is formed. Evidently, at ethylene to O$_2$ ratio values from 1 to 1.5 and ethylene flow rates that are not too high, less H$_2$ is formed. H$_2$ can strip Cl from the vanadium precursor to form VO which leads to vanadium oxide production. V$_2$O$_5$ and V$_6$O$_{13}$ are lower temperature phases that were produced with water as the oxygen source. With water as the oxygen source, higher laser powers (600–800 W) results in a majority V$_6$O$_{13}$ with small amounts of VO$_2$, and lower laser powers (400–600W) results in amorphous V$_2$O$_5$.

Example 2

Heat Treatment of Vanadium Oxide Particles

The starting materials for the heat treatment were vanadium oxide or vanadium carbide particles produced under the conditions described in Table 1. Following heat treatment all of the particles were converted to submicron crystalline V$_2$O$_5$.

Figure 12:
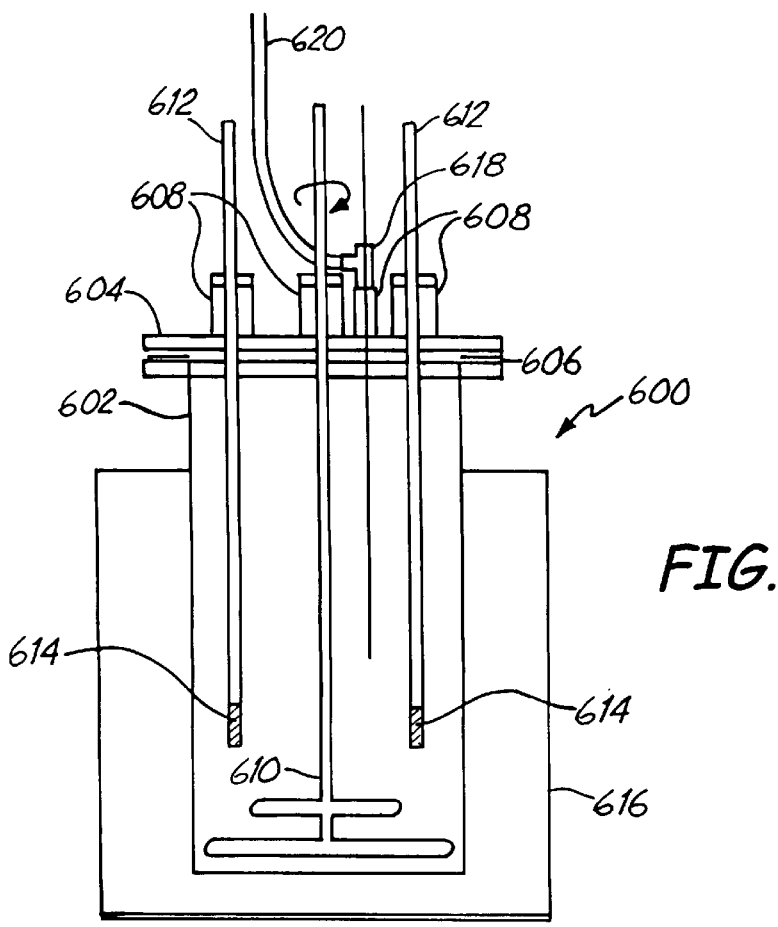
FIG. 12 is a schematic, sectional view of an apparatus for heat treating nanoparticles, in which the section is taken through the center of the apparatus.

The nanoparticles were heat treated at in a stirred oven roughly as shown in FIG. 12. The particles were fed in batches of about 80 grams into the glass jar. Oxygen was fed through a ⅛" stainless steel tube at an oxygen flow rate of 155 cc/min. A mixing speed of 150–200 rpm was used to constantly mix the powders during the heat treatment. Except for the amorphous V$_2$O$_5$ powders, the powders were heated for 4 hours to 16 hours at 350–400° C. The amorphous V$_2$O$_5$ powders were only heated for 30 minutes to 2 hours to convert them to crystalline V$_2$O$_5$. A heating rate of 4° C./minute was used to heat the samples to the target temperatures.

Figure 15:
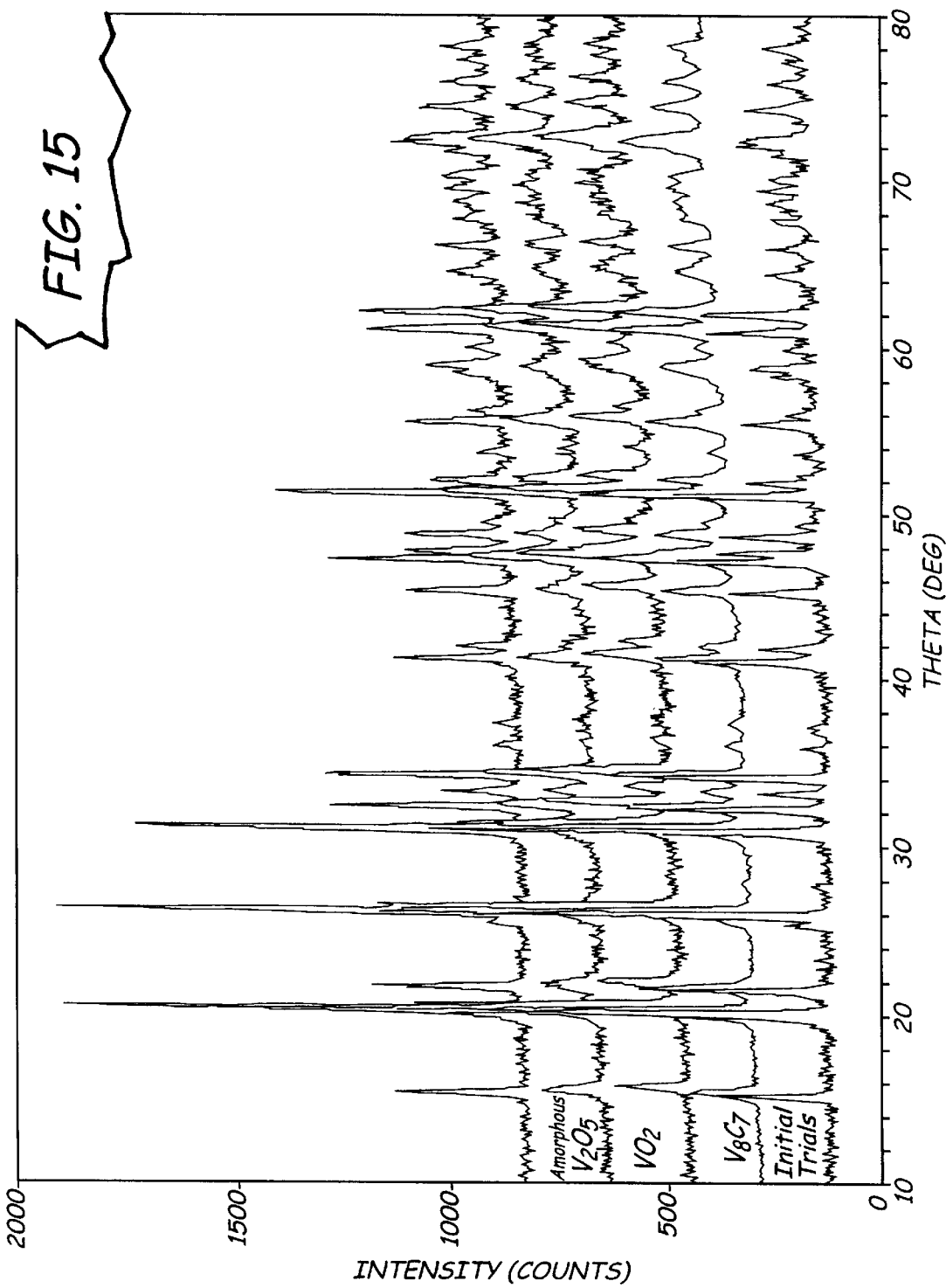
FIG. 15 is a plot of an x-ray diffractogram of $V_2O_5$ produced by heat treatment of vanadium composition particles produced by laser pyrolysis.

The resulting nanoparticles were single phase crystalline V$_2$O$_5$ particles. A representative x-ray diffractogram of these materials is shown in FIG. 15. The top diffractogram was produced using commercial V$_2$O$_5$. The second, third and fourth from the top were produced with crystalline V$_2$O$_5$ made by heat treating amorphous V$_2$O$_5$, VO$_2$ and V$_8$C$_7$, respectively. The bottom diffractogram was generated using crystalline V$_2$O$_5$ produced from some initial samples of vanadium oxides produced with the apparatus in Example 1. From the x-ray diffractogram, it could be determined that the resulting particles were orthorhombic V$_2$O$_5$.

Transmission electron microscopy (TEM) photographs were obtained of representative nanoparticles following heat treatment. The morphology of the V$_2$O$_5$ particles produced from V$_8$C$_7$ included a mixture of rods, needles and plates. The morphology of the particles produced from VO$_2$ was a mixture of rods and plates. The morphology of the particles produced from V$_2$O$_5$ was plates with a≠b≠c. For all three materials, the particles had an average diameter significantly less than about 500 nm and generally on the order of 250 nm or less. The asymmetric particles had an average for the longer dimensions alone on the order of 500 nm, although the averages for the smaller dimensions alone generally were on the order of 100 nm of less. Thus, the character of the starting material significantly effected the morphology of the resulting V$_2$O$_5$ particles when produced under mild heating conditions.

Example 3

Production of Silver Vanadium Oxide Particles from Crystalline V$_2$O$_5$ Particles This example demonstrates the production of submicron silver vanadium oxide using vanadium oxide particles as starting material. The silver vanadium oxide is produced by heat processing. Silver vanadium oxide particles were produced from the crystalline V$_2$O$_5$ particles of Example 2 produced from VO$_2$ of Example 1. Silver vanadium oxide was also produced from crystalline V$_2$O$_5$ produced from amorphous V$_2$O$_5$. This silver vanadium oxide yielded comparable improved battery results to those described in this example.

For each sample, about 50 g of silver nitrate (AgNO$_3$) (EM Industries, Hawthorne, N.Y.) was mixed with about 50 g of V$_2$O$_5$ nanoparticles produced as described in Example 2. The resulting mixture was mixed an automatic mortar & pestle for 5–7 minutes. Then, the samples of the mixed powder were placed separately into the stirred oven shown in FIG. 12. Oxygen gas was flowed through the tube at flow rate of 100 standard cubic centimeters per minute (sccm). A mixing speed of 150–200 rpm was used to constantly mix the powders during the heat treatment. The samples were heated at approximately the rate of 5° C./min. and cooled at the rate of approximately 5° C./min. The samples were heated at 350–400° C. for 2 to 4 hours.

For comparison, some silver vanadium oxide was produced in a tube furnace. About 4 grams of the mixed vanadium oxide and silver nitrate was placed in a 2 ¼ inch boat inside a tube furnace. O$_2$ was flowed through the tube at a rate of 120 sccm. The heating rate was 20° C. per minute. The samples were again heated for 350 to 400° C. for two to four hours.

Figure 16:
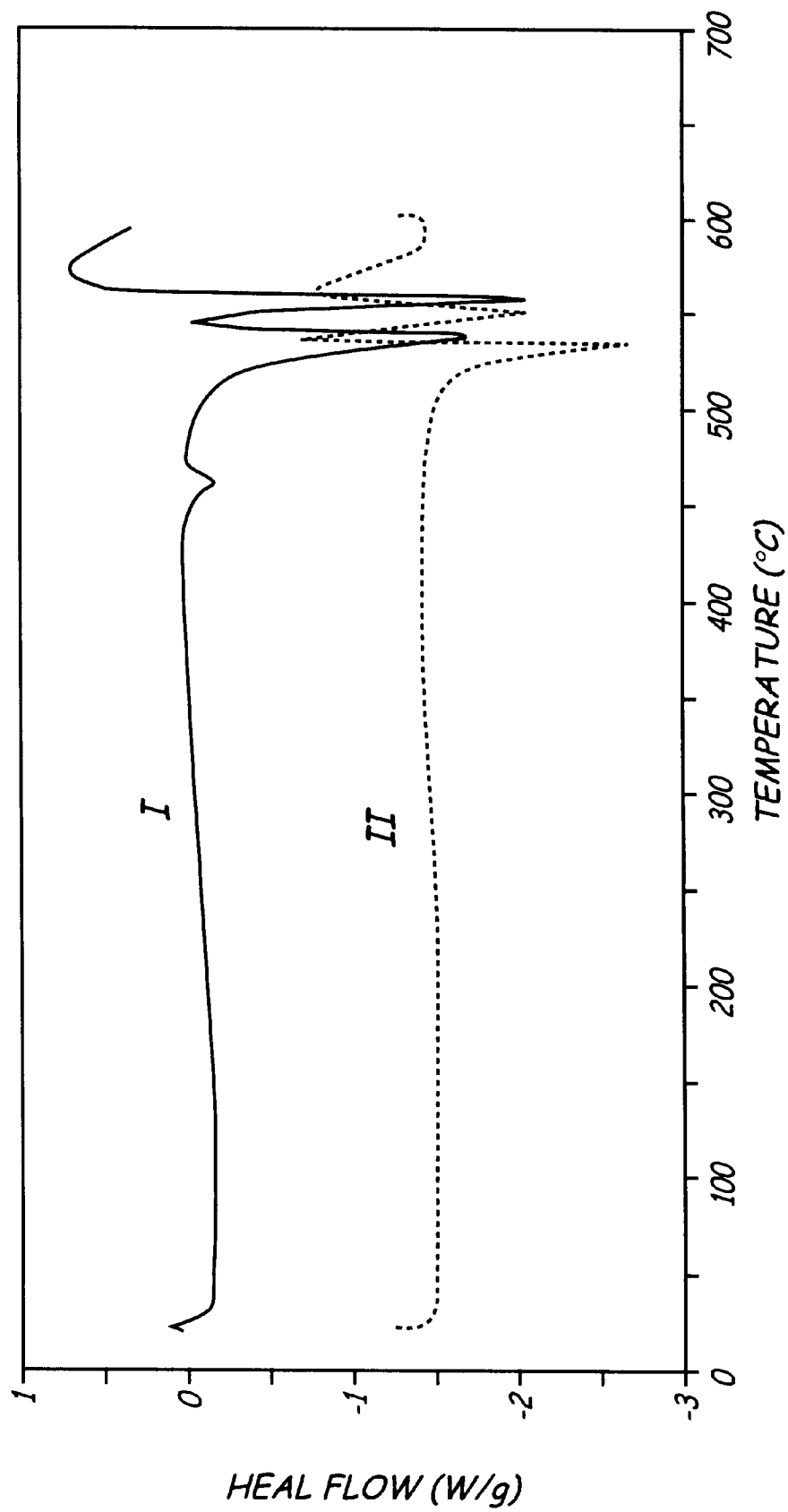
FIG. 16 is a plot of differential scanning calorimetry measurements for two silver vanadium oxide samples.

The structure of the particles following heating was examined by x-ray diffraction using the Cu(Kα) radiation line on a Rigaku Miniflex x-ray diffractometer and differential scanning calorimetry (DSC) using a model Universal V2.3C DSC apparatus from TA Instruments, Inc., New Castle, Del. The DSC plot for the tube furnace heat treatment indicates incomplete conversion to silver vanadium oxide. The DSC plot for the stirred vessel silver vanadium oxide shows only two isotherms, corresponding to a peritectic transformation at about 558° and a eutectic point at about 545°. These transitions in silver vanadium oxide Ag$_2$V$_4$O$_{11}$ are described further in P. Fleury, Rev. Chim. Miner., 6(5) 819 (1969). A comparison of the DSC scans for the tube furnace heat treated sample and the stirred vessel sample are shown in FIG. 16. The samples heated in the tube furnace have a peak at about 460° C. indicative of silver metavanadate.

Figure 17:
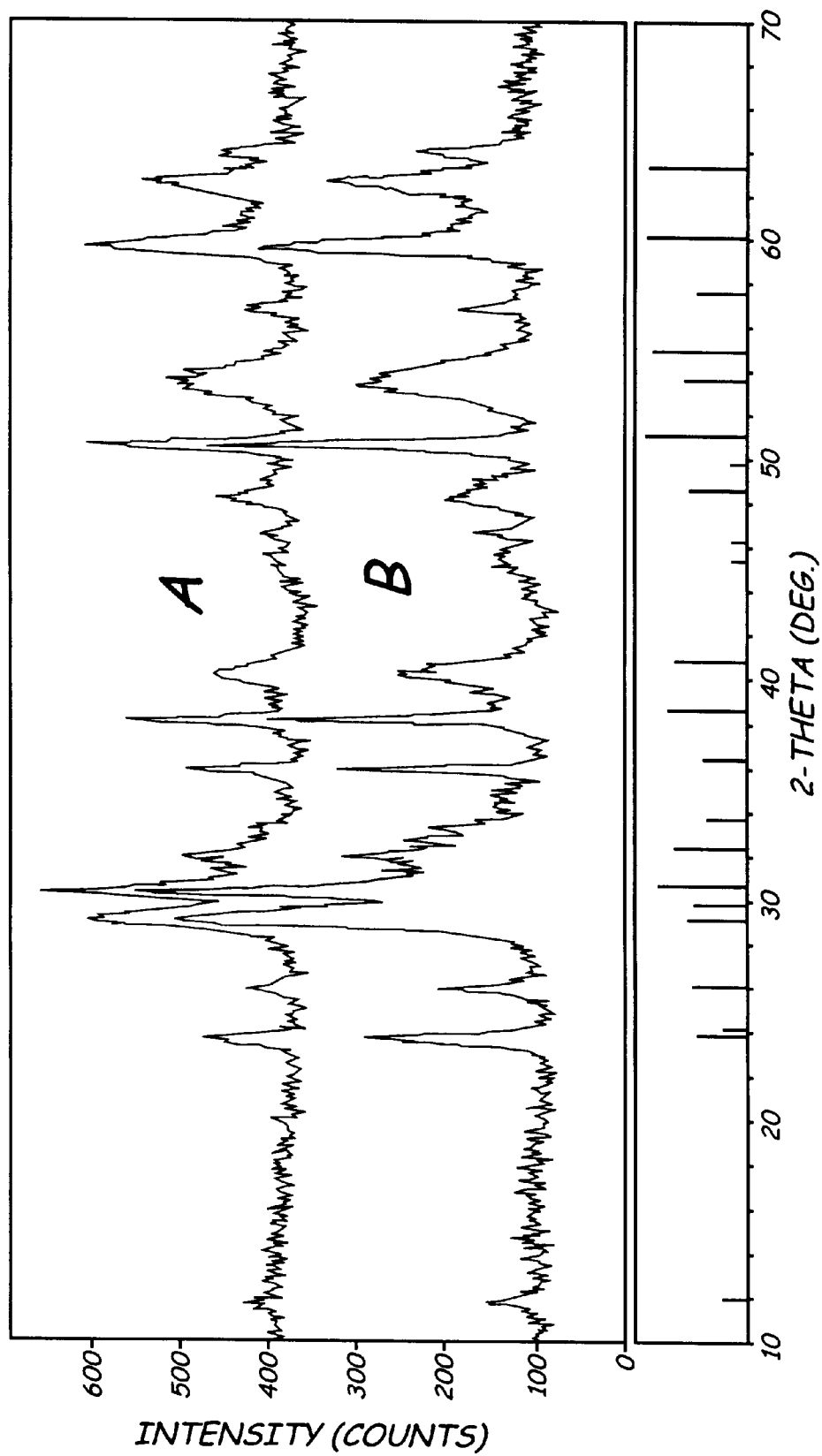
FIG. 17 is a plot of two x-ray diffractograms for silver vanadium oxide samples.

The representative x-ray diffractograms for the silver vanadium oxide samples produced in the stirred vessel (A) and the tube furnace (B) are shown in FIG. 17. All of the heated samples produce diffractograms with peaks indicating the presence of Ag$_2$V$_4$O$_{11}$. The diffractograms indicate a single phase material since the amount of AgVO$_3$ is so small that it is no detectable by x-ray diffraction.

To produce a test cell incorporating vanadium oxide powders or silver vanadium oxide powders produced according to one of the Examples above, the powders were incorporated into a cathode structure. A desired quantity of silver vanadium oxide particles was weighed and combined with predetermined amounts of graphite powder (Chuetsu Graphite Works, CO., Osaka, Japan) and acetylene black powder (Catalog number 55, Chevron Corp.) as conductive diluents, and a 60% by weight dispersion of Teflon® (Catalog No. 44,509-6, Aldrich Chemical Co., Milwaukee, Wis. in water as a binder. The graphite preferably has a BET surface area of at least 50 m$^2$/g, preferably at least about 100 m$^2$/g, more preferably at least about 150 m$^2$/g and even more preferably at least about 200 m$^2$/g. The acetylene black is preferably over 55 percent compressed and more preferably is 100 percent compressed. For processing, isopropyl alcohol was added as a dispersant to allow mixing of the components. Enough isopropyl alcohol was added to cover the solids. In some examples described below, graphite powder was replaced by silver nanoparticles produced as described in copending and commonly assigned U.S. patent application Ser. No. 09/311,506, now U.S. Pat. No. 6,394,494 to Reitz et al., entitled "Metal Vanadium Oxide Particles," incorporated herein by reference. The silver vanadium oxide cathode composition following drying included 70% by weight silver vanadium oxide nanoparticles, 10% by weight graphite, 10% by weight acetylene black, and 10% by weight Teflon®.

Cells were also produced similarly with vanadium oxide particles except using polyvinylidene fluoride (PVDF) as the binder. A 10 percent PVDF solution included PVDF (type 714, Elf Atochem North America, Inc., Philadelphia, Pa.) dissolved in 1-methyl-2-pyrroidinone (Aldrich Chemical Co., Milwaukee, Wis.). The vanadium oxide cathode composition following drying included 80% by weight silver vanadium oxide nanoparticles, 5% by weight graphite, 5% by weight acetylene black, and 10% by weight PVDF.

The resulting combination of electro-active powders, electrically conductive powders, binder and liquid was mixed well in-a homogenizer, T25 Basic ULTRA-TURRAX Laboratory Dispenser/Homogenizer (number 27950-01), from IKA Works, using a coarse 18 mm diameter dispersing tool (number 0593400). The homogenizer was operated for about 5 minutes. Some processing was performed for comparison in a blender rather than in the homogenizer, as described further below. The blender was a WARING Blender Model 34BL97 with a stainless steel mini-container, model MC-2. The examples below demonstrate that low shear mixing in a homogenizer disperses the small particles in the composition better than high shear mixing in a blender.

After homogenizing, the mixture was filtered, kneaded and rolled into a sheet with a selected thickness. An approximately two-square centimeter area disk was cut from the sheet. The disk was then dried and pressed in a 1.6 cm diameter die set at 12,000 pounds for 45–60 seconds to form a dense pellet. The pressed pellet was vacuum dried and weighed. Unless otherwise specified, the dried thickness was 0.46–0.5 mm.

Vanadium Oxide Battery Examples

Figure 18:
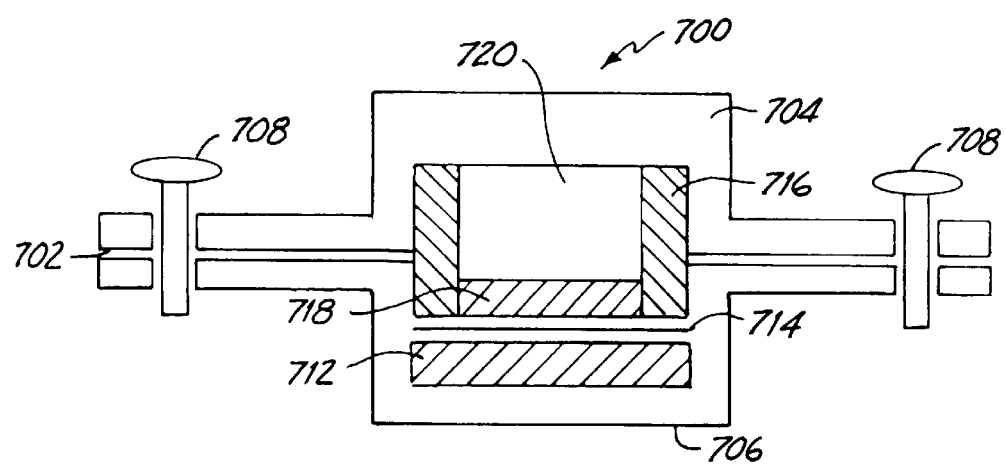
FIG. 18 is a schematic sectional view of a test cell taken two screws of the apparatus.

The cathodes formed from the vanadium oxide powders were formed into cells for testing. The vanadium oxide samples were tested in a cell 700 with an airtight two-electrode configuration shown in FIG. 18. The casing 702 for the sample battery was obtained from Hohsen Co., Osaka, Japan. The casing included a top portion 704 and a bottom portion 706, which are secured with four screws 708. The two other screws not shown in FIG. 18 are behind the two screws shown. Lithium metal (Alfa/Aesar, Ward Hill, Mass.) was used as a negative electrode 712. Negative electrode 712 was placed within the bottom portion 706. A separator 714, Celgard® 2400 (Hoechst Celanese, Charlotte, N.C.), was placed above the lithium metal. A Teflon® ring 716 was placed above separator 714. A positive electrode 718 was placed mesh side up within Teflon® ring 716. An aluminum pellet 720 was placed above positive electrode 718, and electrolyte was added. The electrolyte from EM Industries (Hawthorne, N.Y.) was 1M LiPF$_6$ in 1:1 ethylene carbonate/dimethyl carbonate. A Teflon® o-ring is located between top portion 704 and bottom portion 706 to electrically insulate the two electrodes. Similarly, screws 708 are placed within a Teflon® sleeve to electrically insulate screws 708 from top portion 704 and bottom portion 706. Electrical contact between the battery tester and cell 700 is made by way of top portion 704 and bottom portion 706.

The samples were tested with a discharge rate of 0.11 mA/cm$^2$ and a charge rate of 0.08 mA/cm$^2$, and cycled between 1.8V to 3.4V at 25° C. The measurements were controlled by an Maccor Battery Test System, Series 4000, from Maccor, Inc. (Tulsa, Okla.). The charging/discharging profiles were recorded, and the discharge capacity of the active material during each cycle was obtained.

The energy density is evaluated by the integral over the discharge time of the voltage multiplied by the current divided by the mass of the active material. The discharge current during testing was 0.2 mA corresponding to a current density of 0.11 mA/cm$^2$, and the charging current during testing was 0.16 mA corresponding to a current density of 0.08 mA/cm$^2$. The active material mass ranged from about 7 to about 10 mg.

Example 4

Discharge Results with Lithium Batteries Formed with Submicron $V_2O_5$

In this example the energy density and the specific capacity of the crystalline $V_2O_5$ produced as described above in Example 2 is evaluated.

Cells were produced for the four $V_2O_5$ materials described in Example 2 (labeled samples 1–4, respectively) along with commercial $V_2O_5$ from Cerac, Milwaukee, Wis. (labeled sample 5). For the five cells, the open circuit voltages immediately after sealing were about 3.4 volts. The cells were tested at room temperature using a constant current discharge, as described above.

Figure 19:
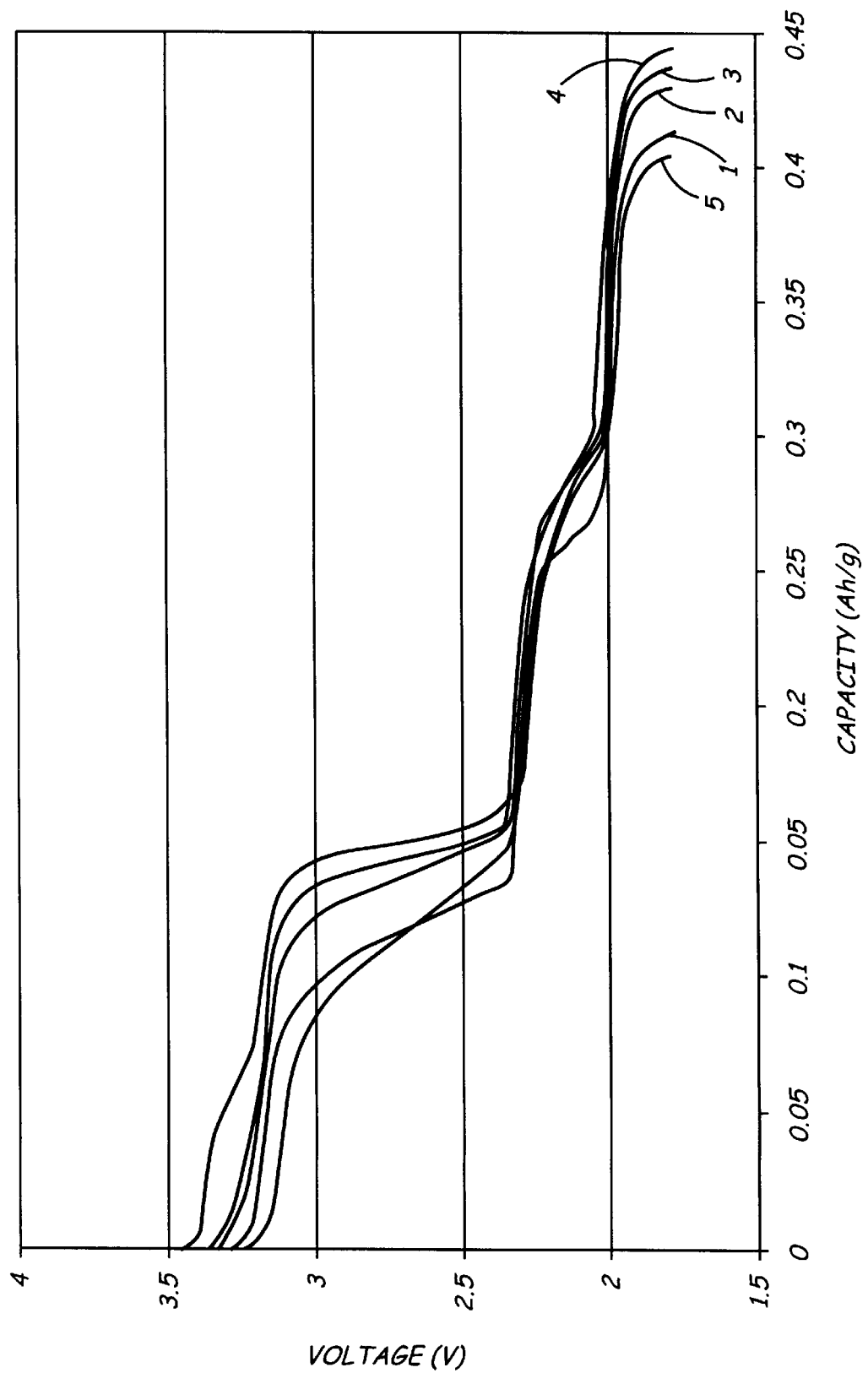
FIG. 19 is a plot of voltage as a function of specific capacity over the first discharge cycle for five batteries produced with $V_2O_5$.
Figure 20:
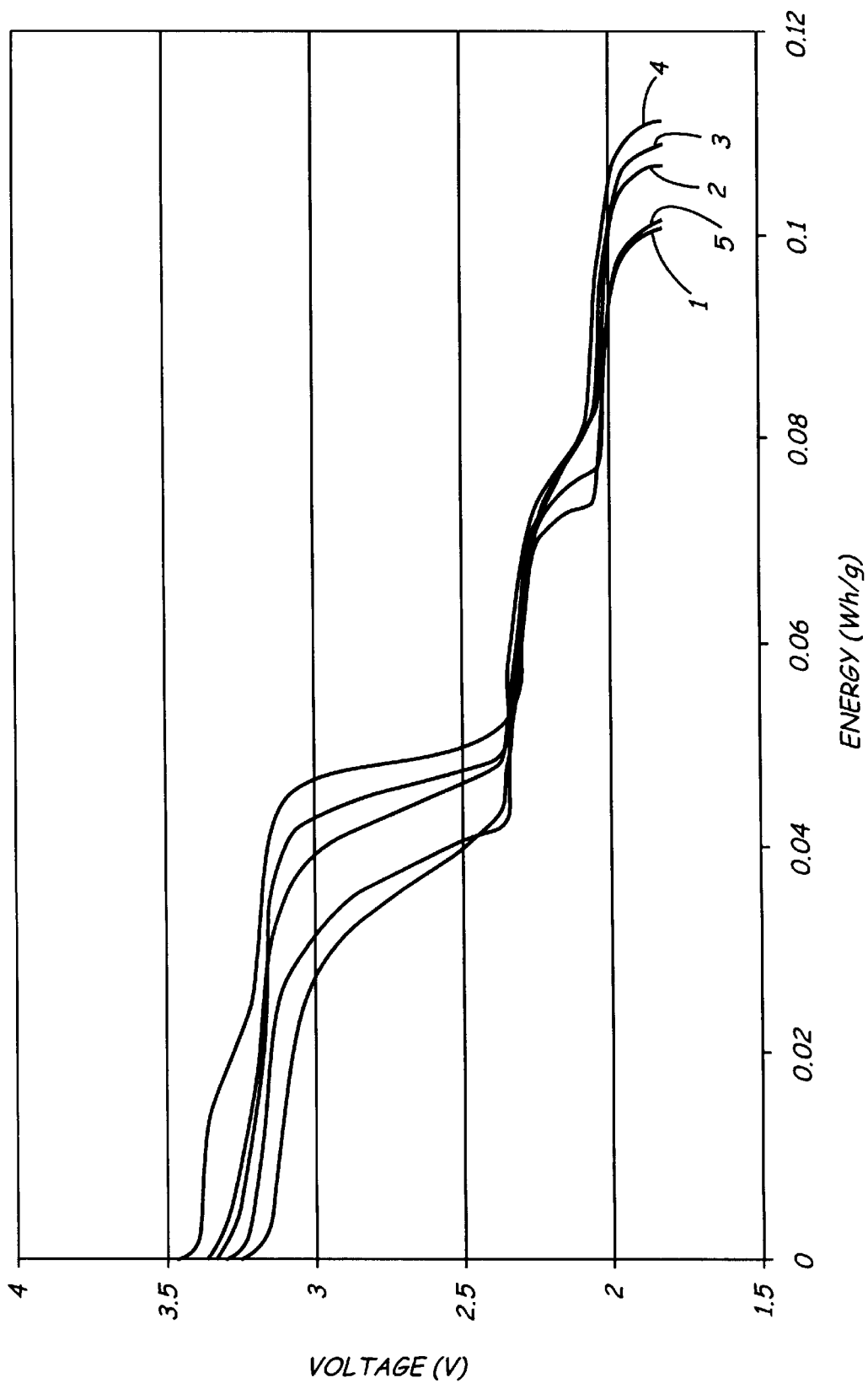
FIG. 20 is a plot of voltage as a function of specific energy over the first discharge cycle for five batteries produced with $V_2O_5$.

The voltage as a function of capacity and energy are plotted in FIGS. 19 and 20, respectively. Two battery samples were prepared with the sample 4 $V_2O_5$ particles for comparison. The specific capacity of the initial discharge for the five cells were determined as 1) 0.4156, 2) 0.4316, 3) 0.4388, 4) 0.4454 and 5) 0.4073 ampere-hours per gram of vanadium oxide. Similarly, the energy densities of the initial discharge for the five cells were determined as 1) 0.1018, 2) 0.1073, 3) 0.1092, 4) 0.1114 and 5) 0.1012 Watt-hours per gram of vanadium oxide.

Example 5

Cycling Results with Lithium Batteries, Formed with Submicron $V_2O_5$

The cycling properties of cells produced with the five forms of $V_2O_5$ were also examined. Charge and discharge experiments were conducted at a constant current, as described above. Each electrode contained about 7–10 mg of nanoparticles. Thus, the currents were about 0.2 mA for discharge and about 0.15 for charge. The cells were initially discharged down to 1.8 volts and charged to 3.4 volts.

Figure 21:
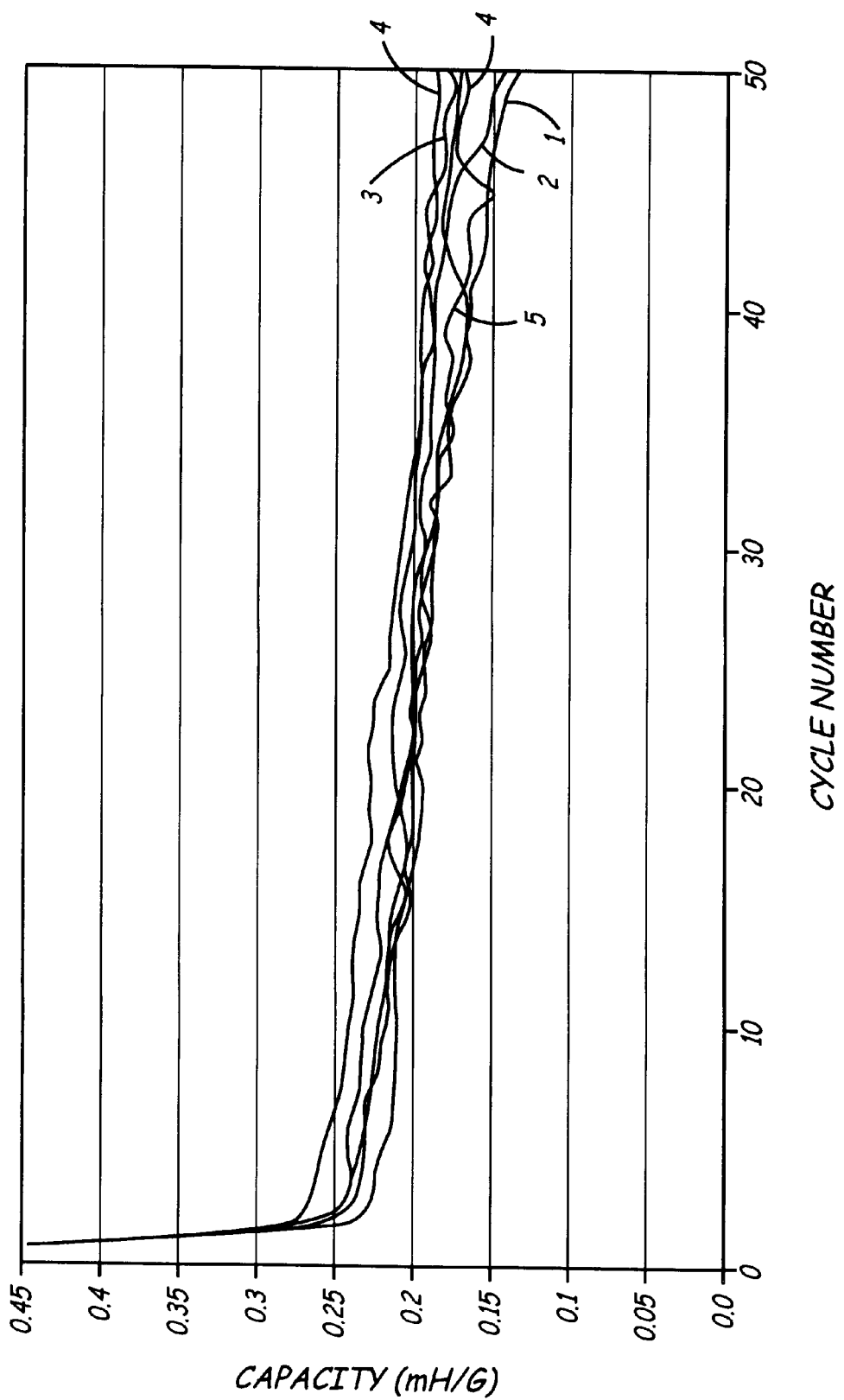
FIG. 21 is a plot of specific capacity as a function of cycle number for five batteries produced with $V_2O_5$.

The charging/discharging profiles were recorded, and the specific capacity was obtained. The specific capacity was evaluated as the discharge capacity divided by the mass of the active material. In FIG. 21, the discharge curves for samples 1–4 are compared with the discharge curve for commercial $V_2O_5$ (sample 5). All of the sample lose considerable capacity over the first cycles due to the irreversible insertion of Li into the $V_2O_5$ matrix when discharging to 1.8 V. Batteries with the $V_2O_5$ powders produced from the laser pyrolysis vanadium oxides had comparable or better cycling properties to the commercial vanadium oxides out to 50 cycles.

Examples Using Silver vanadium Oxide Particles

The following example demonstrates the attainability of improved battery performance using submicron silver vanadium oxide particles for the production of lithium based batteries.

Cathode materials were produced using the silver vanadium, oxide powders described in Example 3 using the cathode production process above. The pressed and dried disk was used as the active cathode in a 2025 coin cell. To form the coin cell, a 1.6 square centimeter disk of 3 mils thick nickel expanded metal (Delker, 3Ni5-077) was punched and resistance welded as a current collector to the inside of the stainless steel cover of the 2025 coin cell hardware (catalog No. 10769, Hohsen Corp., Osaka Japan). Battery grade lithium foil (0.75 mm thick) from Alfa Aesar, Inc. (Ward Hill, Mass.) was punched into a two-square centimeter disk and cold welded to the nickel expanded metal. A microporous polypropylene separator disk (Celgard® 2400, Hoechst-Celanese, Charlotte, N.C.) of appropriate dimensions (about ¾ inch diameter and 1 mil thickness) was placed over the lithium disk. The separator was presoaked in the electrolyte of choice.

A predetermined amount of electrolyte was added to this separator/lithium assembly. The electrolyte solution was composed of 1M $LiPF_6$ salt. Except for Example 8, the solvent for the electrolyte was a 1:1 by volume mixture of ethylene carbonate/DME. In Example 8, the solvent for the electrolyte solution was selected to evaluate the properties of the battery resulting from the solvent. A second 1.6 square centimeter disk of 3 mil thick stainless steel expanded metal (Delker, 3SS-(316L)7-077) was punched and resistance welded to the inside of the stainless steel can of the 2025 coin cell hardware. The active cathode pellet was placed on the stainless steel expanded metal and mated with the above separator/lithium assembly. The stainless steel can and stainless steel cover are separated from each other by a polypropylene grommet. The mated assembly was crimped together and employed as a test coin cell. The cells were placed in a controlled atmosphere chamber at 37±1 degrees C. and allowed to equilibrate for 3–4 hours prior to electrochemical testing.

The performance of the equilibrated cells under continuous drain was evaluated as well as the performance under pulsed operation. The measurements were controlled by a Maccor Battery Test System, Series 4000, from Maccor, Inc. (Tulsa, Okla.). The continuous drain measurements were made by subjecting the cells to a constant current discharge of 0.309 mA/cm$^2$. When the voltage reached 1.0 volt, the discharge current was allowed to decay as the cell voltage was held at 1.0 volt for five hours. The 1.0 volt discharge allows for a capacity measurement independent of polarization effects that result from discharge at finite values of current. This yields a capacity measurement that more closely approximates the maximum value that would be obtained with by discharging the battery at infinitely slow discharge.

The pulse measurements were made by providing a pulse train every thirty minutes, in which each pulse train had four-ten second pulses spaced by 15 seconds, with each of the four pulses corresponding to a current density of 25 mA/cm$^2$ to a cutoff voltage of 1.5 volts. In some of the examples, the effect of the rate was explored more fully, as described below. For each measurement, the discharge profile was recorded, and the discharge capacity and energy density of the active material were obtained.

Example 6

Lithium Batteries Formed with Submicron Silver Vanadium Oxide Particles

In this example, the battery performance of cells with silver vanadium oxide particles produced under different conditions is presented. One set of cells were produced with silver vanadium oxides produced under different reaction conditions. In addition, the mixing speed during the synthesis of the silver vanadium oxide on the battery performance is examined. Furthermore, the effect of varying the silver to vanadium ratio is examined.

A set of cells were constructed with silver vanadium oxides powders produced under different processing conditions as described above in Example 3 from $VO_2$ starting material. In particular, seven samples were produced using different processing times and temperatures for reacting the materials to produce silver vanadium oxide: 1) 300° C. for 2 hours, 2) 300° C. for 4 hours, 3) 350° C. for 1.5 hours, 4) 350° C. for 2 hours, 5) 350° C. for 4 hours, 6) 375° C. for 1.5 hours and 7) 375° C. for 2 hours. To form the coin cells, a cathode pellet was formed with 140 milligrams (mg) to 150 mg of nanoscale silver vanadium oxide. The open circuit voltage of the seven cells immediately after crimping were 3.4 to 3.6 volts. The cells were subjected to a constant current discharge of 0.309 milliamperes per square centimeter of active interfacial electrode surface area. Equivalent cells were-also tested under pulse operation.

Figure 22:
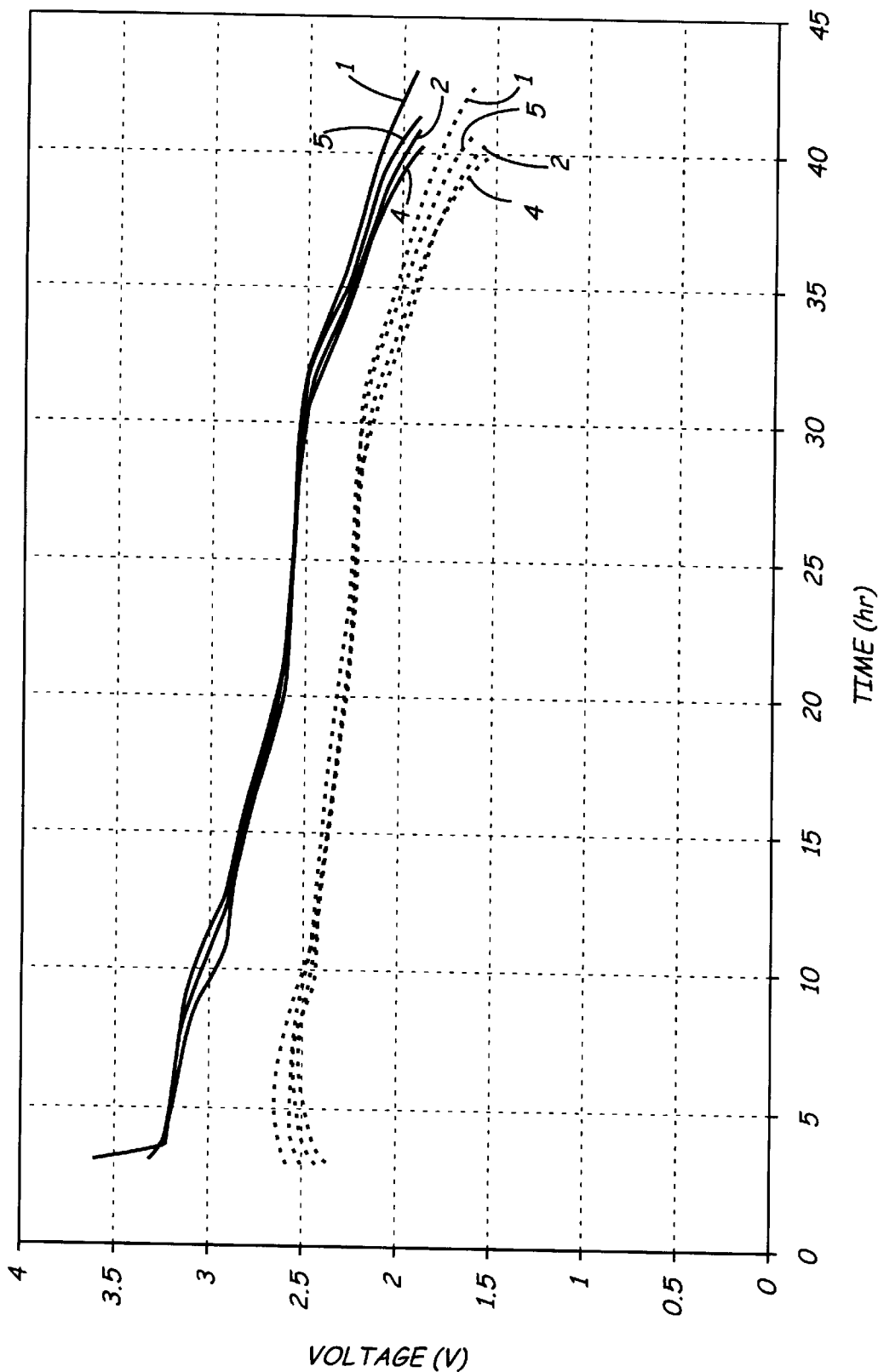
FIG. 22 is a plot of voltage as a function of time under pulse operation with a pulse current density of 25 mA/cm$^2$ to 1.5 V for several cells produced with silver vanadium oxides processed under different conditions.
Figure 23:
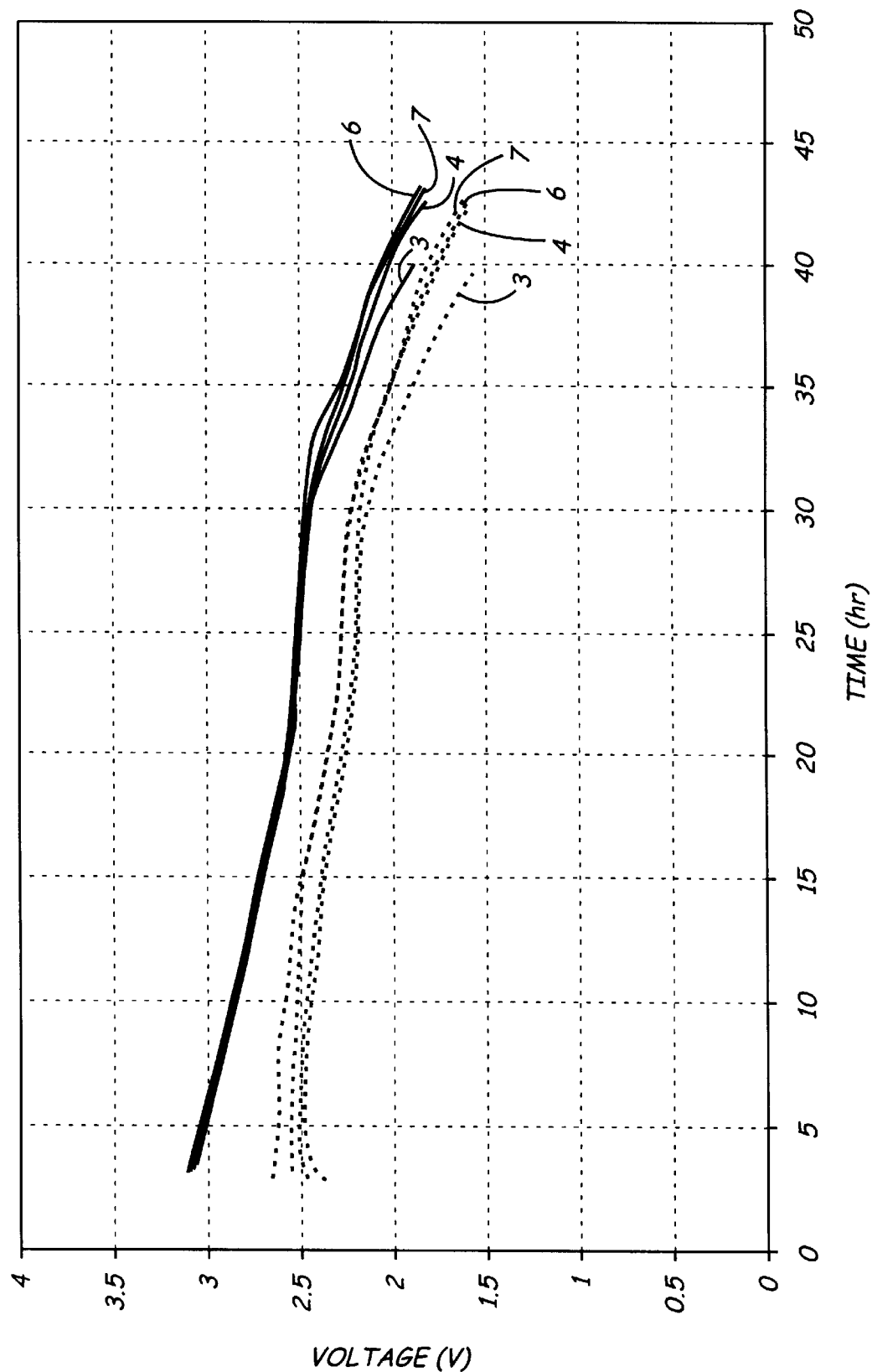
FIG. 23 is a plot of voltage as a function of time under pulse operation with a pulse current density of 25 mA/cm$^2$ to 1.5 V for several cells produced with silver vanadium oxides processed under another set of conditions.

The voltage-time results for background voltage (solid lines) and the lower pulse voltage of the first pulse of each train (dashed lines)are illustrated in FIGS. 22 and 23. Pulse tests were performed at a current density of 25 $mA/cm^2$ to a cutoff voltage of 1.5V. Background voltage is the open circuit voltage before the first pulse of each pulse train. In high rate capable batteries under pulse operation, the difference between the background voltage and the pulse voltage indicates the rate capability of the material. If the difference between the background voltage and the pulse voltage (the delta voltage) is small, the material shows high rate capability. Silver vanadium oxide produced at higher temperatures and shorter time have lower delta voltages. The best delta voltage is obtained with 350° C. processing for two hours. However, based on the pulse performances overall processing conditions are versatile.

In addition, improved results were obtained by mixing in the stirred oven the combination $V_2O_5$ and silver nitrate at a higher rate of 150–200 rpm (cell 1) compared with mixing rates of 50 rpm (cell 2). The open circuit voltage of the two cells immediately after crimping was 3.4–3.6 volts. The cells were subjected to a constant current discharge of 0.309 milliamperes per square centimeter of active interfacial electrode surface area. Equivalent cells were also tested under pulse operation.

Figure 24:
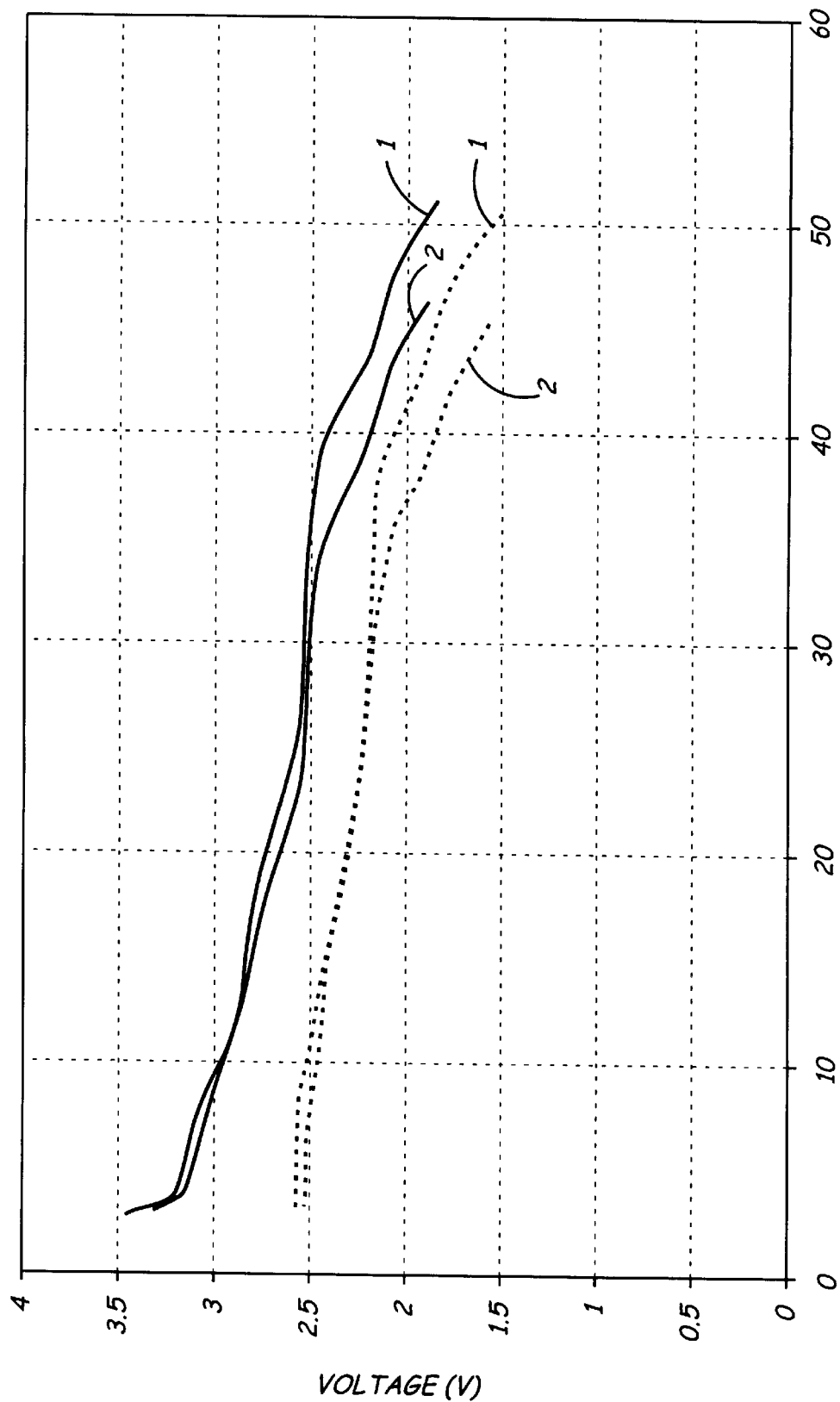
FIG. 24 is a plot of voltage as a function of time under pulse operation with a pulse current density of 25 mA/cm$^2$ to 1.5 V for two cells produced with silver vanadium oxides processed under different mixing conditions.

The voltage-time results for background voltage (solid lines) and lower pulse voltage of the first pulse (dashed lines) are illustrated in FIG. 24. Significantly improved performance was obtained with the cathodes formed with silver vanadium oxide formed at higher mixing speeds. Under pulse conditions, the cathodes produced with silver vanadium oxide synthesized at a fast mixing speed had a specific power of 861 mW/g compared with a specific power of 863 for the battery produced with silver vanadium oxide synthesized at a slower mixing speed. In pulse operation, the cathode with silver vanadium oxide formed at a higher mixing speed had about 10 percent more pulse trains when pulsed at a current density of 25 $mA/cm^2$ to 1.5 volts. In addition, a pulse specific capacity of 296 mAh/g and a pulse specific energy of 664 mWh/g were obtained with silver vanadium oxide synthesized at high mixing speeds compared with values of 283 mAh/g pulse specific capacity and 623 mWh/g pulsed specific energy from silver vanadium oxide synthesized at a slow mixing speed to 1.5 V.

Another set of cells were constructed as described above with silver vanadium oxides powders with varying silver to vanadium ratios, as described above in Example 3. The silver vanadium oxide was produced at 350° C. for four hours from a $VO_2$ starting material. The five cells, respectively, had silver vanadium oxide powders synthesized with vanadium to silver ratios of 1) 1:1, 2) 1:0.95, 3) 1:0.9, 4) 1:0.875, 5) 1:0.85. The cathodes contained 140 mg to 150 mg of nanoscale silver vanadium oxide particles. The open circuit voltage of the five cells immediately after crimping was 3.4 to 3.6 volts. The cells were subjected to a constant current discharge of 0.309 milliamperes per square centimeter of active interfacial electrode surface area. Equivalent cells were also tested under pulse operation.

Figure 25:
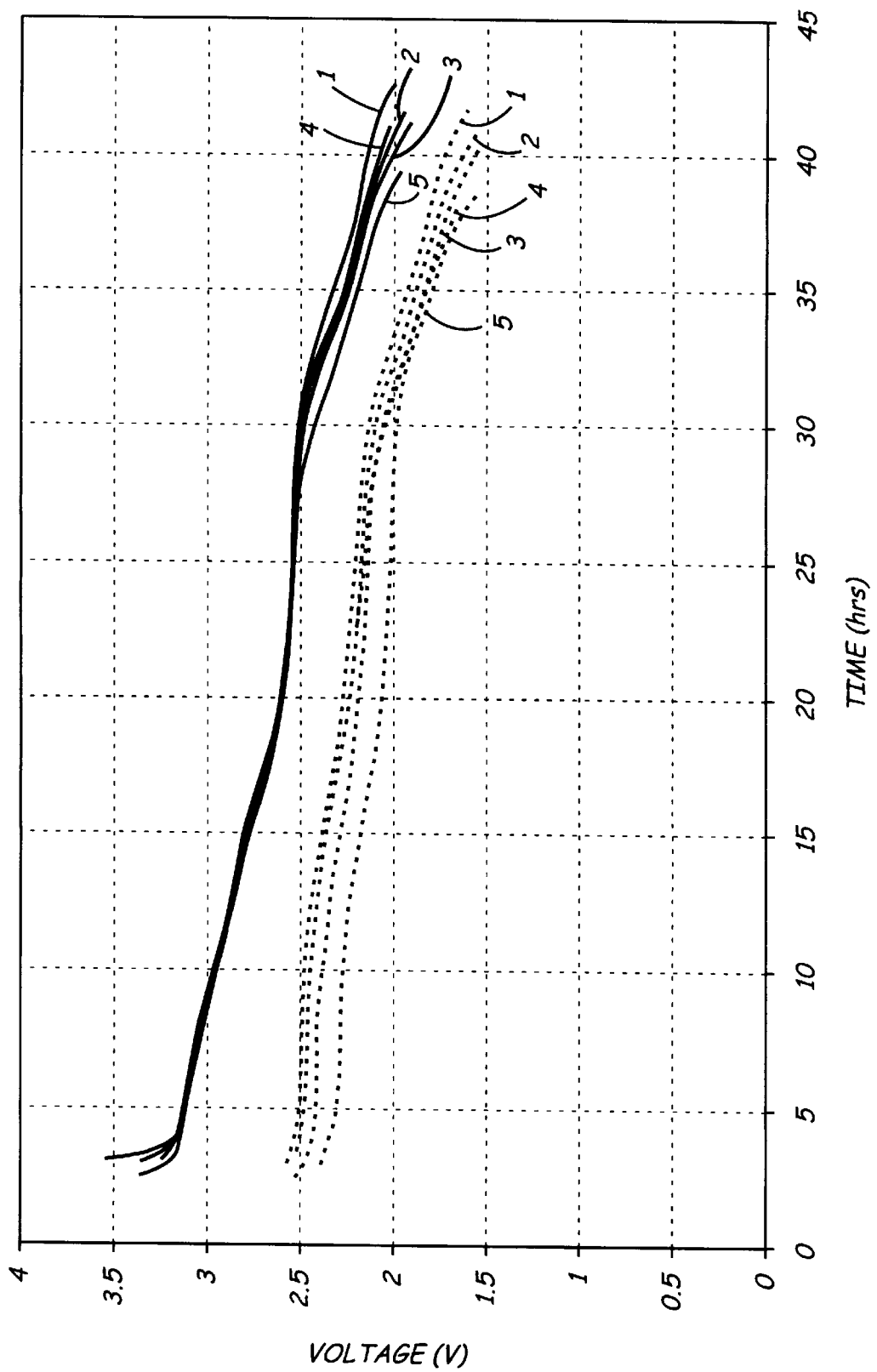
FIG. 25 is a plot of voltage as a function of time under pulse operation with a pulse current density of 25 mA/cm$^2$ to 1.5 V for several cells produced with silver vanadium oxides processed with different silver to vanadium ratios.

The voltage-time results for the background voltage (solid lines) and the lower pulse voltage of the first pulse (dashed lines) are illustrated in FIG. 25. The cathodes with higher silver content resulted in better performance during pulse operation at a current density of 25 $mA/cm^2$ to 1.5 V. In particular, the delta voltage represented by the difference in the background voltage and the pulsed voltages was smaller for the higher silver materials. A smaller value of delta V indicates a better high rate material. The resulting specific capacities during pulse operation to 1.5 volts were approximately equal to 280–290 mAh/g.

Example 7

Blended Versus Homogenized Cathode Material Compositions

In this example the improved performance of homogenized cathode materials are presented. Furthermore, improved results are also obtained by mixing the cathode components in a homogenizer. The silver vanadium oxide was produced in a stirred vessel at 350° C. for 4 hours from a $VO_2$ starting material.

Cells were produced from cathode compositions that were mixed by a homogenizeror with a blender, as described above. The open circuit voltage of the two cells immediately after crimping were 3.4–3.6 volts for the homogenized cathode materials and for the blended cathode materials. The cells were subjected to a constant current discharge of 0.309 milliamperes per square centimeter of active interfacial electrode surface area. Equivalent cells were also tested under pulse operation.

Figure 26:
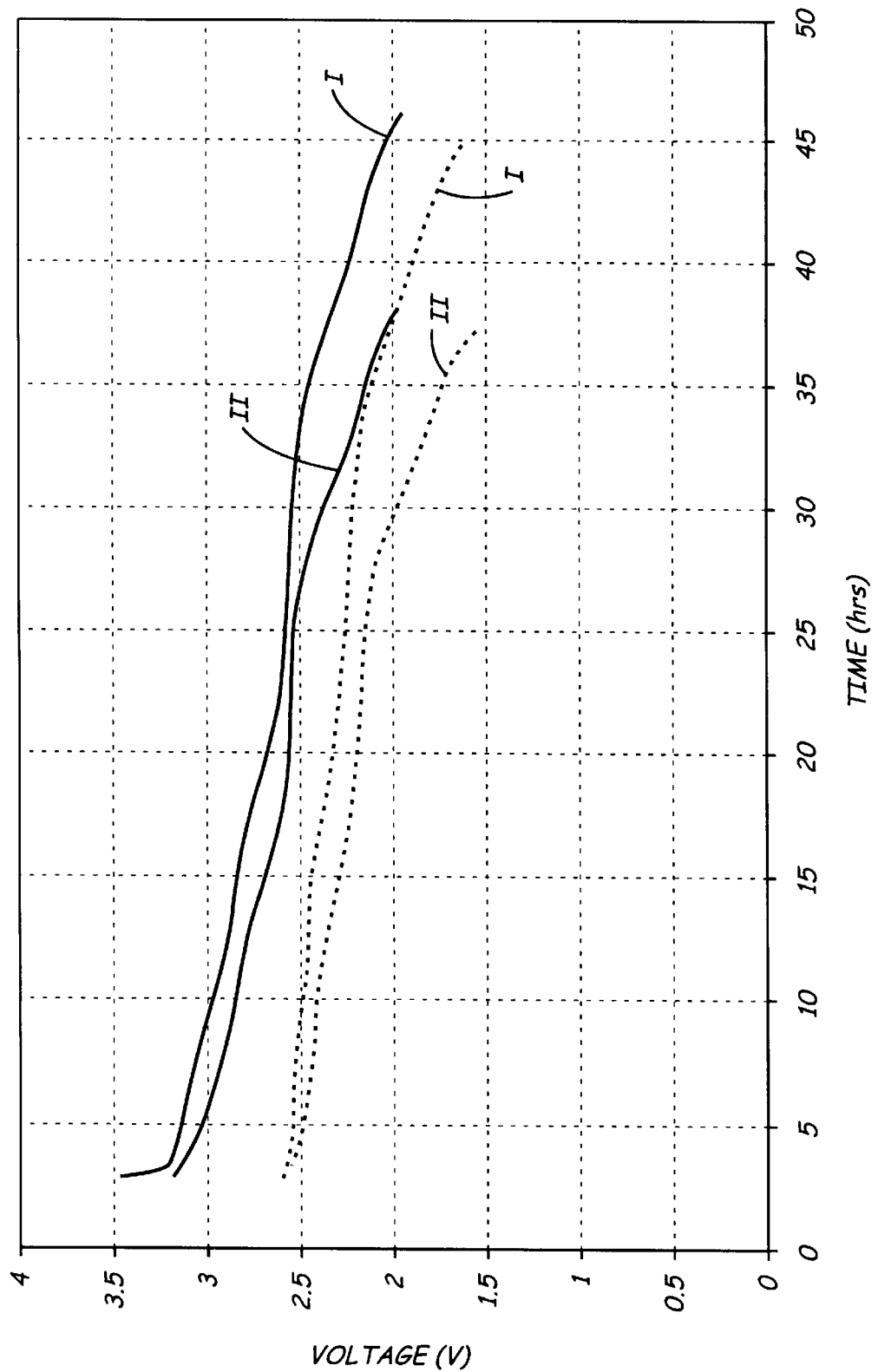
FIG. 26 is a plot of voltage as a function of time under pulse operation with a pulse current density of 25 mA/cm$^2$ to 1.5 V for two cells produced with silver vanadium oxides in which the cathode materials were processed under, different conditions.

The voltage-time results for background voltage (solid lines) and the lower pulse voltage of the first pulse (dashed lines) are illustrated in FIG. 26, in which homogenized cathode results are labeled I and blended cathode results are labeled II. Significantly improved performance was obtained with the cathodes formed with the homogenizer. In pulsed operation, the homogenized cathode had about 20 percent more pulse trains when pulsed at a current density of 25 $mA/cm^2$ to 1.5 volts. For the homogenized cathode, a pulsed specific capacity of 292 mAh/g and a pulsed specific energy of 650 mWh/g were obtained compared with values for the blended cathodes of 276 mAh/g pulsed specific capacity and 580 mWh/g pulsed specific energy to 1.5 V.

Example 8

Effects of Electrolyte Solvents

This example explores the potential of improved rate capabilities obtainable through the use of higher ionic conductivity solvents for the electrolyte.

Equivalent cells were produced using three different electrolyte solvents. The first solvent was a 1:1 by volume mixture of ethylene carbonate (EC) and DME, the second solvent was a 1:1:1 by volume mixture of ethylene carbonate, DME and triglyme (3G) and the third solvent was a 1:1 by volume mixture of ethylene carbonate and dimethyl carbonate (DMC). The salt was LiPF$_6$ which was at a one molar concentration. Equivalent cells were tested under continuous current and under pulse operation.

Figure 27:
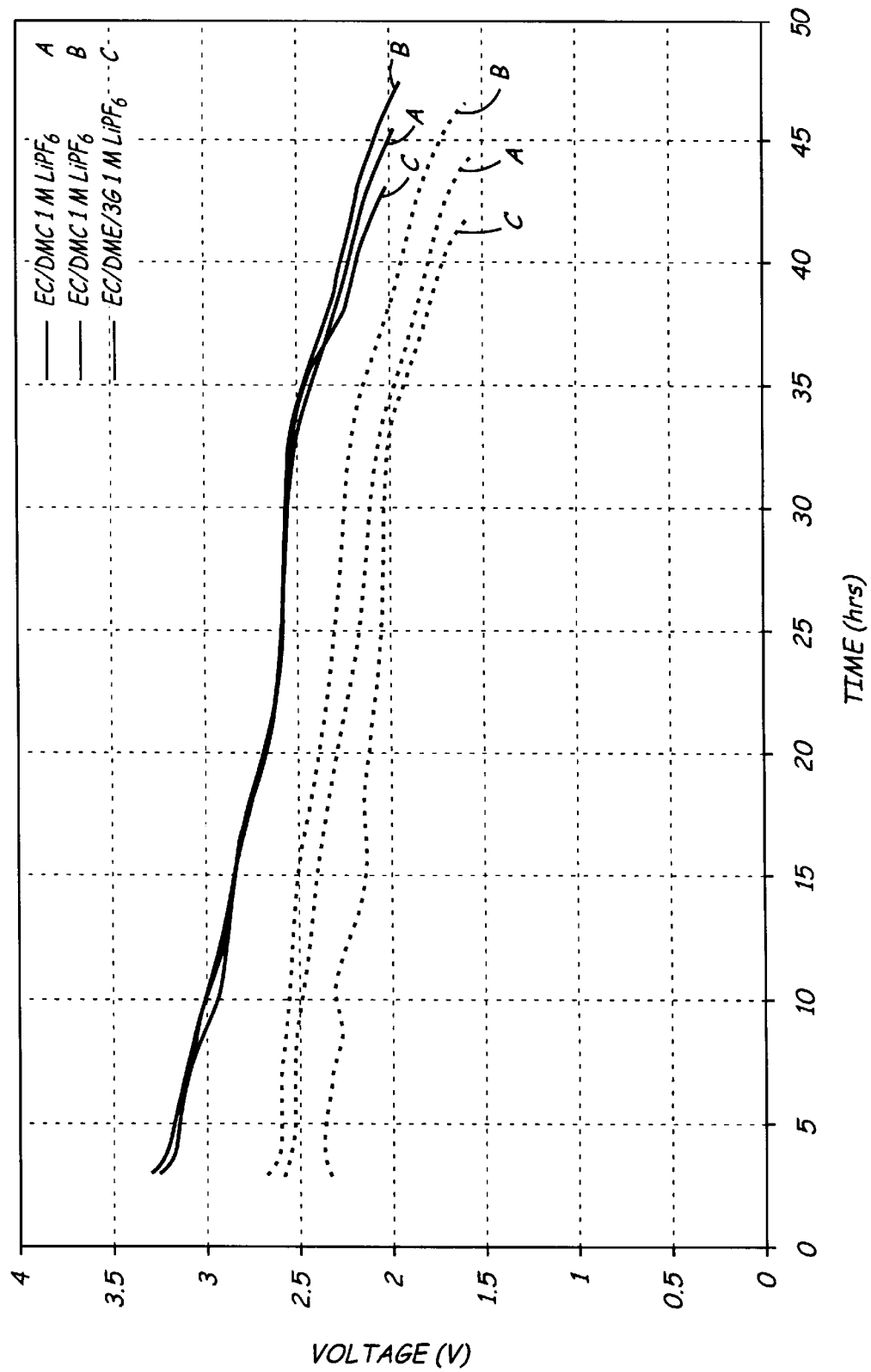
FIG. 27 is a plot of voltage as a function of time under pulse operation with a pulse current density of 25 mA/cm$^2$ to 1.5 V for several cells produced with silver vanadium oxides using different electrolyte solvents.
Figure 28:
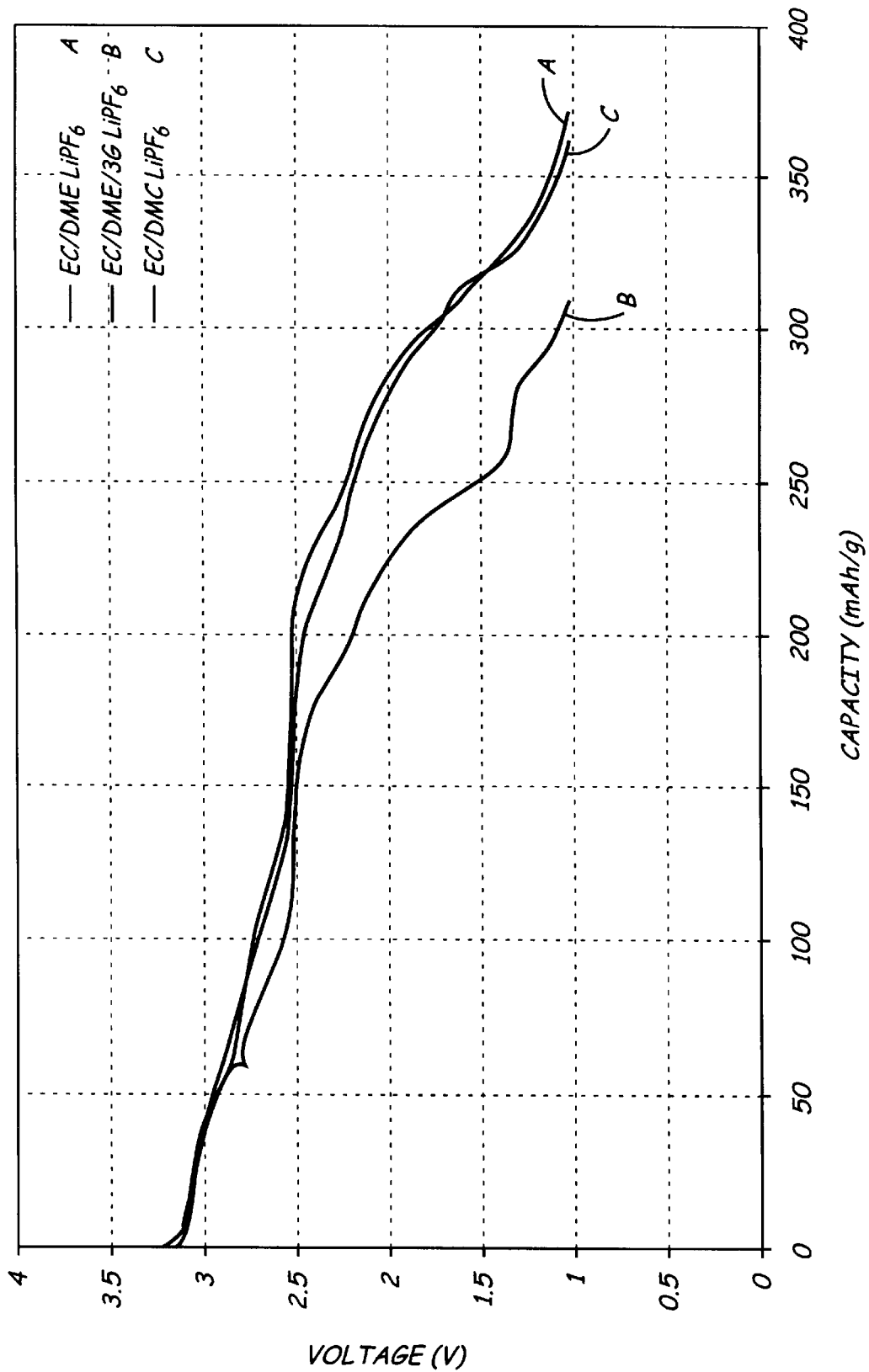
FIG. 28 is a plot of voltage as a function of specific capacity at a current density of 0.309 mA/cm$^2$ to 1.0 V for the cells of FIG. 27.

The voltage-time results for background voltage (solid lines). and lower pulse voltage of first pulse (dashed lines) are illustrated in FIG. 27. The results under pulse operation at a current density of 25 mA/cm$^2$ to 1.5 V showed that the mixture of ethylene carbonate and DME yielded better pulse performance due to higher conductivity In particular, the mixture of ethylene carbonate and DME had a lower delta voltage as a function of time. The voltage as a function of capacity is plotted in FIG. 28. The mixture of ethylene carbonate and DME yielded significantly higher capacity than the mixture of ethylene carbonate DME triglyme, and comparable capacity to the mixture of ethylene carbonate and dimethyl carbonate.

The pulse specific capacity and pulse specific energy are significantly higher also for the ethylene carbonate and DME mixture, as summarized in Table 2. The values in Table 2 for pulse operation are at a current density of 25 mA/cm$^2$ to 1.5 V, while the values under continuous drain were obtained under a current density of 0.309 mA/cm$^2$ to 1.0 V.

TABLE 2

|  | EC + DMC | EC + DME | EC + DME + 3G |
|---|---|---|---|
| Pulsed Specific Capacity (mAh/g) | 283 | 285 | 280 |
| Pulse Specific Energy (mWh/g) | 612 | 646 | 575 |
| Maximum Specific Power (mW/g) | 828 | 884 | 783 |
| Average Specific Power (mW/g) | 696 | 763 | 688 |
| Average Voltage (Pulse Operation) | 2.157 | 2.279 | 2.054 |
| Specific Capacity Down to 2 volts (mAh/g) | 276 | 282 | 222 |
| Specific Energy Down to 2 volts (mWh/g) | 690 | 738 | 582 |
| Specific Capacity Down to 1.5 volts (mAh/g) | 316 | 315 | 250 |
| Specific Energy Down to 1.5 volts (mWh/g) | 792 | 797 | 630 |
| Specific Capacity Down to 1 volt (mAh/g) | 362 | 372 | 310 |
| Specific Energy Down to 1 volt (mWh/g) | 838 | 862 | 702 |

Example 9

Different Electrically Conductive Particles

This example presents results obtained with silver particles as a replacement for the graphite particles as an electrically conductive diluent. Results were obtained at a variety of current densities, with values at two current densities reported below.

Figure 29:
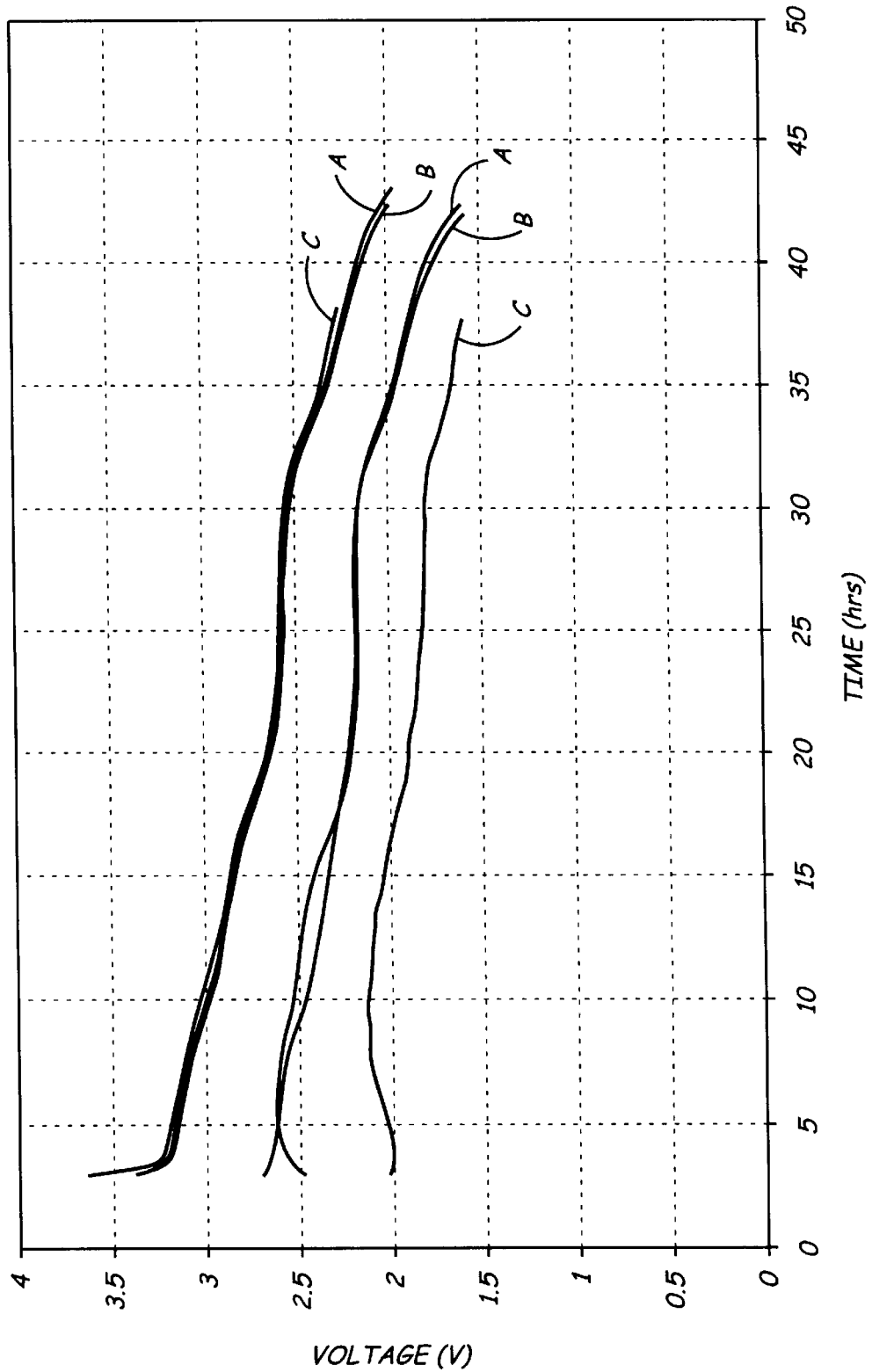
FIG. 29 is a plot of voltage as a function of time under pulse operation with a pulse current density of 25 mA/cm$^2$ to 1.5 V for several cells produced with silver vanadium oxides using different electrically conductive diluents.

Cells were formed with standard graphite electrically conductive particles (A), with silver nanoparticles produced by laser pyrolysis (B) and with commercial silver particles (C). The silver nanopartcles were produced as described in U.S. patent application Ser. No. 09/311,506, now U.S. Pat. No. 6,394,494 to Reitz et al., entitled "Metal Vanadium Oxide Particles," incorporated herein by reference. The commercial silver particles (1 micron average size with a surface area of 1 m$^2$/g) were obtained from Aldrich, Milwaukee, Wis. The voltage-time results for background voltage (upper lines) and lower pulse voltage of first pulse (dasied lines) with a pulse current density of 25 mA/cmn to 1.5 V are illustrated in FIG. 29. The commercial silver particles provided significantly worse pulse performance. The nanoparticulate silver and the graphite produced comparable results at 25 mA/cm$^2$ pulse currant to 1.5V.

Figure 30:
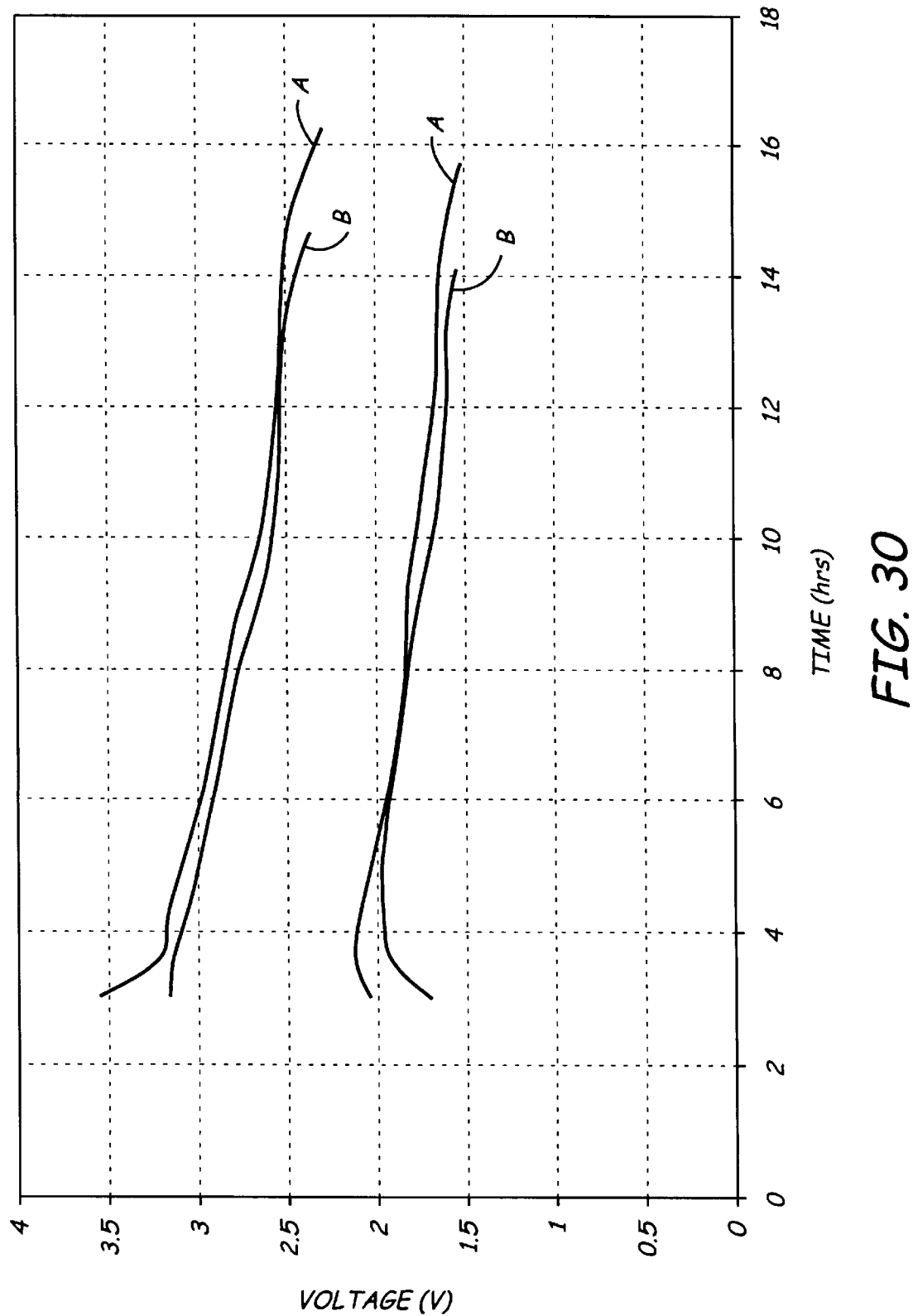
FIG. 30 is a plot of voltage as a function of time under pulse operation with a pulse current density of 60 mA/cm$^2$ to 1.5 V for two cells produced with silver vanadium oxides using different electrically conductive diluents.

The voltage versus time results for background voltage (upper lines) and lower pulse voltage of the first pulse (dashed lines) at a current density of 60 mA/cm$^2$ to 1.5 V are illustrated in FIG. 30. Results for both types of conductive media are comparable at high rates.

Example 10

Effect of Cathode Thickness

This example provides an evaluation of battery performance as a function of cathode thickness.

The cells were formed with the same cathode composition with 70 weight percent silver vanadium oxide, 10 weight percent graphite, 10 weight percent acetylene black and 10 weight percent Teflon®. Thus, thicker cathodes included higher weights of silver vanadium oxide and electrically conductive particles, while thinner cathodes included lower weights of silver. vanadium oxide and carbon. The cells were subjected to a constant current discharge to 1 volt with a current density of 0.39 milliamperes per square centimeter of active interfacial electrode surface area. Equivalent cells were also tested under pulse operation.

Figure 31:
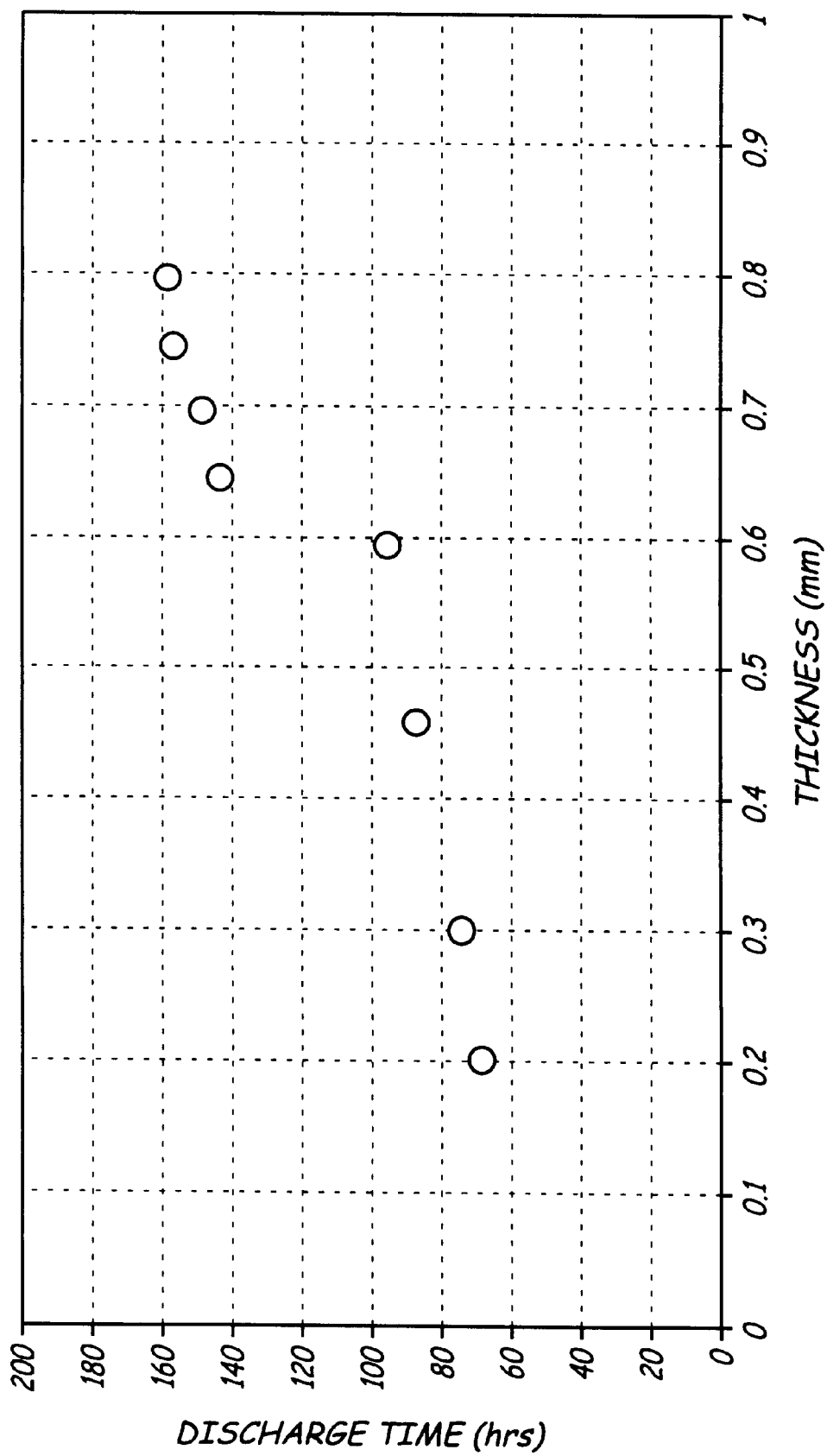
FIG. 31 is a plot of voltage as a function of cathode thickness for silver vanadium oxide pellets.
Figure 32:
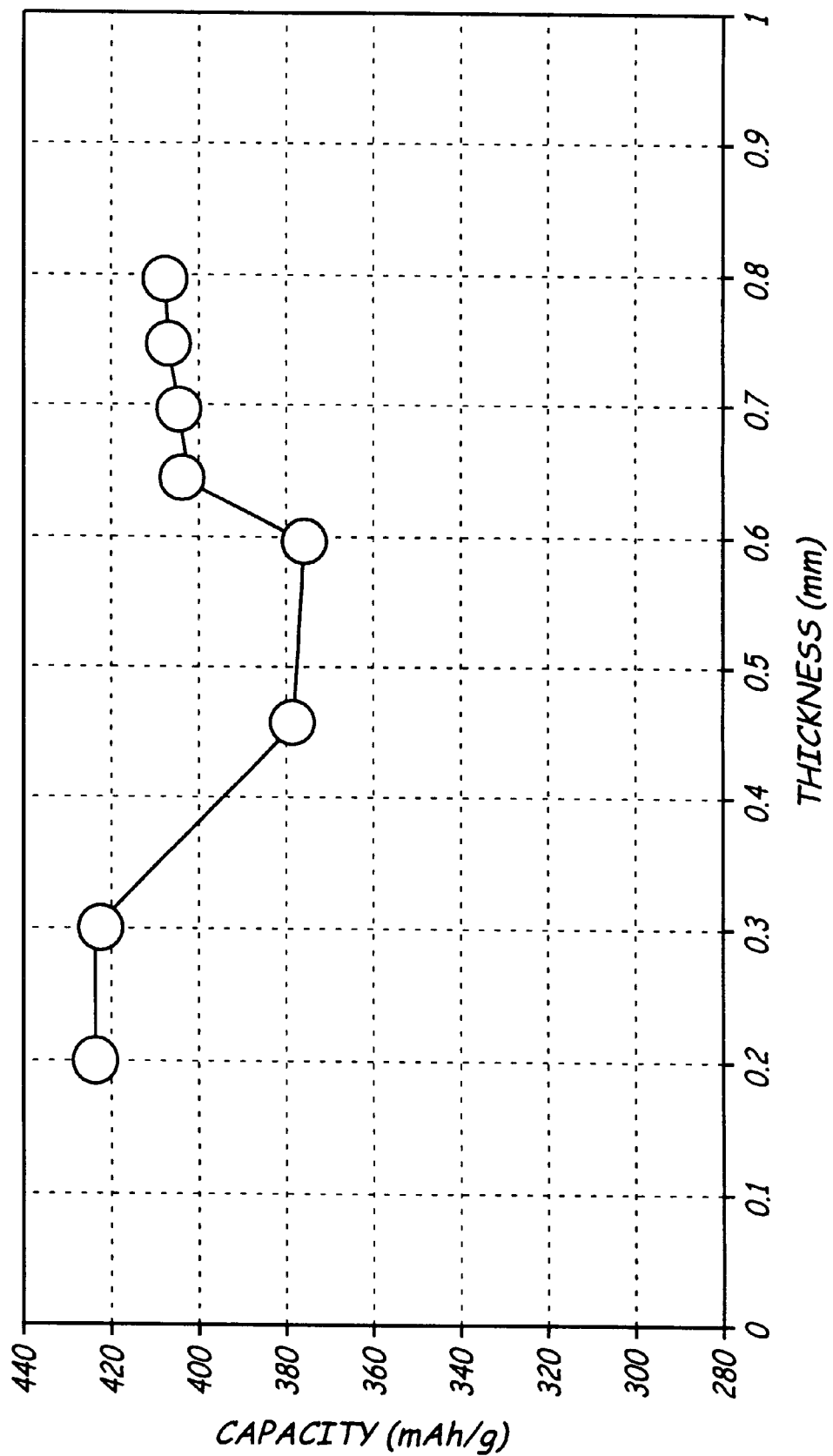
FIG. 32 is a plot of specific capacity as a function of cathode thickness for silver vanadium oxide pellets.
Figure 33:
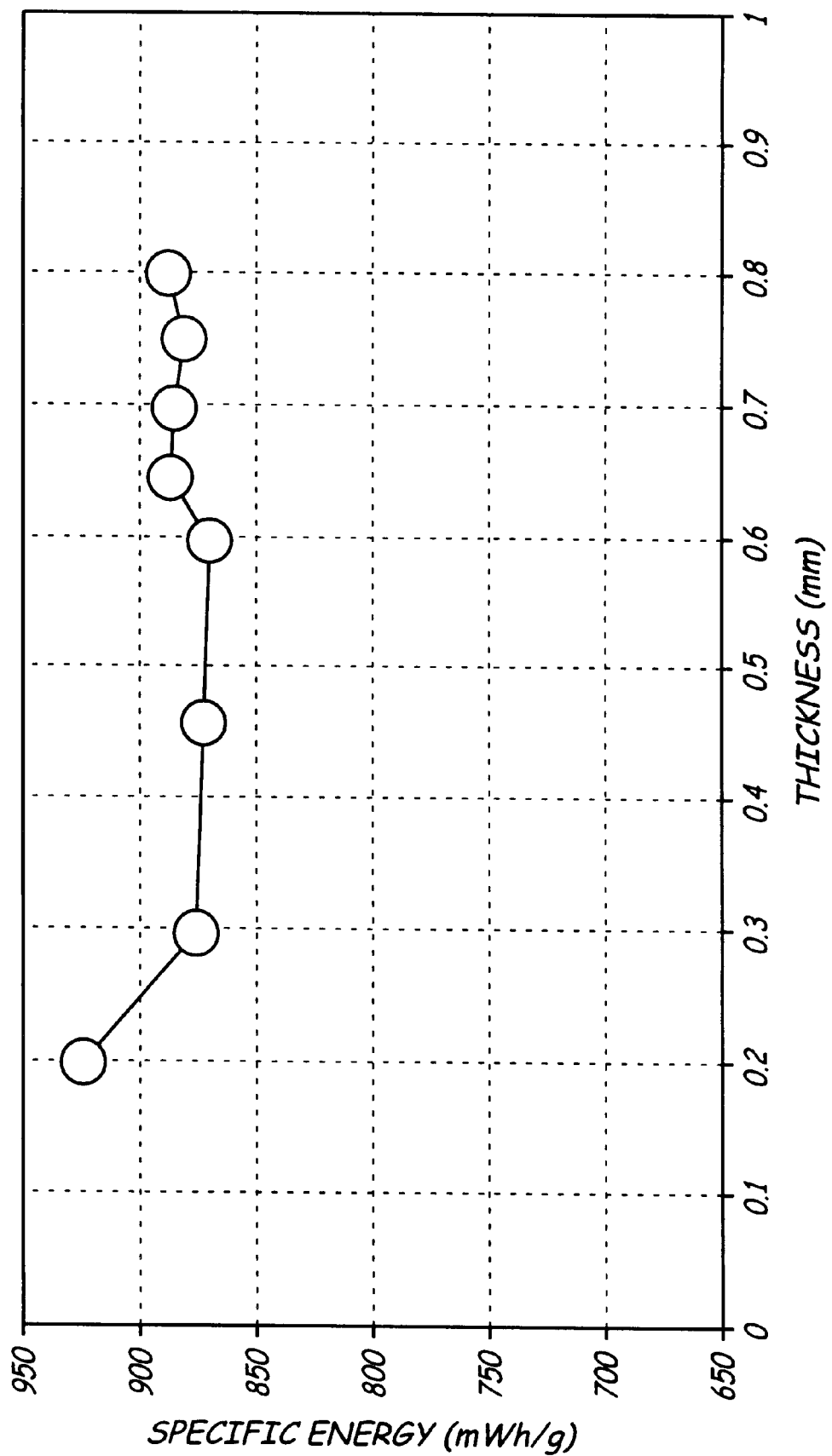
FIG. 33 is a plot of specific energy as a function of cathode thickness for silver vanadium oxide pellets.

The discharge time under continuous current is plotted in FIG. 31. Thinner cathodes had shorter discharge times while thicker cathodes had longer discharge times. The corresponding specific capacities are plotted in FIG. 32. Thin electrodes with thicknesses of 0.2 mm and 0.3 mm showed extremely high specific capacities of 424 mAh/g to 1 V Similarly, thicker cathodes had capacities of 410 mAh/g due to the longer discharge times, thereby allowing more Li ions to intercalate through the cathode matrix. Specific energies as a function of cathode thickness are plotted in FIG. 33. A 0.8 mm cathode with a thickness 4 times the 0.2 mm cathode only had a loss of 8 percent in specific energy.

Figure 34:
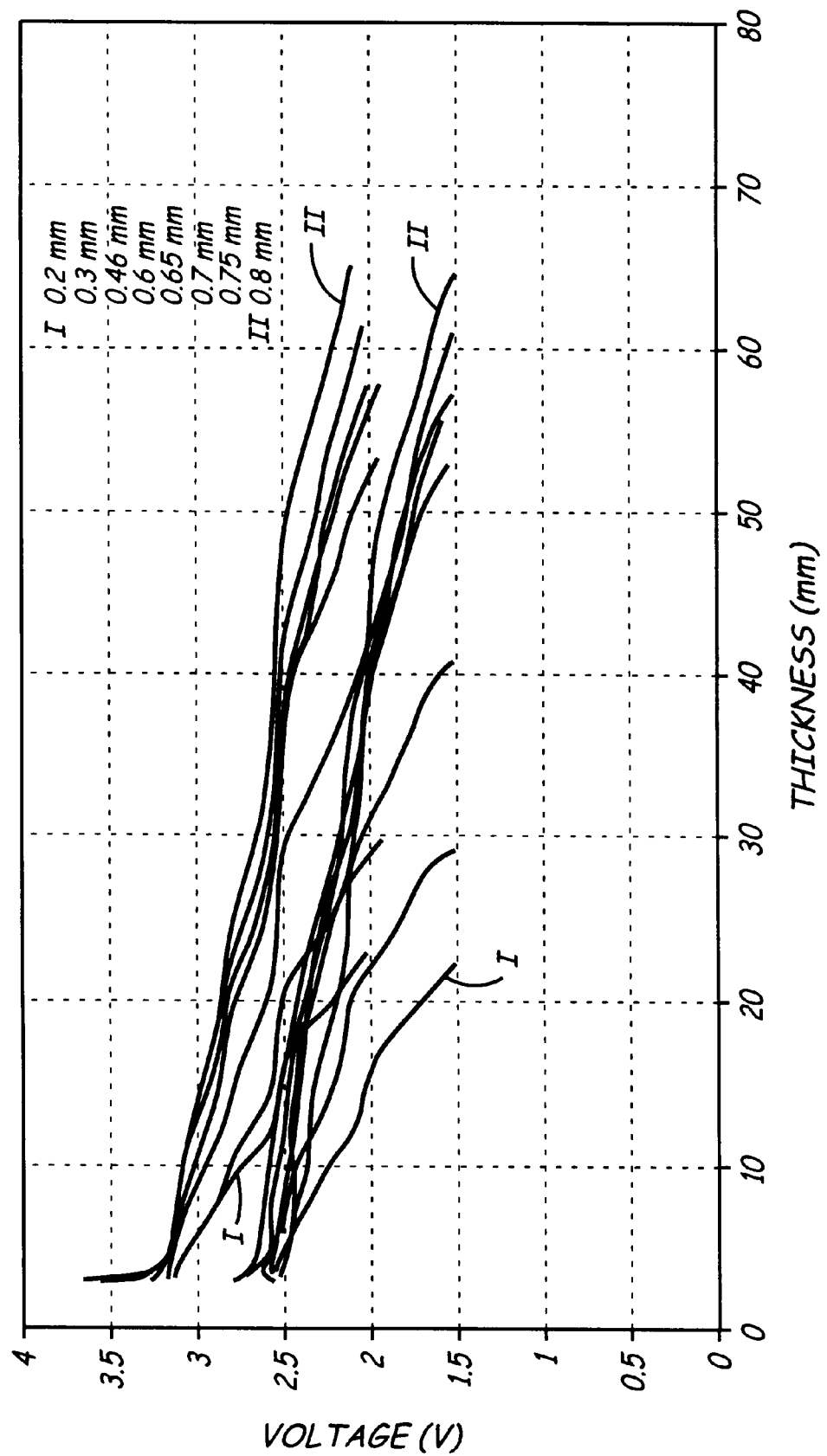
FIG. 34 is a plot of voltage as a function of time under pulse operation with a pulse current density of 25 mA/cm$^2$ to 1.5 V for eight silver vanadium oxide cells produced with different cathode thicknesses.
Figure 35:
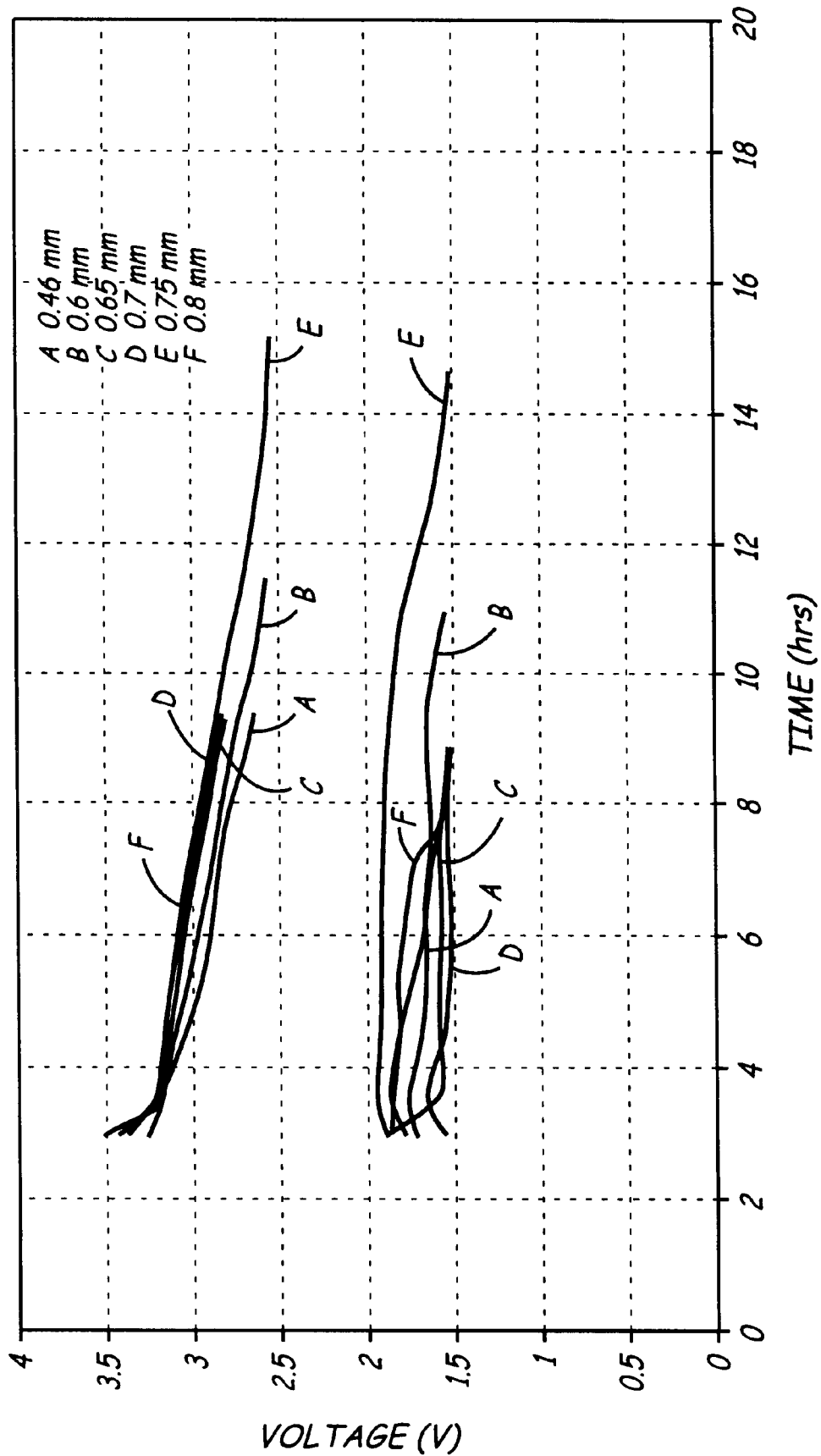
FIG. 35 is a plot of voltage as a function of time under pulse operation with a pulse current density of 70 mA/cm$^2$ to 1.5 V for six cells produced with different cathode thicknesses.
Figure 36:
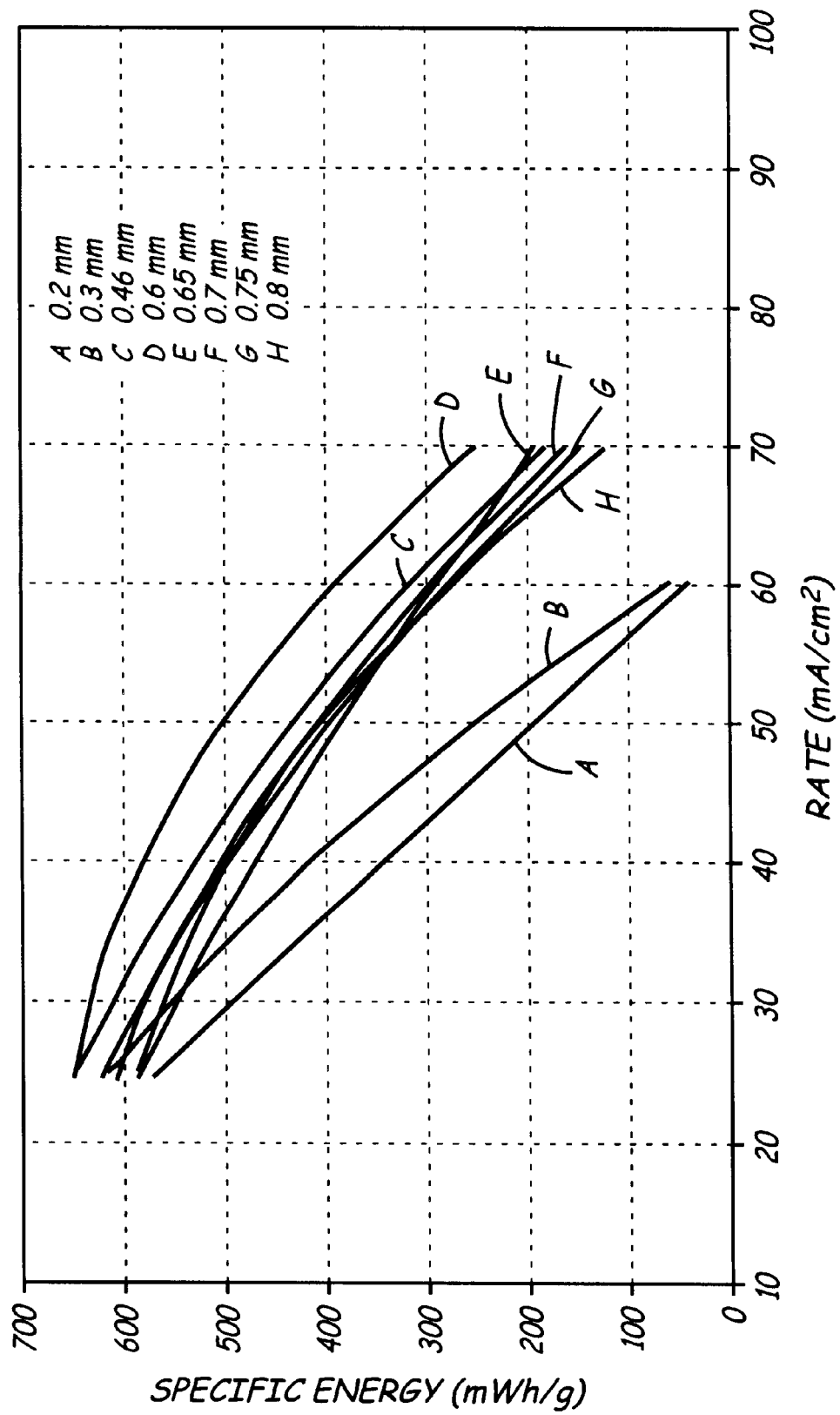
FIG. 36 is a plot of specific energy as a function of pulse current density for several cathode thicknesses for silver vanadium oxide pellets.
Figure 37:
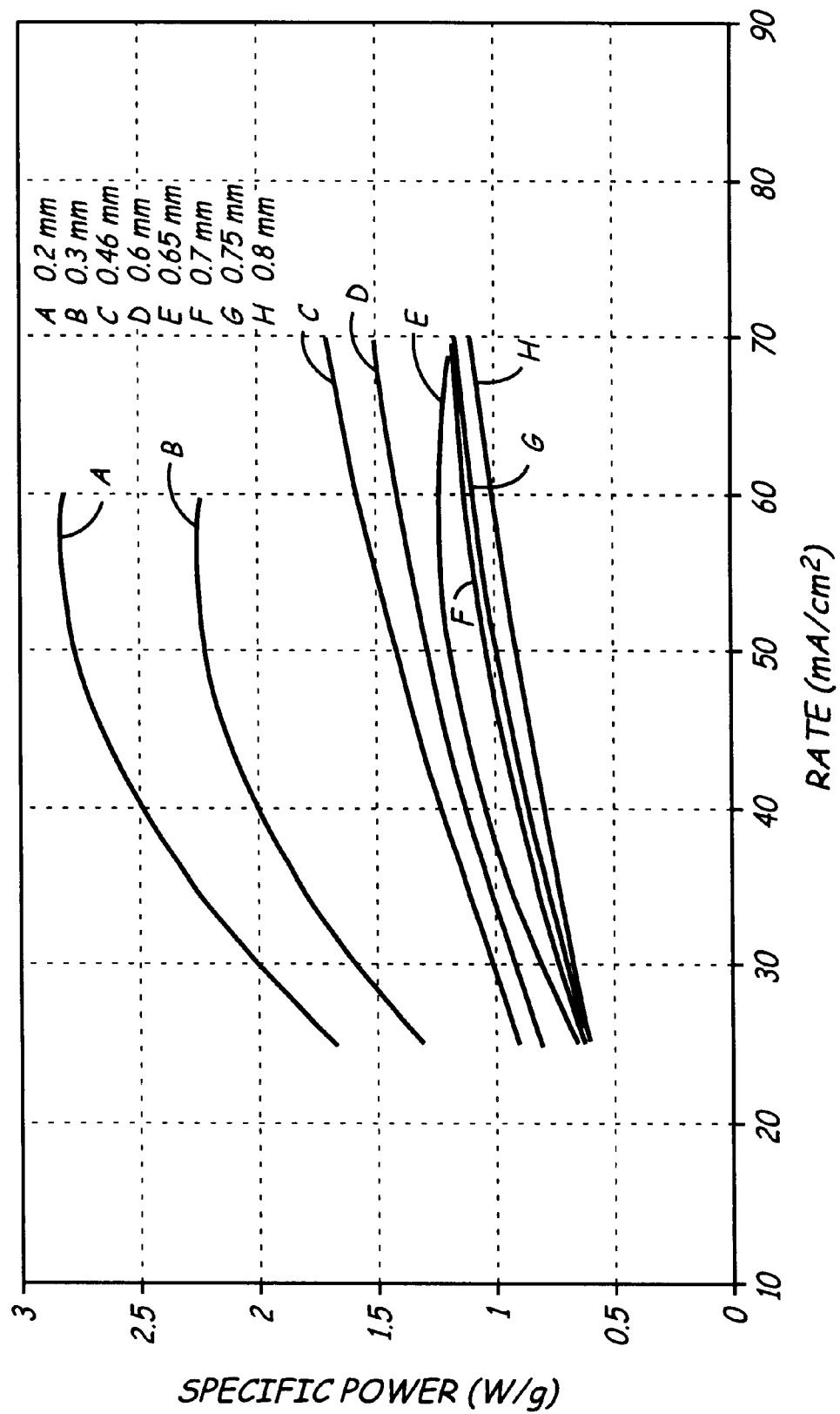
FIG. 37 is a plot of specific power as a function of pulse current density for several cathode thicknesses for silver vanadium oxide pellets.

The voltage-time results for background voltage (upper lines) and lower voltage of first pulse (dashed lines) with a pulse current density of 25 mA/cm$^2$ to 1.5 V are illustrated in FIG. 34. Since thicker cathodes had longer discharge times, the curves are sequential with the curves corresponding to thicker cathodes being above the corresponding curves for thinner cathodes. The voltage-time results for background voltage (upper lines) and lower pulse voltage of first pulse (dashed lines) with a pulse current density of 70 mA/cm$^2$ are illustrated in FIG. 35. At these high currents, thicker electrodes were able to sustain high rates. The specific energies and specific powers down to voltages of 1.5 V as a function of rate and thickness are plotted in FIGS. 36 and 37, respectively. The cathode with 0.6 mm thickness had the highest specific energy at all rates. An increase in cathode thickness results in lower specific power at all pulse discharge rates since thicker electrodes have higher active mass.

Example 11

Effect of Cathode Density

The performance of batteries with three different cathode densities were evaluated. Cathodes were pressed at different pressures to obtain the different densities.

Figure 38:
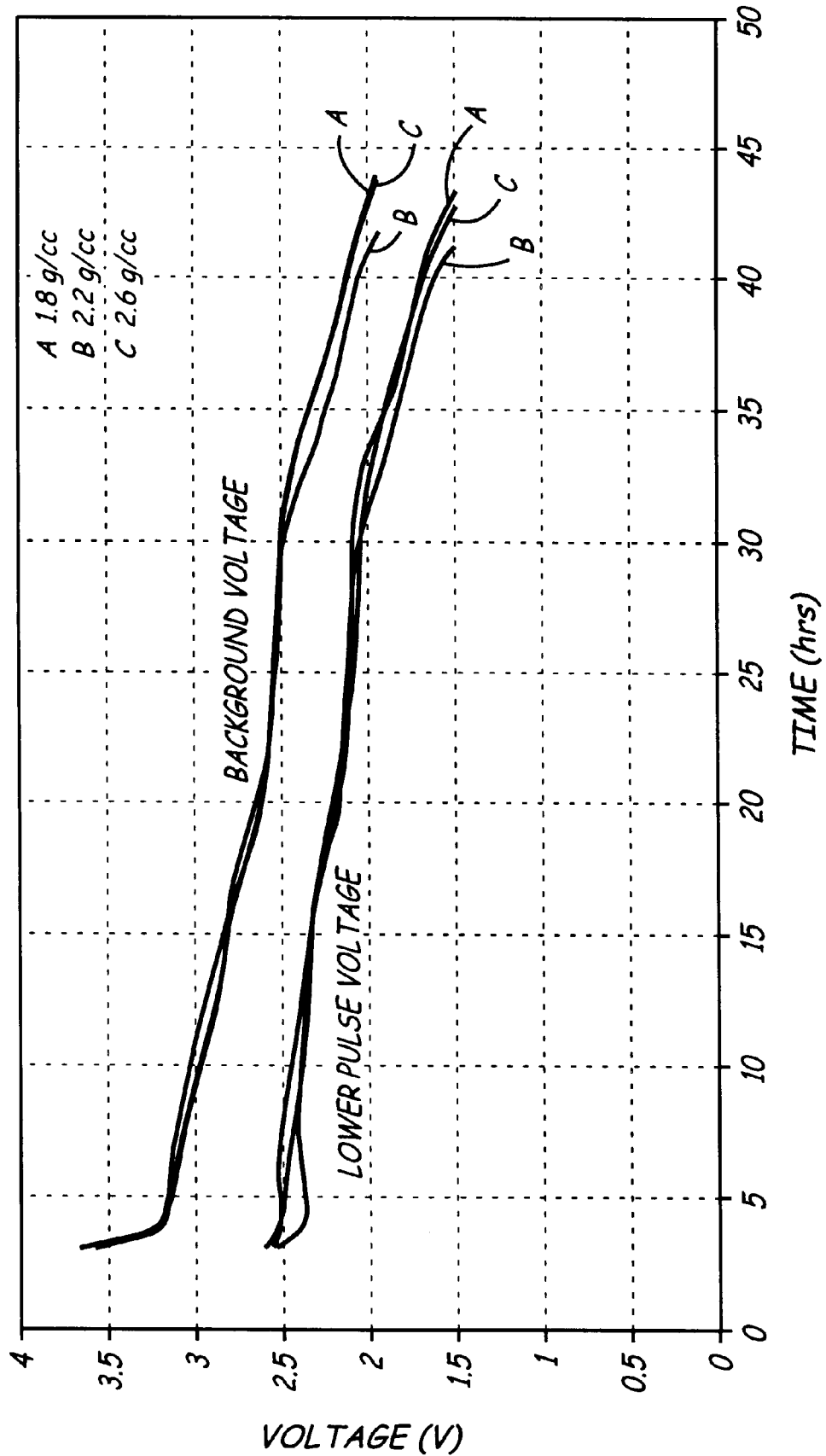
FIG. 38 is a plot of voltage as a function of time under pulse operation with a pulse current density of 25 mA/cm$^2$ to 1.5 V for three silver vanadium oxide cells produced with different cathode densities.
Figure 39:
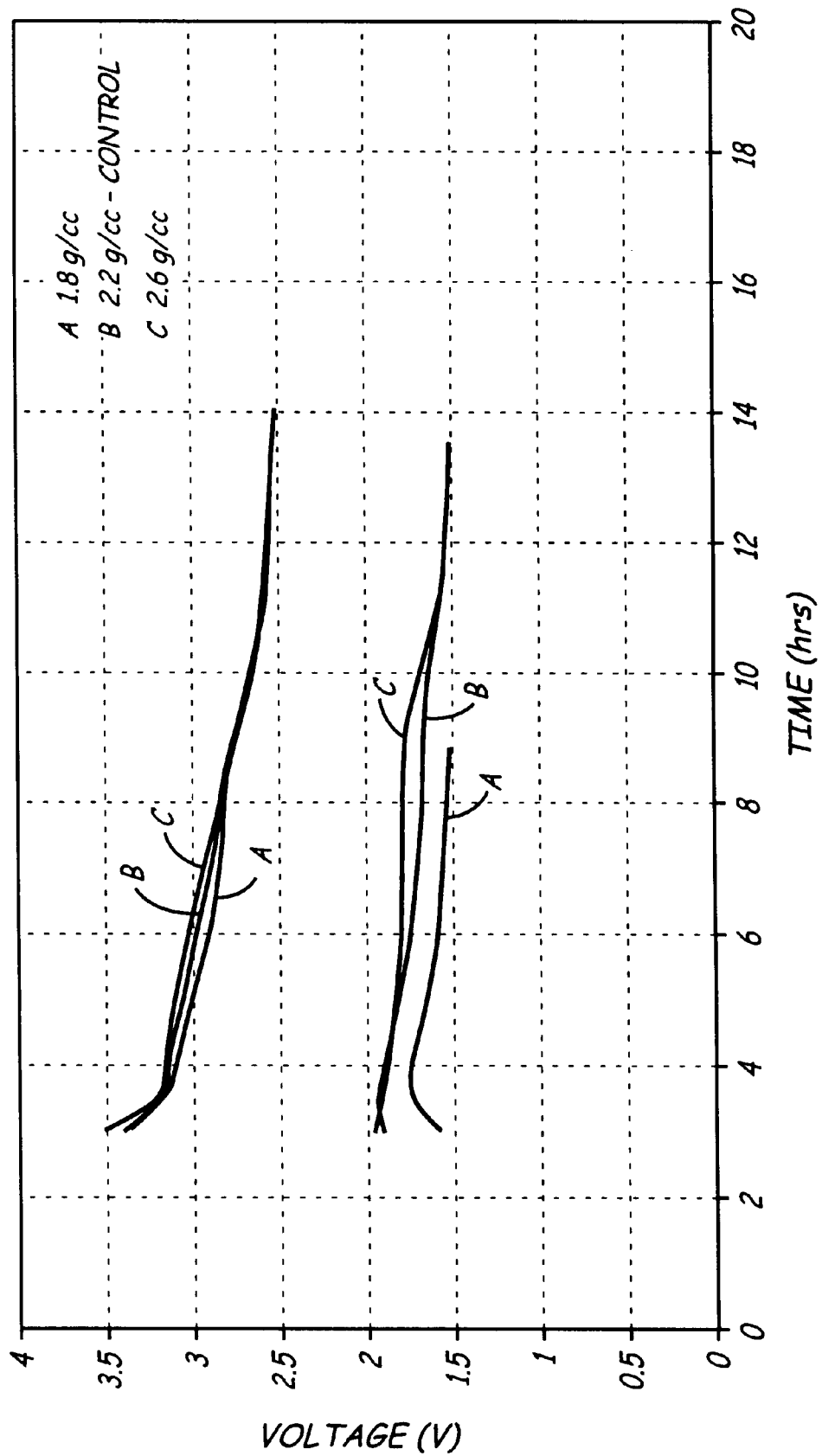
FIG. 39 is a plot of voltage as a function of time under pulse operation with a pulse current density of 60 mA/cm$^2$ to 1.5 V for three silver vanadium oxide cells produced with different cathode densities.

Cathodes were produced with three densities. The 2.2 g/cubic centimeter(cc) density was the same density used in the other examples. In addition, cathodes were produced with densities of 1.8 g/cc and 2.6 g/cc, respectively. Generally, suitable higher density cathodes can be produced with densities from about 2.4 g/cc to about 2.8 g/cc. The voltage versus time results for background voltage (upper lines) and lower pulse voltage of the first pulse (dashed lines) with current densities of 25 mA/cm$^2$ to 1.5 V are illustrated in FIG. 38. Comparable results were obtained for all densities at this pulse current density. The voltage versus time results for background voltage (upper lines) and lower pulse voltage of the first pulse (dashed lines) with current densities of 60 mA/cm$^2$ to 1.5 V are illustrated in FIG. 39. These results demonstrate that cathodes with high densities could achieve high pulse rates.

Figure 40:
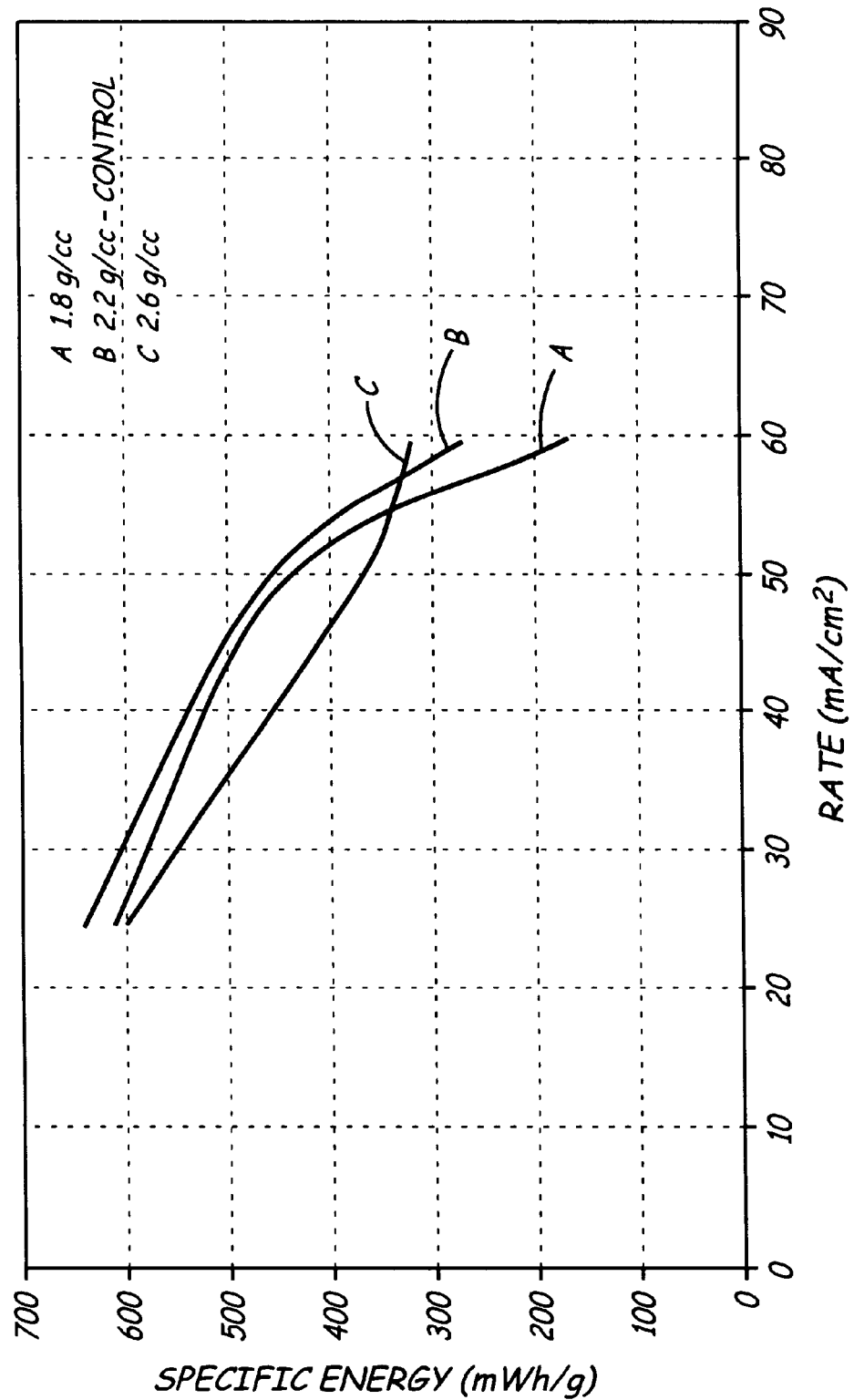
FIG. 40 is a plot of specific energy as a function of rate for pulse operation with three different cathode densities for silver vanadium oxide pellets.
Figure 41:
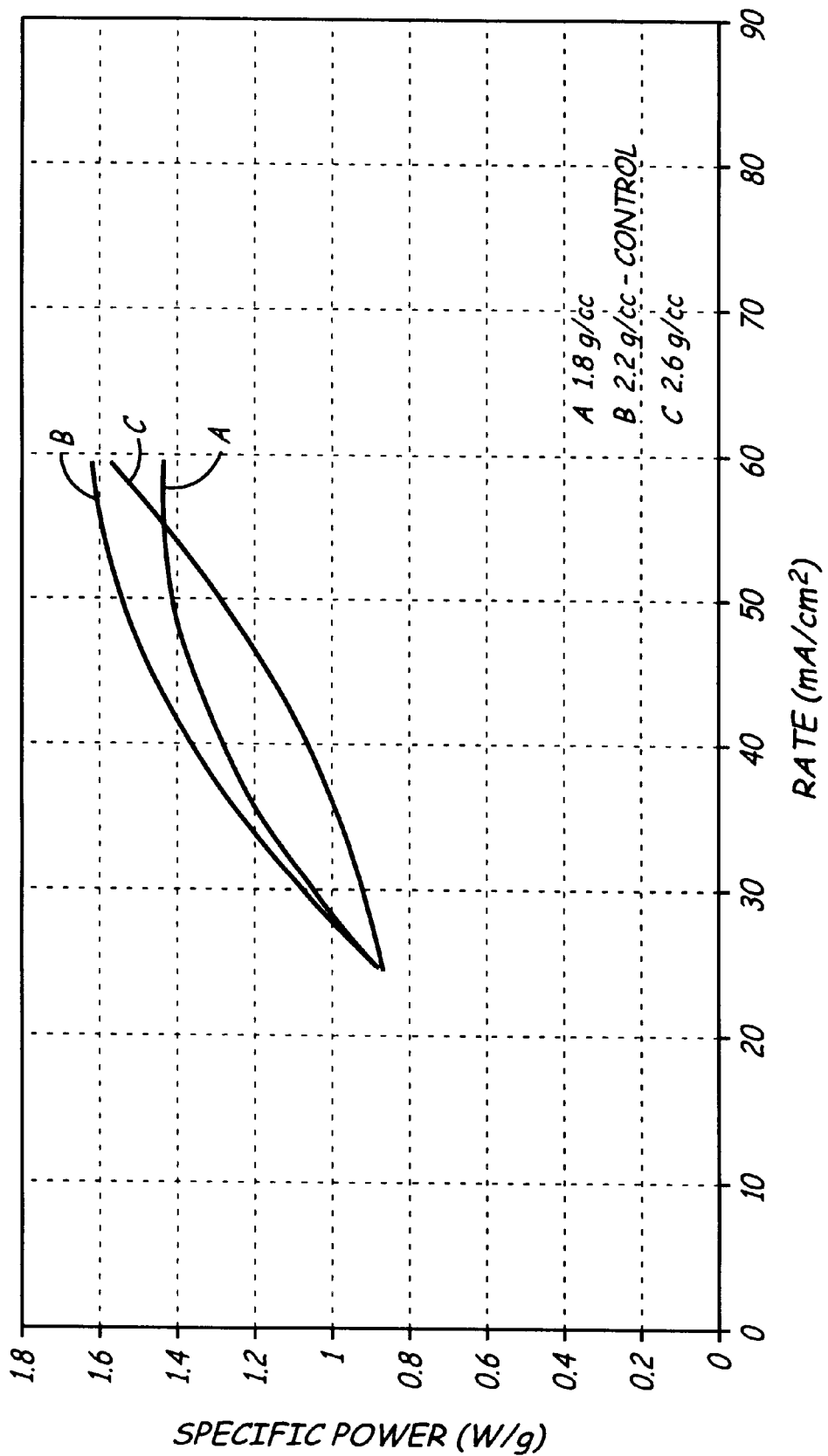
FIG. 41 is a plot of specific power as a function of rate for pulse operation with three different cathode densities for silver vanadium oxide pellets.

Specific energies as a function of pulse current densities and cathode density are summarized in FIG. 40. Moderate densities have higher specific energies except at very high rates at which higher density cathodes yield higher specific energies. Specific powers as a function of pulse current densities and cathode density are plotted in FIG. 41. Moderate densities have higher specific powers at all rate evaluated. Cathodes with higher density yielded similar specific powers to the moderate density cathodes at a lower rate and higher rates.

Figure 42:
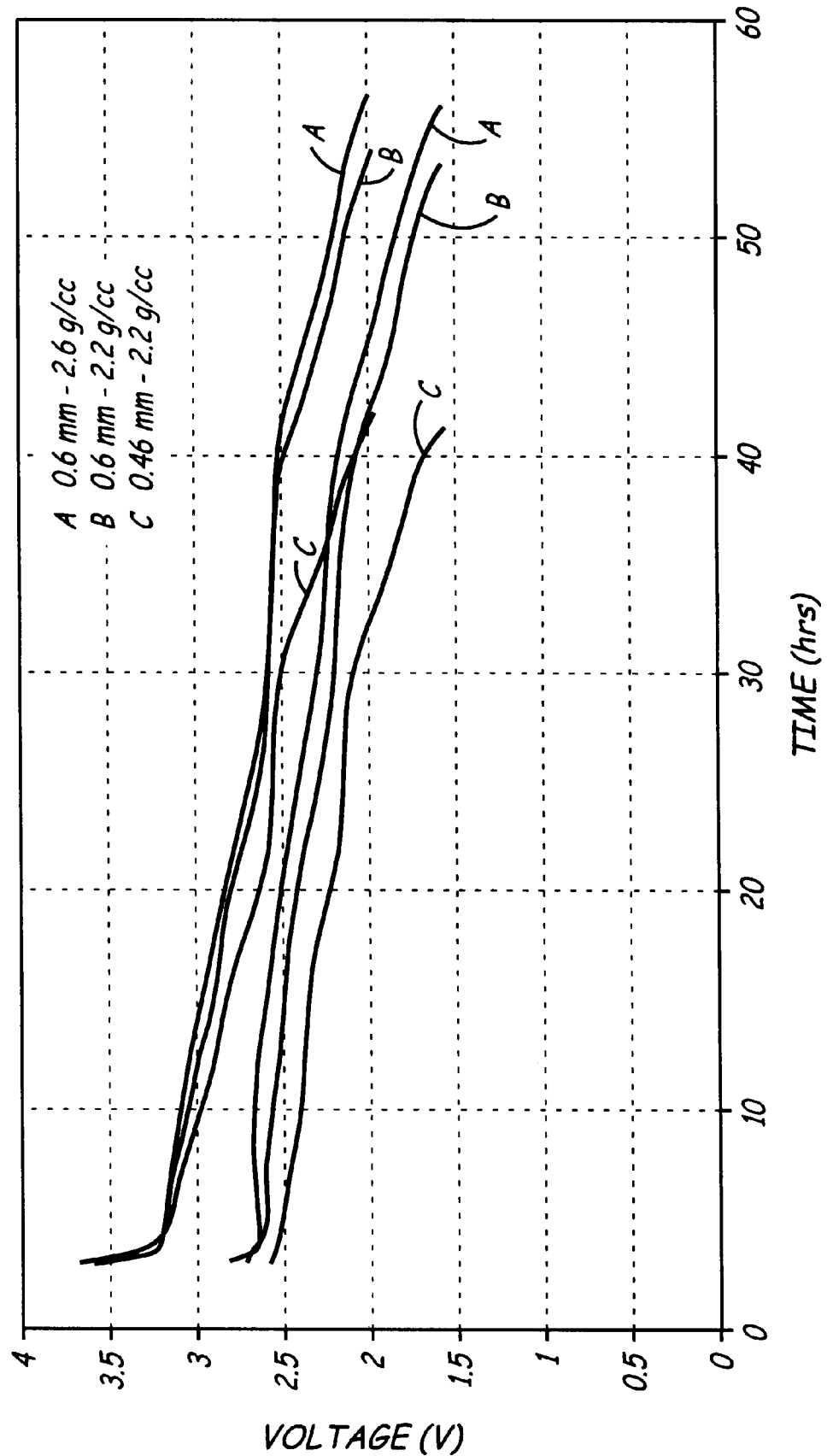
FIG. 42 is a plot of voltage as a function of time under pulse operation with a pulse current density of 25 mA/ m$^2$ to 1.5 V for three silver vanadium oxide cells produced with different cathode densities and thicknesses.
Figure 43:
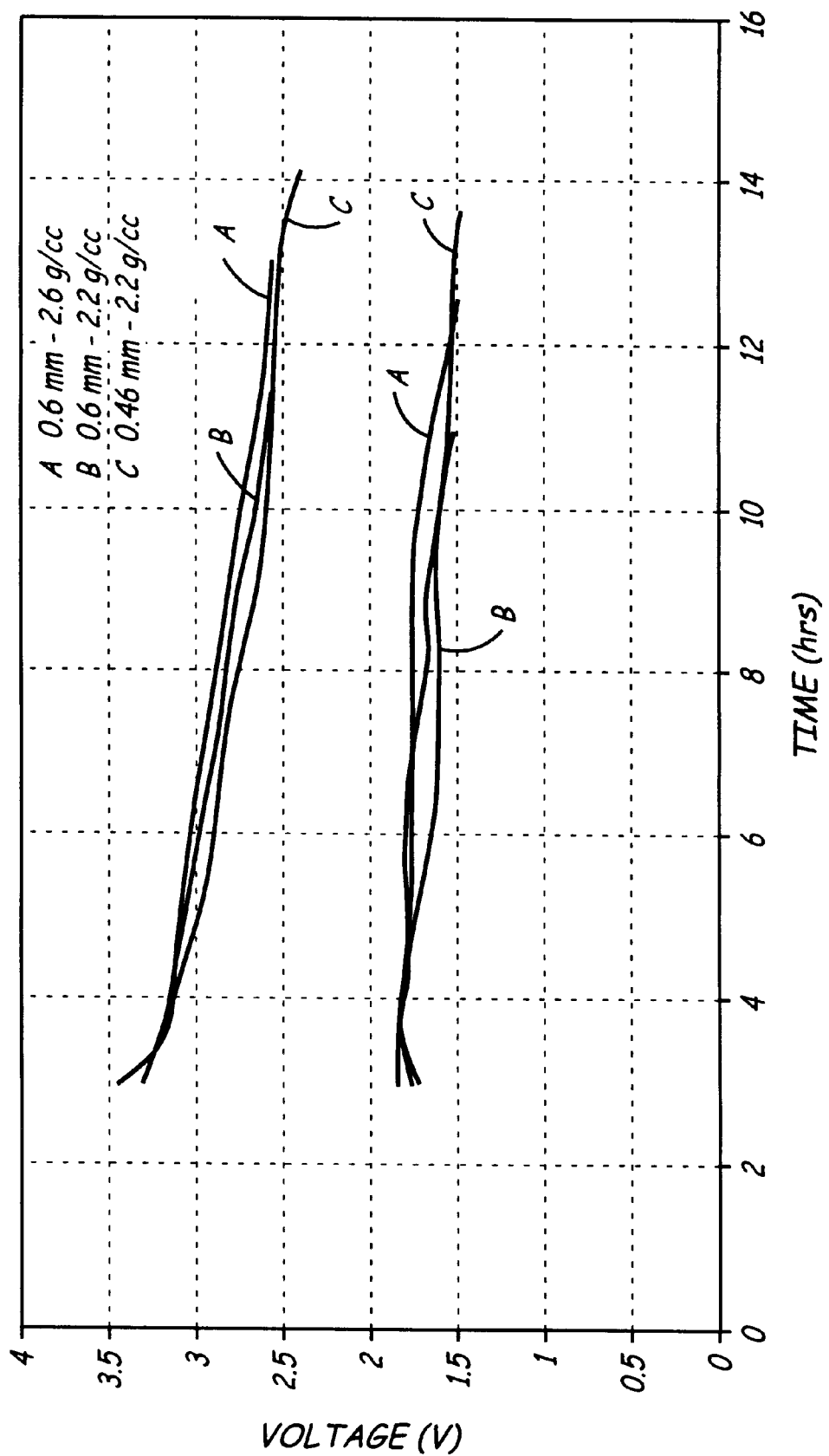
FIG. 43 is a plot of voltage as a function of time under pulse operation with a pulse current density of 70 mA/cm$^2$ to 1.5 V for three silver vanadium oxide cells produced with different cathode densities and thicknesses.

In addition, the effect on cathode density was examined for thicker electrodes also. The voltage versus time results for background voltage (upper lines.) and lower pulse voltage of the first pulse (dashed lines) with current densities of 25 mA/cm$^2$ to 1.5 V are illustrated in FIG. 42 for two densities at 0.6 mm thickness and one density at 0.46 mm thickness. Comparable delta voltage results were obtained for all densities and thicknesses at this pulse current density. The voltage versus time results for background voltage (upper lines) and lower pulse voltage of the first pulse (dashed lines) with current densities of 70 mA/cm$^2$ to 1.5 V are illustrated in FIG. 43 for the same densities and thicknesses. These results demonstrate that thick cathodes with high densities could achieve high pulse rates.

Example 12

Discharge at Different Pulse Currents

This example discloses that very high rate capabilities are achievable with the present improved cells.

Figure 44:
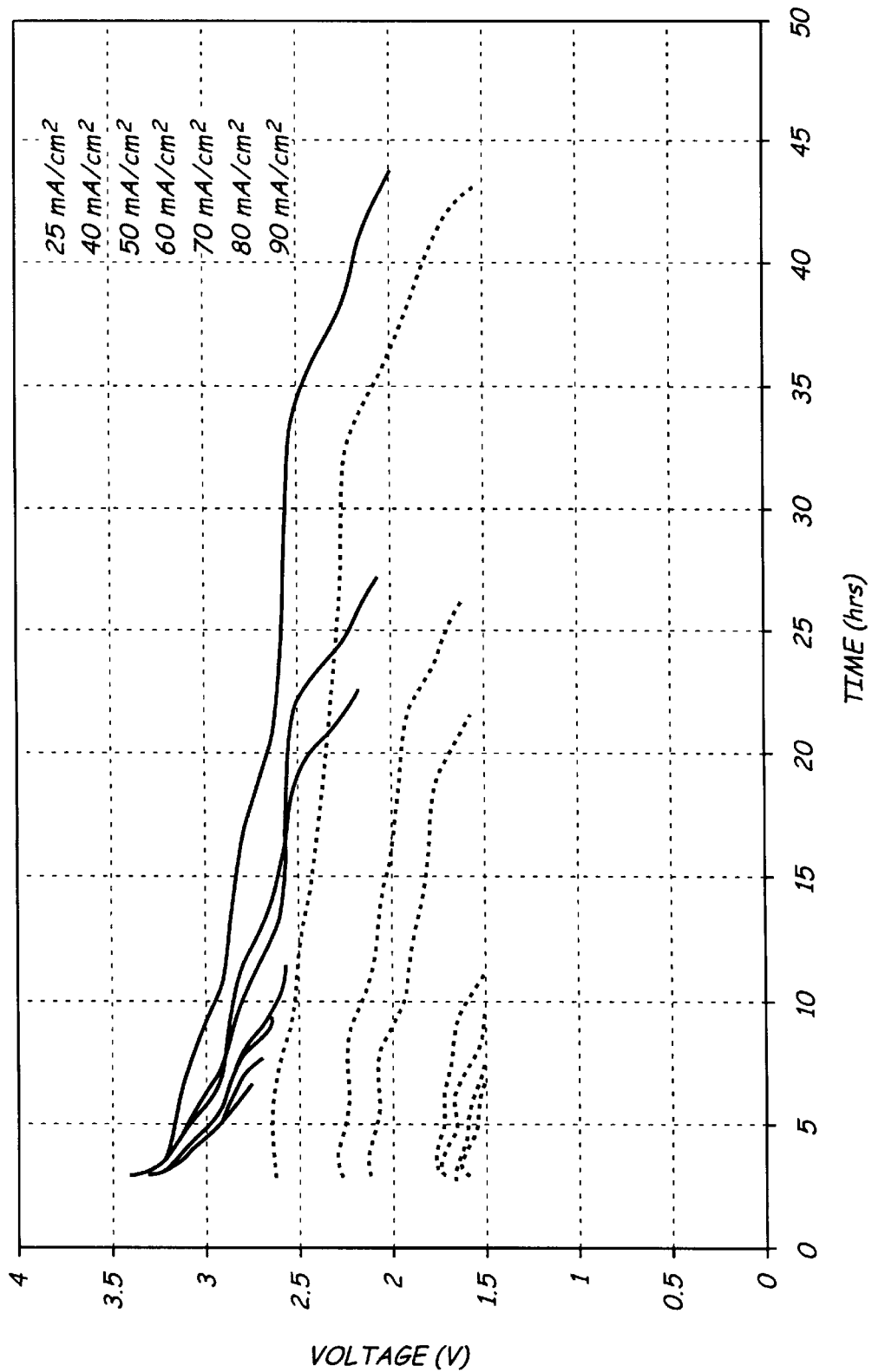
FIG. 44 is a plot of voltage as a function of time for silver vanadium oxide cells under pulse operation for several values of pulse current densities to 1.5 V.

The voltage as a function of time results for background voltage (solid lines) and lower pulse voltage of the first pulse (dashed lines) are illustrated in FIG. 44. The pulse current densities in FIG. 44 are 25 mA/cm$^2$, 40 mA/cm$^2$, 50 mA/cm$^2$, 60 mA/cm$^2$, 70 mA/cm$^2$, 80 mA/cm$^2$, and 90 m/cm$^2$ to 1.5 V. This demonstrates that submicron silver vanadium oxide particles result in cathodes that are highly rate capable up to pulse current densities of 90 mA/cm$^2$ with a cathode composition of 70 weight percent silver vanadium oxide, 10 weight percent graphite, 10 weight percent acetylene black and lo weight percent Teflon®.

Example 13

Evaluation of Voltage Delay

Figure 45:
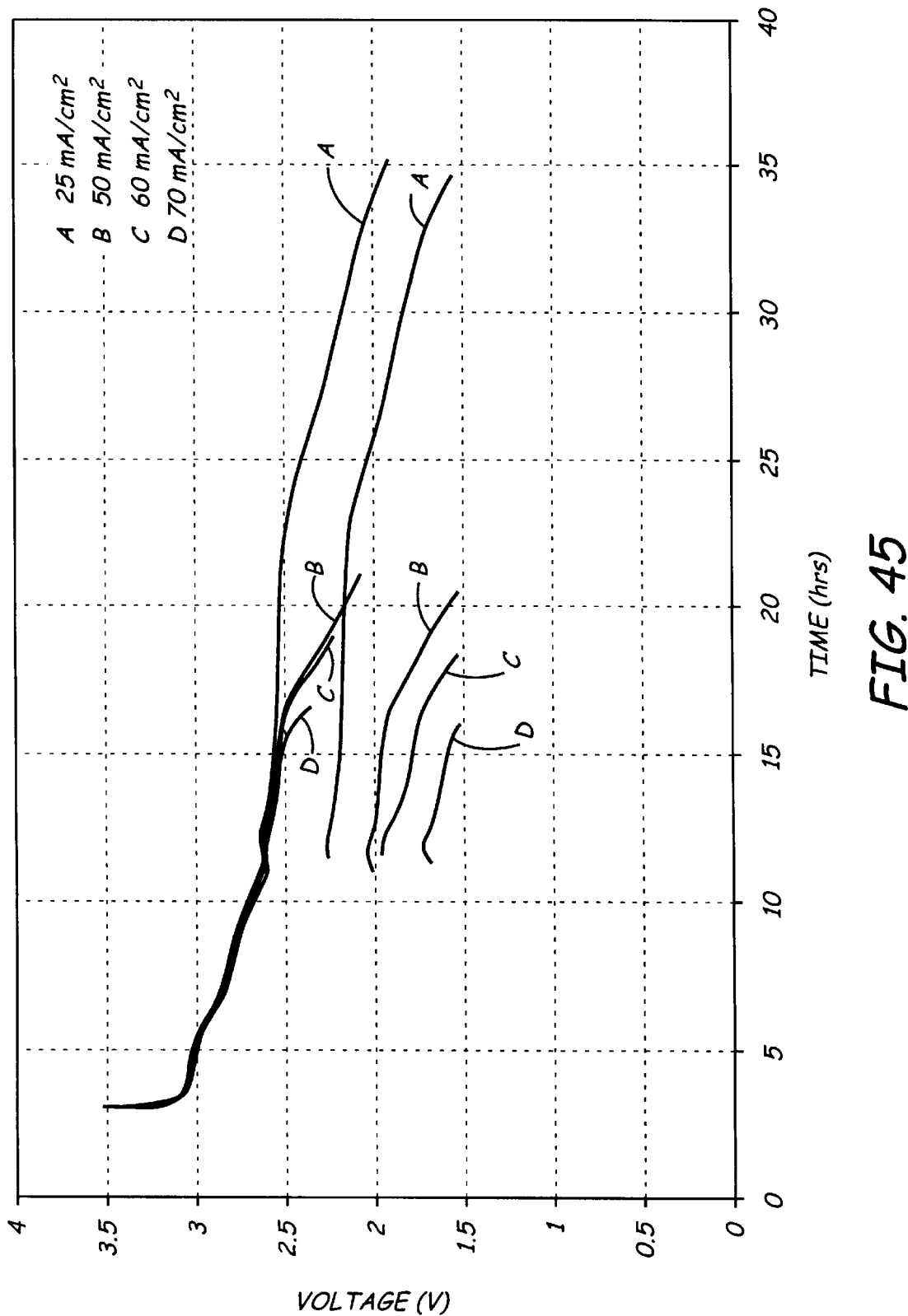
FIG. 45 is a plot of voltage as a function of time for silver vanadium oxide cells initially discharged under a continuous drain to 2.6 volts followed by pulsed operation at four different pulsed current densities to 1.5 V.

This example provides a demonstration that the batteries described herein exhibit insignificant voltage delay in pulse operation. voltage delay is a voltage drop or depression of voltage that generally is observed for silver vanadium oxide batteries at about 2.6 volts during pulse operation. Voltage delay is described in detail above. Three separate tests were performed to evaluate voltage delay. In a first test, the battery was discharged under a constant current at a current density of 1 mA/cm$_2$ to 2.6 V, which is the voltage at which silver is, reduced to silver metal and expelled from the cathode matrix. When 2.6 volts was reached, a standard accelerated pulse test was performed using the pulse trains described above. The pulse testing was performed until the lower pulse voltage of the first pulse reached 1.5 V. The voltage as a function of time results for background voltage (upper lines) and lower pulse voltage of the first pulse (lower lines) are illustrated in FIG. 45 for four pulsed current densities, 25 mA/cm$^2$, 50 mA/cm$^2$, 60 mA/cm$^2$ and 70 mA/cm$^2$. There is no evidence of a voltage delay.

Figure 46:
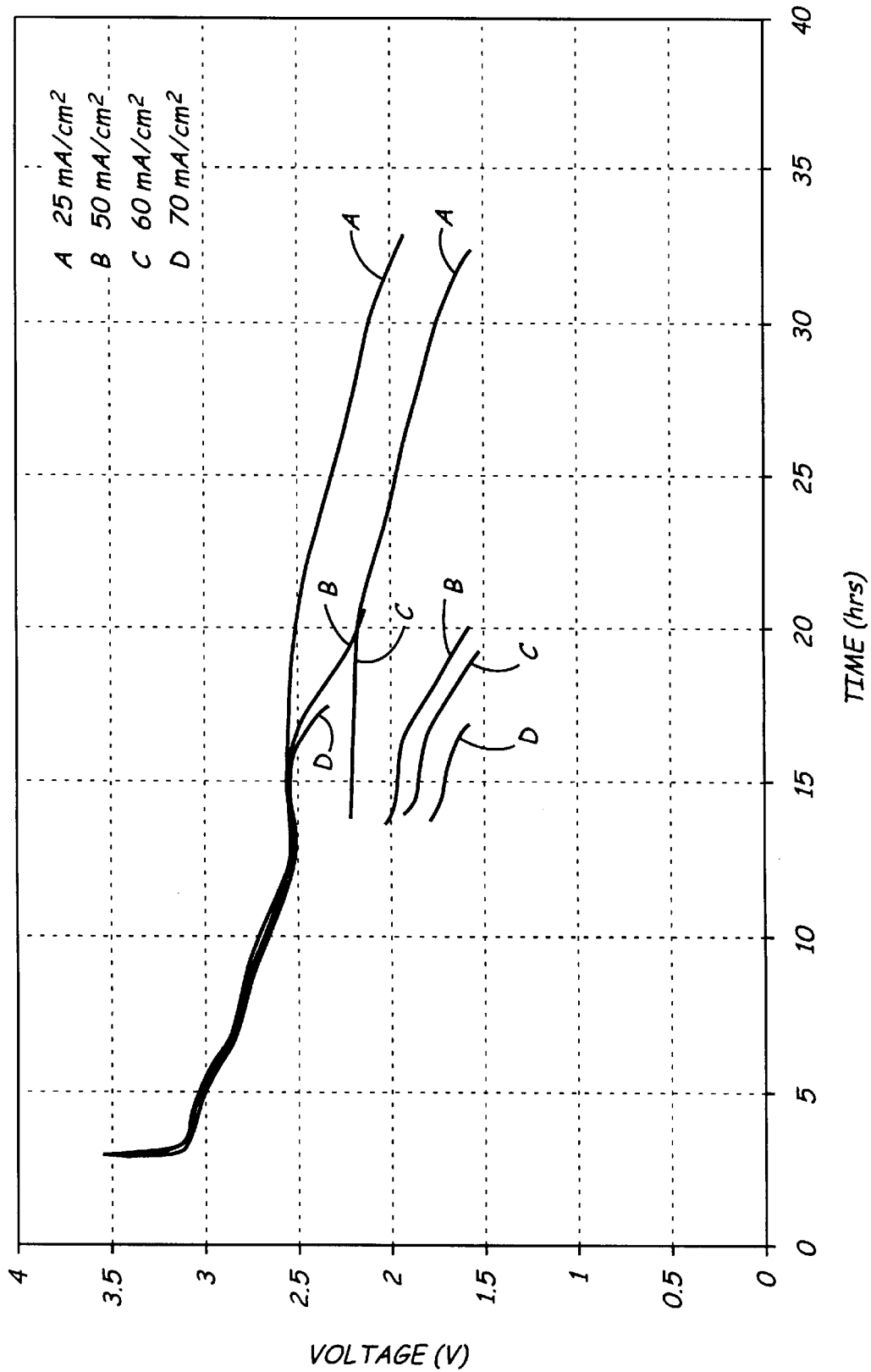
FIG. 46 is a plot of voltage as a function of time for silver vanadium oxide cells initially discharged under a continuous drain to 2.5 volts followed by pulsed operation at four different pulsed current densities to 1.5 V.

The second test was identical to the first test except that, the constant current discharge was performed down to 2.5 volts. For the second test, the voltage as a function of time results for, background voltage (upper lines) and lower pulse voltage of the first pulse (lower lines) are illustrated in FIG. 46 for four pulsed current densities, 25 mA/cm$^2$, 50 mA/cm$^2$, 60 mA/cm$^2$ and 70 mA/cm$^2$ to 1.5V. Again, no evidence of a voltage delay was observed.

Figure 47:
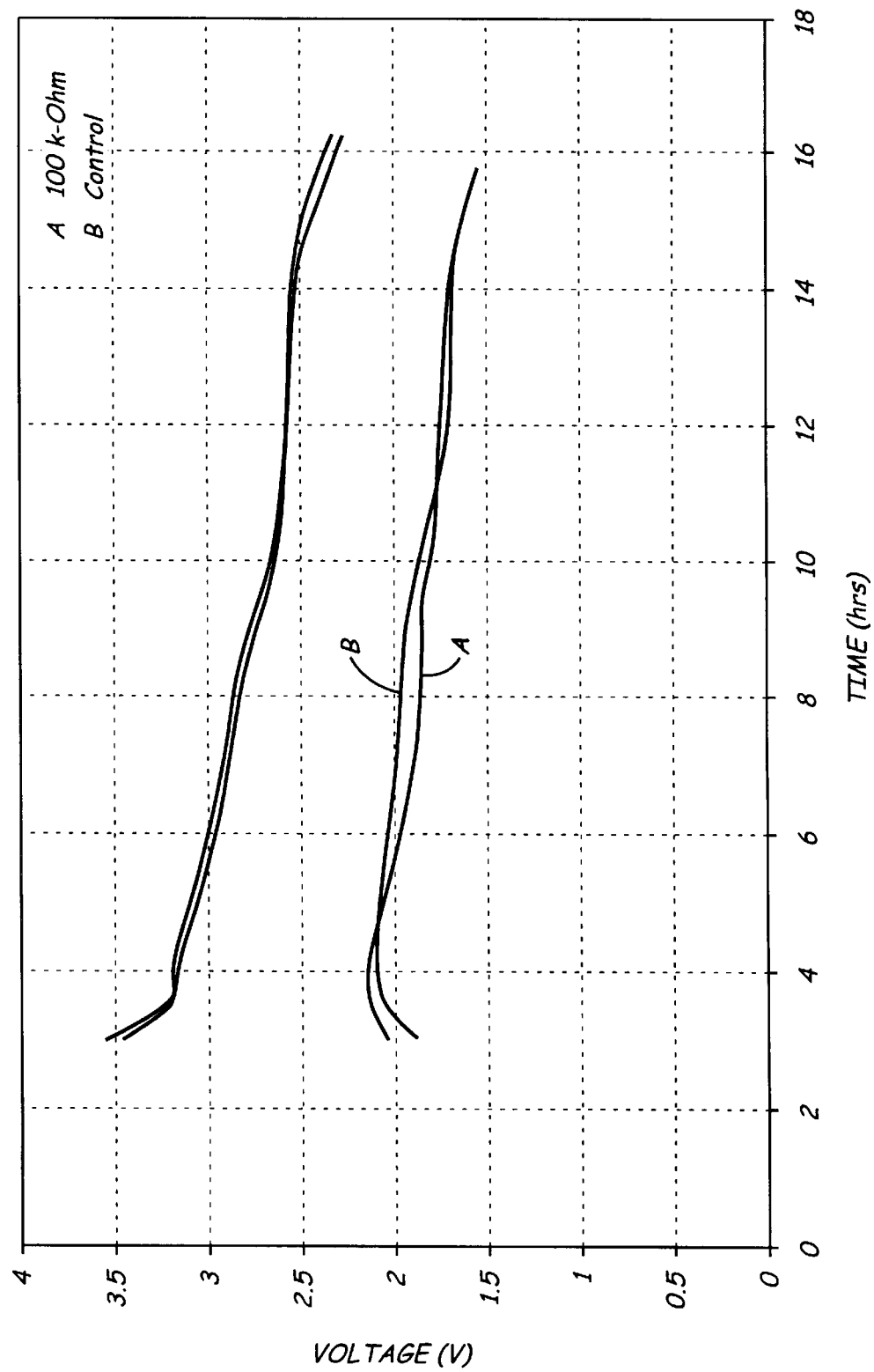
FIG. 47 is a plot of an accelerated pulse test of silver vanadium oxide cells performed under a pulse current density of 60 mA/cm$^2$ to 1.5 V for a cell with a 100 kilo-ohm load and for a cell with no load.

The third test involved an accelerated pulse test at a current density of 60 mA/cm$^2$ with a 100 kilo-ohm resistor connected in series with the battery. The resistor is used to accentuate any effect of voltage delay. When the lower pulse voltage of the first pulse reached 1.5 volts the test was terminated. The voltage as a function of time results for background voltage (upper lines) and lower pulse voltage of the first pulse (lower lines) are illustrated in FIG. 47 along with control results without the resistor. Again, no evidence of a voltage delay is observed.

In other silver vanadium oxide batteries, additives have been used to try to reduce the effect of voltage delay. For example, see U.S. Pat. No. 6,096,447, incorporated herein by reference. With the silver vanadium oxide batteries described herein, no additives would be needed.

The embodiments described above are intended to be illustrative and not limiting. Additional embodiments are within the claims below. Although the present invention has been described with reference to preferred embodiments, workers skilled in the art will recognize that changes may be made in form and detail without departing from the spirit and scope of the invention.

What is claimed is:

1. A battery comprising an electrolyte having lithium ions and a cathode comprising silver vanadium oxide particles, the battery having a pulsed specific energy of at least about 575 mWh/g when pulsed in groups of four-10 second pulses at a current density of 25 mA/cm$^2$ spaced by 15 seconds between each pulse and with 30 minutes between pulse groups down to a pulse discharge voltage of 1.5 V.

2. The battery of claim 1 wherein the silver vanadium oxide particles have an average diameter less than about 1000 nm.

3. The battery of claim 1 wherein the silver vanadium oxide particles have an average diameter less than about 500 nm.

4. The battery of claim 1 wherein the silver vanadium oxide particles comprise $Ag_2V_4O_{11}$ and less than about 0.5 percent by weight silver metavanadate.

5. The battery of claim 1 having a pulse specific energy of at least about 600 mWh/g.

6. The battery of claim 1 having a pulse specific energy of at least about 625 mWh/g.

7. The battery of claim 1 having a pulse specific energy of at least about 640 mWh/g.

8. The battery of claim 1 having a pulse specific capacity of at least about 275 mAh/g.

9. The battery of claim 1 having a pulse specific capacity of at least about 300 mAh/g to 1.5 volts.

10. The battery of claim 1 having a maximum pulse specific power of at least about 1.5 W/g to 1.5 V.

11. The battery of claim 1 having a maximum pulse specific power of at least about 2.1 W/g to 1.5 V.

12. The battery of claim 1 wherein the anode comprises lithium metal foil.

13. The battery of claim 1 wherein the anode comprises lithium metal particles.

14. The battery of claim 1 wherein pulse trains can be supplied at current densities greater than about 50 mA/cm$^2$.

15. The battery of claim 1 having a specific capacity of at least about 375 mAh/g upon discharge to 1 volt under a continuous current density of 0.309 mA/cm$^2$.

16. A defibrillator comprising a battery of claim 1.

17. The defibrillator of claim 16 wherein the monitoring functions as well as the defibrillating functions are powered by the battery of claim 1.

18. An implantable medical device capable of defibrillating and pacemaking functions comprising a battery of claim 1.

19. The implantable medical device of claim 18 wherein the defibrillating function and pacemaking function are powered by the battery of claim 1.

20. A pacemaker comprising a battery of claim 1.

21. The battery of claim 1 wherein the silver vanadium oxide particles comprise $Ag_2V_4O_{11}$.

22. The battery of claim 1 wherein the silver vanadium oxide particles comprise less than about 0.5 percent by weight silver metavanadate.

23. A battery comprising silver vanadium oxide particles, the battery having a maximum pulse specific power of greater than about 1.5 W/g to 1.5 V.

24. The battery of claim 23 having a maximum pulse specific power of greater than about 2.1 W/g to 1.5 V.

25. The battery of claim 23 wherein the silver vanadium oxide particles have an average diameter less than about 1000 nm.

26. The battery of claim 23 wherein the silver vanadium oxide particles comprise $Ag_2V_4O_{11}$.

27. The battery of claim 23 wherein the silver vanadium oxide particles comprise less than about 0.5 percent by weight silver metavanadate.

28. The battery of claim 23 comprising an electrolyte comprising lithium ions.

29. The battery of claim 23 having a pulse specific energy of at least about 625 mWh/g when pulsed in groups of four-10 second pulses at a current density of 25 mA/cm$^2$ spaced by 15 seconds between each pulse and with 30 minutes between pulse groups down to a pulse discharge voltage of 1.5 V.

30. The battery of claim 23 having a pulse specific capacity of at least about 275 mAh/g to 1.5 volts.

31. The battery of claim 23 wherein the anode comprises lithium metal foil.

32. The battery of claim 23 wherein the anode comprises lithium metal particles.

33. The battery of claim 23 wherein the battery can produce pulse trains with current densities of at least about 50 mA/cm$^2$.

34. An implantable medical device comprising the battery of claim 23.

35. A battery comprising an electrolyte having lithium ions and a cathode comprising silver vanadium oxide particles, the battery being able to produce pulse trains with current densities of at least about 50 mA/cm$^2$.

36. The battery of claim 35 wherein the battery can produce pulse trains with current densities of at least about 70 mA/cm$^2$.

37. The battery of claim 35 wherein the battery can produce pulse trains with current densities of at least about 90 mA/cm$^2$.

38. The battery of claim 35 wherein the silver vanadium oxide particles comprise $Ag_2V_4O_{11}$.

39. The battery of claim 35 wherein the silver vanadium oxide particles comprise less than about 0.5 percent by weight silver metavanadate.

40. The battery of claim 35 having a pulse specific energy of at least about 625 mWh/g when pulsed in groups of four-10 second pulses at a current density of 25 mA/cm$^2$ spaced by 15 seconds between each pulse and with 30 minutes between pulse groups down to a pulse discharge voltage of 1.5 V.

41. The battery of claim 35 having a pulse specific capacity of at least about 275 mAh/g to 1.5 volts.

42. The battery of claim 35 wherein the anode comprises lithium metal foil.

43. The battery of claim 35 wherein the anode comprises lithium metal particles.

44. The battery of claim 35 having a maximum pulse specific power of greater than about 1.5 W/g to 1.5 V.

45. The battery of claim 35 wherein the silver vanadium oxide particles have an average diameter less than about 1000 nm.

46. An implantable medical device comprising the battery of claim 35.

* * * * *